US010058133B2

(12) United States Patent
Hirschberg et al.

(10) Patent No.: US 10,058,133 B2
(45) Date of Patent: Aug. 28, 2018

(54) SENDING MESSAGES WIRELESSLY FROM A GARMENT

(71) Applicant: iWear Holdings Corp., Dallas, TX (US)

(72) Inventors: Alexander Benjamin Hirschberg, Dallas, TX (US); Michael Stephen Winton, Plano, TX (US)

(73) Assignee: iWear Holdings Corp., Dallas, TX (US)

( * ) Notice: Subject to any disclaimer, the term of this patent is extended or adjusted under 35 U.S.C. 154(b) by 0 days.

(21) Appl. No.: 15/274,345

(22) Filed: Sep. 23, 2016

(65) Prior Publication Data

US 2017/0079336 A1  Mar. 23, 2017

Related U.S. Application Data

(60) Provisional application No. 62/222,448, filed on Sep. 23, 2015.

(51) Int. Cl.
| | |
|---|---|
| *H04M 3/00* | (2006.01) |
| *A41D 1/00* | (2018.01) |
| *A41B 1/08* | (2006.01) |
| *H04M 1/725* | (2006.01) |
| *H04W 4/80* | (2018.01) |
| *H04M 1/02* | (2006.01) |
| *A41D 27/20* | (2006.01) |

(52) U.S. Cl.
CPC ............ *A41D 1/002* (2013.01); *A41B 1/08* (2013.01); *H04M 1/7253* (2013.01); *H04M 1/72552* (2013.01); *H04W 4/80* (2018.02); *A41D 27/205* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 5,109,322 | A | 4/1992 | Loughlin |
| 5,737,775 | A | 4/1998 | Schwartz |
| 6,311,336 | B1 | 11/2001 | Gootrad |
| 7,377,663 | B2 | 5/2008 | Desjardin |
| 7,571,495 | B2 | 8/2009 | Emeth |
| 7,787,240 | B2 * | 8/2010 | Swain .................... G06F 1/163 248/917 |
| 2002/0024675 | A1 | 2/2002 | Foxlin |
| 2002/0068604 | A1 | 6/2002 | Prabhakar et al. |
| 2002/0072971 | A1 | 6/2002 | DeBusk et al. |
| 2005/0278825 | A1 | 12/2005 | Altman |

(Continued)

OTHER PUBLICATIONS

International Search Report and Written Opinion corresponding to PCT/US2016/053415 dated Feb. 27, 2017, 7 pages.

*Primary Examiner* — Idowu O Osifade
(74) *Attorney, Agent, or Firm* — Gearhart Law LLC

(57) ABSTRACT

Systems and methods are provided for sending messages wirelessly from a garment. The system includes a wireless communication device configured to wirelessly transmit one or more digital messages to one or more mobile devices within a predefined radius of the wireless communication device. The system further includes a garment, a pouch, coupled to the garment, configured to house the wireless communication device, and a securing mechanism configured to secure the wireless communication device within the pouch.

2 Claims, 52 Drawing Sheets

(56) References Cited

U.S. PATENT DOCUMENTS

| | | |
|---|---|---|
| 2006/0028430 A1* | 2/2006 | Harary .................. A41D 1/002 345/156 |
| 2007/0245444 A1 | 10/2007 | Brink |
| 2009/0149036 A1 | 6/2009 | Lee et al. |
| 2011/0288917 A1 | 11/2011 | Wanek et al. |
| 2013/0281815 A1 | 10/2013 | Varadan |

* cited by examiner

SENDING MESSAGES WIRELESSLY FROM A GARMENT

CLAIM OF PRIORITY

This utility patent application claims priority to U.S. Provisional Application No. 62/222,448, filed on Sep. 23, 2015. The contents of this application are hereby incorporated by reference.

FIELD OF THE EMBODIMENTS

This invention relates to wireless communication devices and, in particular, to wireless digital communication devices housed in garments, apparel, or uniforms.

BACKGROUND OF THE EMBODIMENTS

Uniforms and other types of garments are often worn by employees, contractors, volunteers, and other personnel in various industries. For example, uniforms and other types of garments are often worn by vendors at entertainment venues, by sales personnel at retail locations, and by other types of professionals in a variety of other contacts.

Examples of related art are described below:

U.S. Pat. No. 7,787,240 provides for a wearable assembly, wherein a display system is incorporated into an article of clothing, such as a video jacket or vest. The display system includes at least an output device, a mass storage device, and an input device. The output device includes at least a display device with a substantially rigid display screen. The mass storage device is in content providing relationship to the output device. The input device includes operator accessible controls controllingly associated with the output and mass storage devices. An electrical power source is in electrical power supplying relationship to at least the display system. A carrying harness supports at least the display screen on a torso of a person wearing the article of clothing. The display screen is supported by the carrying harness so that the display screen is generally weight bearingly independent of the article of clothing. A pad is positioned between the carrier's torso and the display screen in motion stabilizing relationship with the display screen. A substantially transparent, impact, and scratch resistant pane is mounted to the article of clothing in substantial registry with the display screen so the display screen is visible through the pane to a viewer located outside of the article of clothing. A geographic position locator beacon member is associated with the article of clothing. Except for the display screen, the display system is substantially hidden from the viewer by the article of clothing.

U.S. Pat. No. 7,377,663 provides for safety garments and safety vests for enhancing the visibility of a wearer in low-light conditions. The safety garment has a first layer, a reflective layer, and a plurality of lights electrically connected to a power source. The lights are attached to the reflective layer and positioned within an aperture of a protective cover such that the light does not protrude past an outer surface of the protective cover. The reflective layer may be removable. The lights may emit non-visible light. The garment may comprise an audible alarm, a pouch for packing and carrying the garment, a removable lighted patch for displaying any one of various messages or beacons, and fiber-optic thread to further illuminate the safety garment.

U.S. Pat. No. 7,571,495 provides for a garment having a detachable billboard panel on the front or back, or both, having indicia thereon for advertising a movie or sporting event or the like, an entertainment program, etc. The billboard panel is a removable panel that is quickly and easily mounted to or removed from the garment and flaps on the garment cover the securing elements.

U.S. Patent Application No. 2009/0149036 provides for an entirely wearable electrical connector for power/data connectivity. The principal element of a modular network is the wearable electrical connector, which is integrated into a personal area network with USB compatibility. An embodiment comprises a non-conductive elastomeric environmental seal.

U.S. Patent Application No. 2002/0068604 provides for a wearable data network. The wearable data network includes a Universal Data Warehouse (UDW) and at least one Purpose Optimized Device (POD). The UDW is carried by the user and is, essentially, a personal data warehouse to store data having a variety of different types and uses (e.g., personal financial data, audio and video files, and presentation files). The UDW, however, is incapable of processing the user's data. Instead, one PODs are used in conjunction with one or more UDWs to process the user's data. As is suggested by its name, a POD is a device that has been optimized to carry out a specific purpose. One example is a POD that is designed to play the user's audio files, another example is a POD that is designed to render the user's video files, and yet another example is a POD that is designed to render the user's presentation files.

U.S. Patent Application No. 2006/0028430 provides for wearable multimedia delivery devices and methods of use thereof. A first variation provides a video jacket incorporating multimedia information delivery and optionally including separate power and multimedia information sources so as to minimize restriction of motion for the wearing user. In one variation, the separate power and multimedia information sources are provided on a belt coupled to a multimedia delivery component. Another variation provides a video badge wearable by a user, for example, when delivering a service, such as waitering. A third variation provides a video belt wearable by a user, for example, when delivering a service, such as waitering. Other variations are provided for other wearable video options. Additional features include impact resistance and heat dissipation.

U.S. Patent Application No. 2011/0288917 provides for methods and systems for displaying advertising or other promotional information to users via mobile devices. In particular, methods and systems that target advertisements using real-time information including location-based, defined geolocation territory rights (e.g., GeoEstate rights), and weather-related information.

None of the art described above addresses all of the issues that the present invention does.

SUMMARY OF THE EMBODIMENTS

According to an embodiment of the present invention, a system is provided for sending messages wirelessly from a garment, wherein the system includes: a wireless communication device configured to wirelessly transmit one or more digital messages to one or more mobile devices within a predefined radius of the wireless communication device; a garment; a pouch, coupled to the garment, configured to house the wireless communication device; and a securing mechanism configured to secure the wireless communication device within the pouch.

According to another embodiment of the present invention, a system is provided for sending messages wirelessly from a garment, wherein the system includes: a wireless communication device configured to wirelessly transmit one or more digital messages to one or more mobile devices within a predefined radius of the wireless communication device, the digital message being configured to cause one or more of the one or more mobile devices to retrieve content from a remote content server in response to receiving the message; a garment; a pouch, coupled to the garment, configured to house the wireless communication device; a securing mechanism configured to secure the wireless communication device within the pouch; and a removable display panel coupled to the garment, the removable display panel including visual content.

According to yet another embodiment of the present invention, a method is provided for sending messages wirelessly from a garment, wherein the method includes:

It is an object of the present invention to provide a system having a display panel having visual content.

It is an object of the present invention to provide a system having a removable display panel.

It is an object of the present invention to provide a system having a wireless communication device that is configured to broadcast the digital message using a short-range wireless communication protocol.

It is an object of the present invention to provide a system having a wireless communication device configured to send a digital message wherein the digital message is configured to cause one or more mobile devices to retrieve content from a remote content server in response to receiving the message.

It is an object of the present invention to provide a system having a wireless communication device configured to send a digital message wherein the digital message is configured to cause at least one mobile device to display information to a user in response to receiving the message.

DESCRIPTION OF THE PREFERRED EMBODIMENTS

Figure 1A:
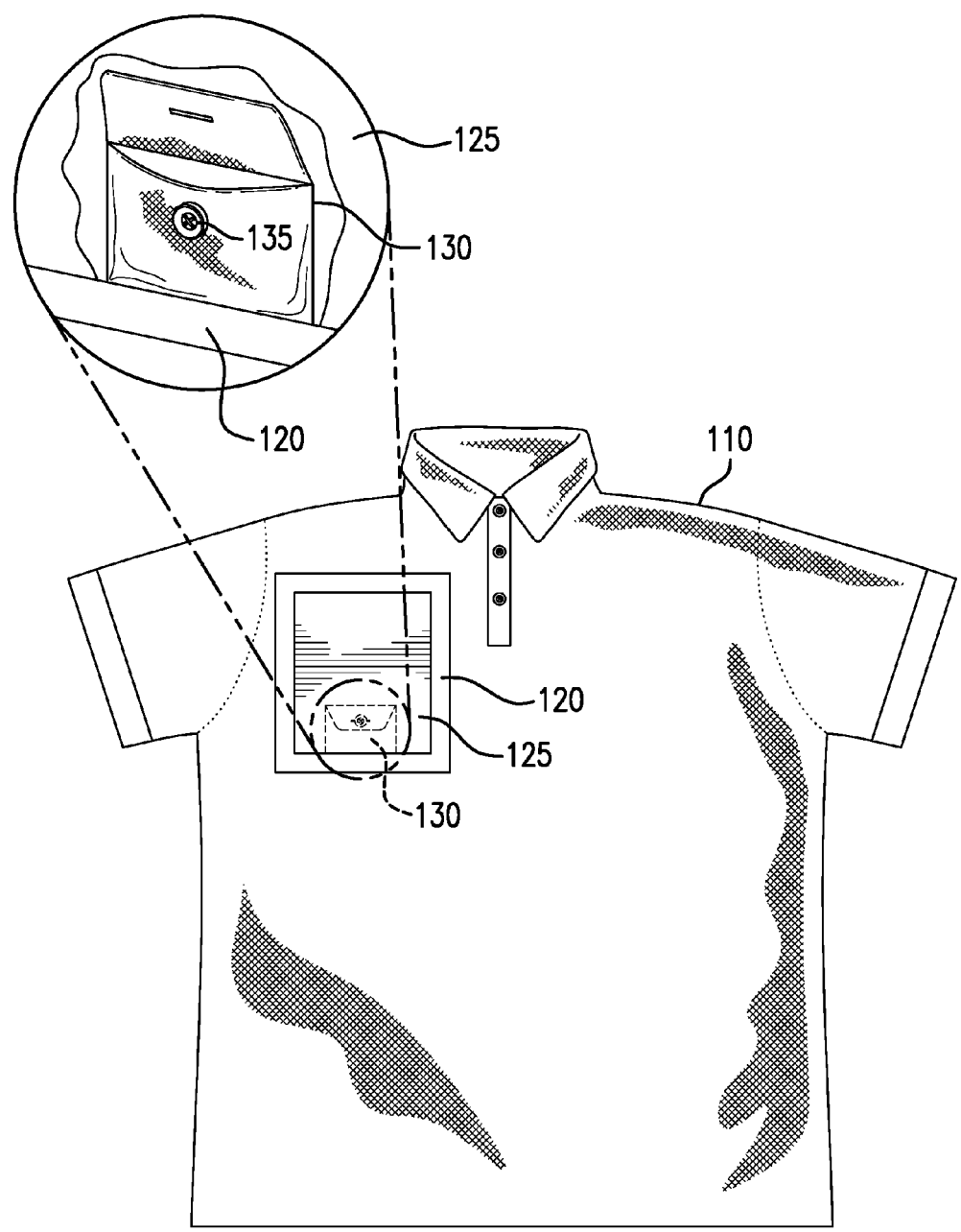
FIGS. 1A-1B show front perspective views of a garment having a display panel and a pocket located on a front portion of the garment and having a button fastener, according to an embodiment of the present invention.

Systems and methods are provided for the wireless sending of messages from a garment.

The preferred embodiments of the present invention will now be described with reference to the drawings. Identical elements in the various figures are identified with the same reference numerals.

According to some embodiments of the present invention, a uniform or other type of garment includes digital communication technology. This digital communication technology wirelessly interacts with mobile devices. According to an embodiment, the garment includes a wireless beacon that broadcasts messages by transmitting electromagnetic signals such as, but not limited to, radio frequency signals. The wireless beacon can be secured to (e.g., fastened to or incorporated into) the garment in any suitable manner. According to several embodiments, the wireless beacon is fastened to the garment using, e.g., a pin assembly, a snap, a hook, a touch fastener (e.g., VELCRO®, or another type of touch fastener), a magnetic fastener, a wire or cord fastener, or any other suitable type of fastener, while maintaining the spirit of the present invention. In some cases, the wireless beacon is incorporated into the garment in, for example, a pocket, a seam, or between fabric layers. Other means for incorporating the wireless beacon into the garment may also be used, while maintaining the spirit of the present invention.

According to various embodiments of the present invention, a garment is used which includes a transmission pocket built into the garment. According to an embodiment, the digital communication technology resides in the pocket and uses a wireless communication protocol (e.g., iBeacon, RFID, NFC, etc.) to transmit messages to one or more nearby mobile devices. The pocket can reside, for example, within the garment (e.g., an internal slip pocket, etc.) or external to the garment (e.g., a pocket stitched on the outer surface of the garment, etc.). Such garments can be used in a variety of applications and contexts. For example, such garments can be worn by vendors, employees, volunteers, or other personnel and can be worn at sports arenas, entertainment centers, theaters, retailer venues, convenience stores, airports, race tracks, points of sale, and other locations.

According to an embodiment of the present invention, the message is delivered wirelessly from the garment to a mobile device through, for example, an application on the mobile device, a native resource (e.g., through a pop-up or other type of notification) on the mobile device, Bluetooth messaging, or a built-in mobile receiver. Other types of alert platforms may also be used while maintaining the spirit of the present invention. According to some embodiments, when a mobile device reaches the proximity of the garment, a message is delivered to the mobile device through the digital communication technology. The user of the mobile device can, according to some embodiments, view and interact with the message or associated information directly on the mobile device. According to yet more embodiments, the message includes instructions, links, or data that the mobile device uses to perform an action. For instance, the mobile device may retrieve content from a remote content server (e.g., via Internet) in response to receiving the indication from the digital communication technology in the garment. According to some embodiments, when the mobile device fetches content from a remote content server, it is routed first to a data server that captures pertinent device information. For example, the data server may identify gender, name, e-mail, device type, location, and other geo-based information based on the user or the mobile device. The data server can then redirect to a remote content server to transmit a message back to the mobile device.

According to some embodiments, the garment includes a garment design can be modified to include an additional pocket where a wireless beacon device can be placed. Thus, the wireless beacon can remain on the individual (e.g., a vendor, employee or other personnel) who wears the garment, which allows the wireless beacon to move with the individual, and the wireless beacon can wirelessly interact with mobile devices in proximity of the individual. According to some embodiments, the garment interacts with one or more mobile devices, being able send and/or receive data. Other types of interactions with the one or more mobile devices may also be implemented, while maintaining the spirit of the present invention.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1B:
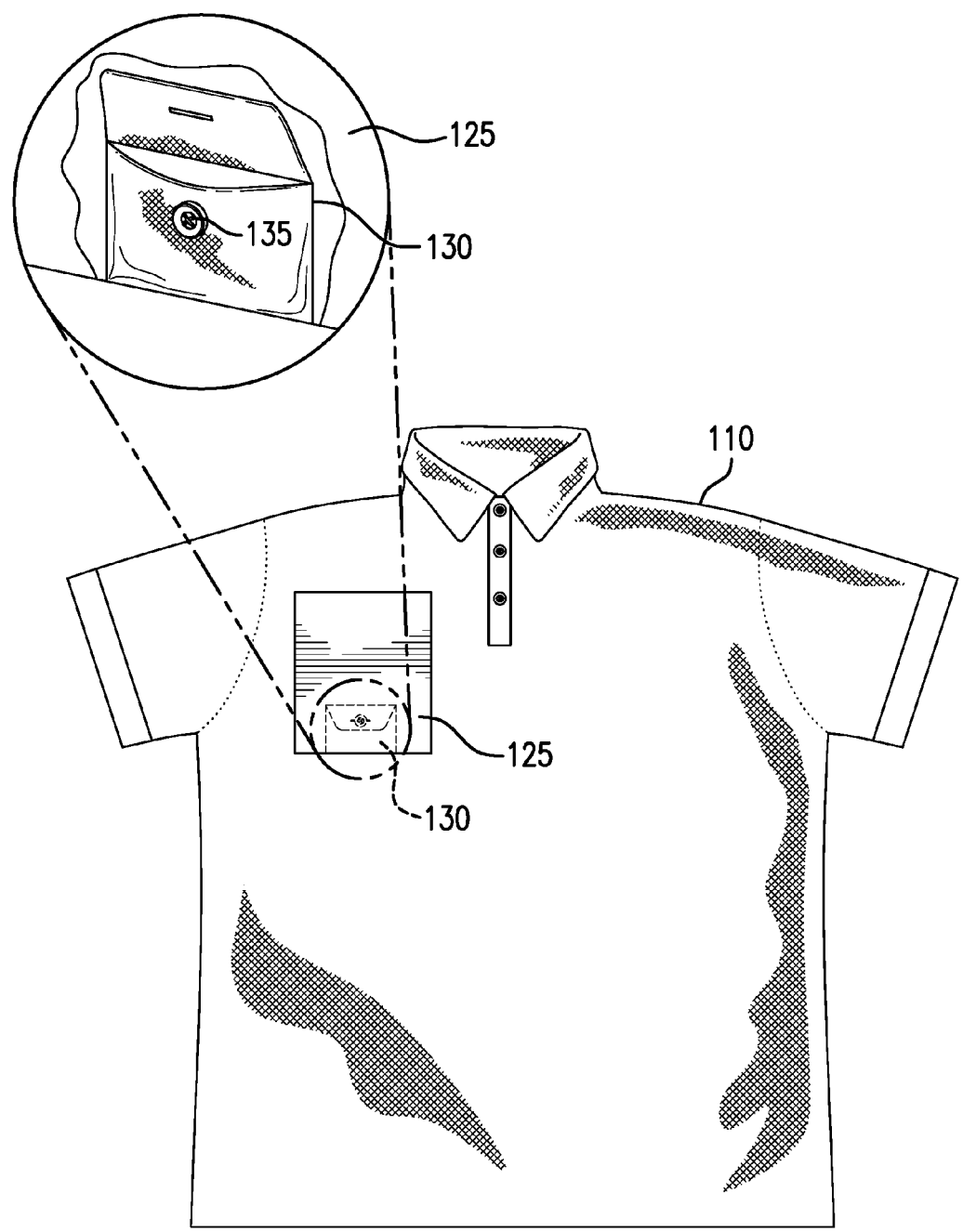

Referring now to FIGS. 1A-1B, front perspective views of a garment 110 having a display panel 120, surrounded by one or more flaps (FIG. 1A) or by no flaps (FIG. 1B), and a pocket 130 located on a front portion of the garment 110 and having a button fastener 135 is illustratively depicted, in accordance with an embodiment of the present invention.

According to embodiments of the present invention, the garment 110 is a polo shirt and includes a display panel 120 that displays visible content 125 and a pocket 130 having a button fastener 135. According to various embodiments, the garment 110 may include additional or different features and the features of the garment 110 may be arranged in another configuration, all while maintaining the spirit of the present invention. According to various other embodiments, the garment 110 does not include the display panel 120. According to an embodiment, the visual content 125 is the display panel 120. In other embodiments, the display panel 120 includes the visual content 125 and other components, while maintaining the spirit of the present invention.

According to various embodiments of the present invention, the pocket 130 is configured to house a wireless communication device 140 (e.g., a wireless beacon) (shown in FIGS. 2, 3A-C, 5, 7, 8A-C, and 10). The wireless communication device 140 is configured to wirelessly interact with external devices (not shown) in a communication system. The communication system may include mobile devices, a remote content server, and a communication network. The communication system may further include additional servers that can communicate over the communication network, such as, for example, a data server to obtain user analytics based on information received from the mobile devices. The communication system may further include additional or different features, and the features of the communication system may operate in another manner.

While garment 110 depicts a polo shirt, the garment 110 can be any type of shirt (e.g., polo shirt, jersey, etc.), vest, jacket, apron, pants, shorts, hoodie, covering, or other garment worn by an individual. According to some embodiments, the garment 110 can be or include an accessory such as, for example, a scarf, bowtie, necktie, hat, etc. According to various embodiments, the garment 110 is primarily made of fabric or other wearable material. Other types of materials may also be used for the garment 110, while maintaining the spirit of the present invention.

According to an embodiment, the display panel 120 is a removable panel that includes visible content 125. For instance, the display panel 120 can be fabric or another type of material and includes text or graphic content that is printed, stitched, dyed or otherwise incorporated into the display panel 120. According to some embodiments, the display panel 120 includes snaps, touch fasteners, or other types of fasteners that allow the display panel 120 to be removed or interchanged with other display panels 120 that, for instance, include other visible content 125.

According to an embodiment, the display panel 120 is secured to the garment 110 with a fastener such as, but not limited to, a pin assembly fastener, a snap fastener, a hook fastener, a touch fastener (e.g., VELCRO®, or another type of touch fastener), a magnetic fastener, a wire or cord fastener, etc. The display panel 120, once secured to the garment 110, can cover the pocket 130 so that the pocket 130 is not visible.

The pocket 130 can be a fabric slot or any other type of pocket-sized containing unit configured to receive the wireless beacon 140. According to an embodiment, the pocket 130 includes an opening configured to allow the wireless beacon 140 to be quickly removed or inserted if the wireless beacon 140 needs, for example, charging, battery replacement, reprogramming, or other types of maintenance. According to some embodiments, the wireless beacon 140 is configured to be easily interchanged with other wireless beacons 140, for instance, each time the display panel 120 is updated or interchanged. For example, in cases where the message transmitted by the wireless beacon 140 and the visible content 125 on the display panel 120 are coordinated, one or both of them can be replaced to update the garment 110 with new content or information According to the embodiment shown in FIG. 1A, the display panel 120 is located on the front chest of a shirt (the garment 110). The garment 110 can include a display panel 120 in another location. For example, a display panel 120 can be located on a sleeve, a front or back panel, a shoulder, a collar, etc. Other types of garments (e.g., pants, vests, aprons, etc.) may include a display panel 120 in these or other types of visible locations.

Figure 1C:
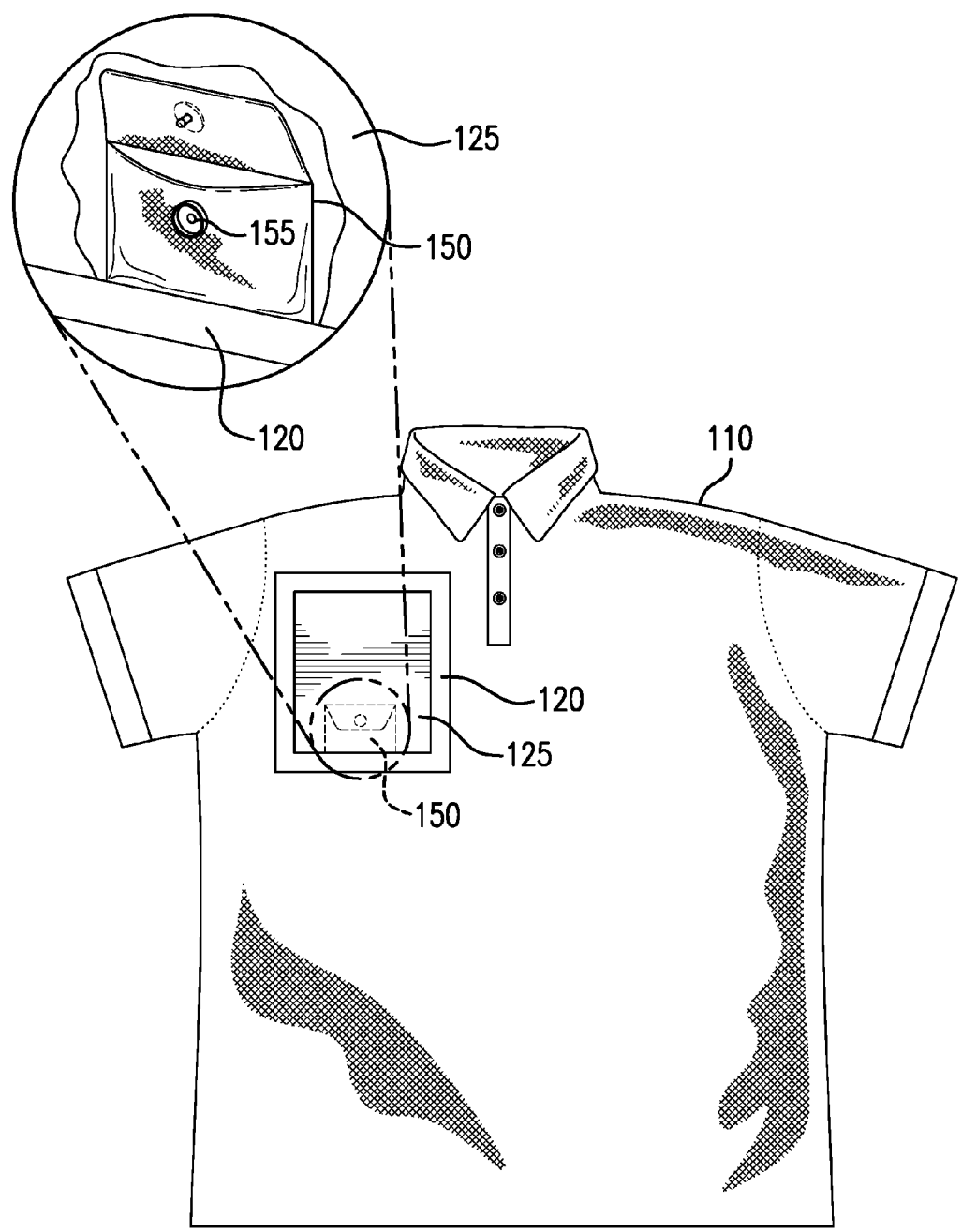
FIGS. 1C-1D show front perspective views of a garment having a display panel and a pocket located on a front portion of the garment and having a snap fastener, according to an embodiment of the present invention.
Figure 1D:
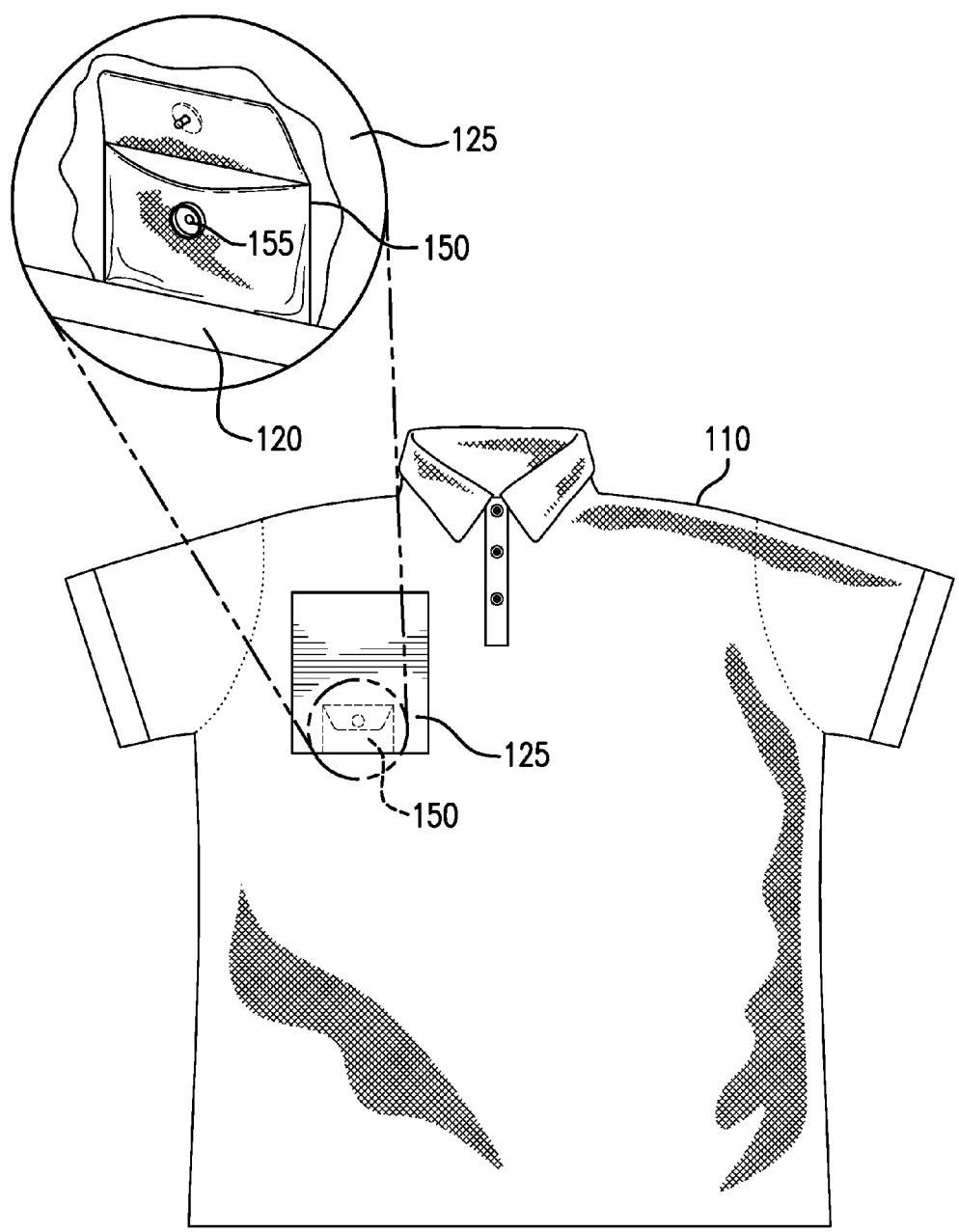

Referring now to FIGS. 1C-1D, front perspective views of garment 110 (shown in FIG. 1A) having a display panel 120, surrounded by one or more flaps (FIG. 1C) or by no flaps (FIG. 1D), and a pocket 150 located on a front portion of the garment 110 and having a snap fastener 155 is illustratively depicted, in accordance with an embodiment of the present invention. According to an embodiment, pocket 150 is configured to receive wireless beacon 140 (shown in FIGS. 2, 3A-C, 5, 7, 8A-C, and 10).

Figure 1E:
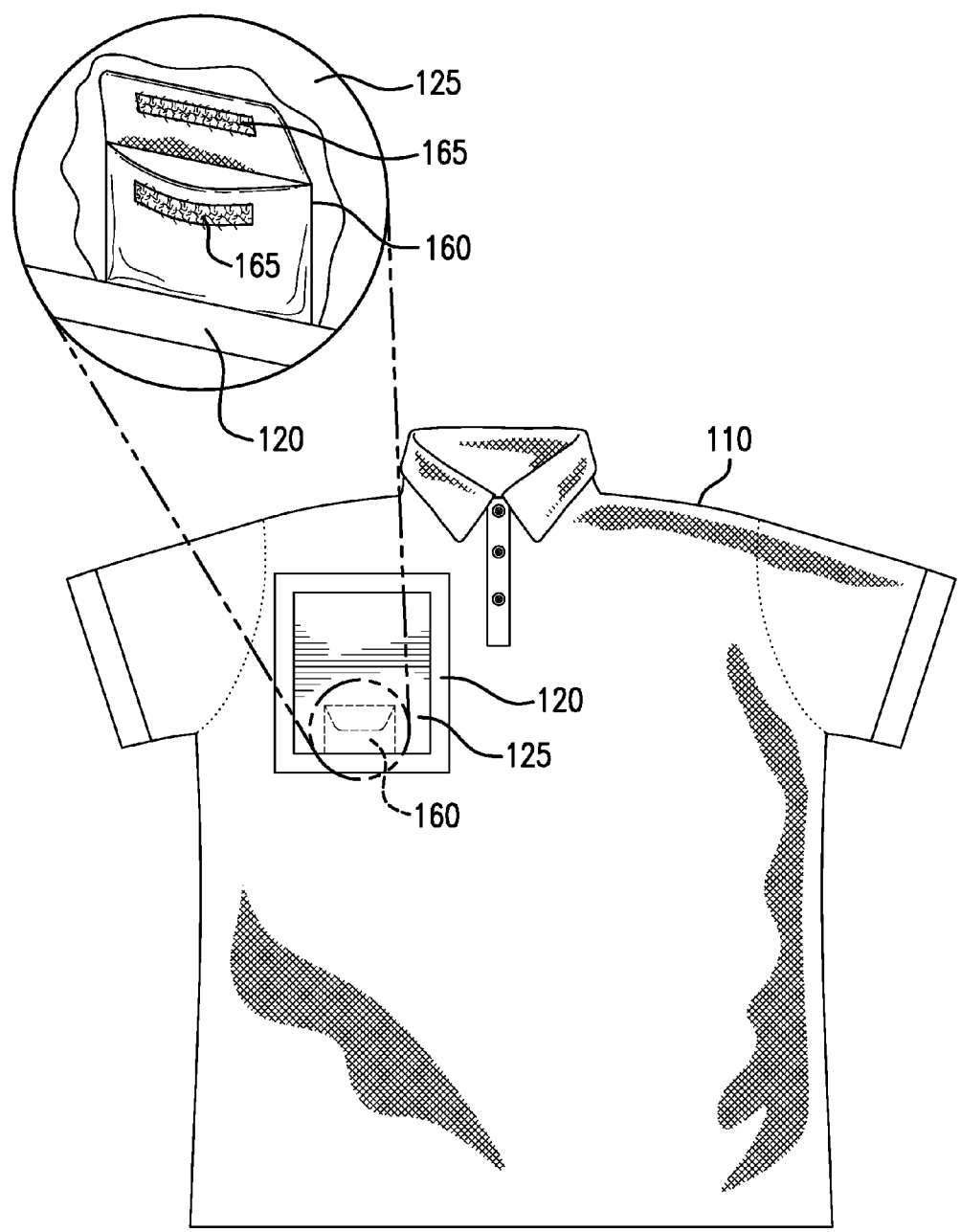
FIG. 1E-1F show front perspective views of a garment having a display panel and a pocket located on a front portion of the garment and having a hook and loop fastener, according to an embodiment of the present invention.
Figure 1F:
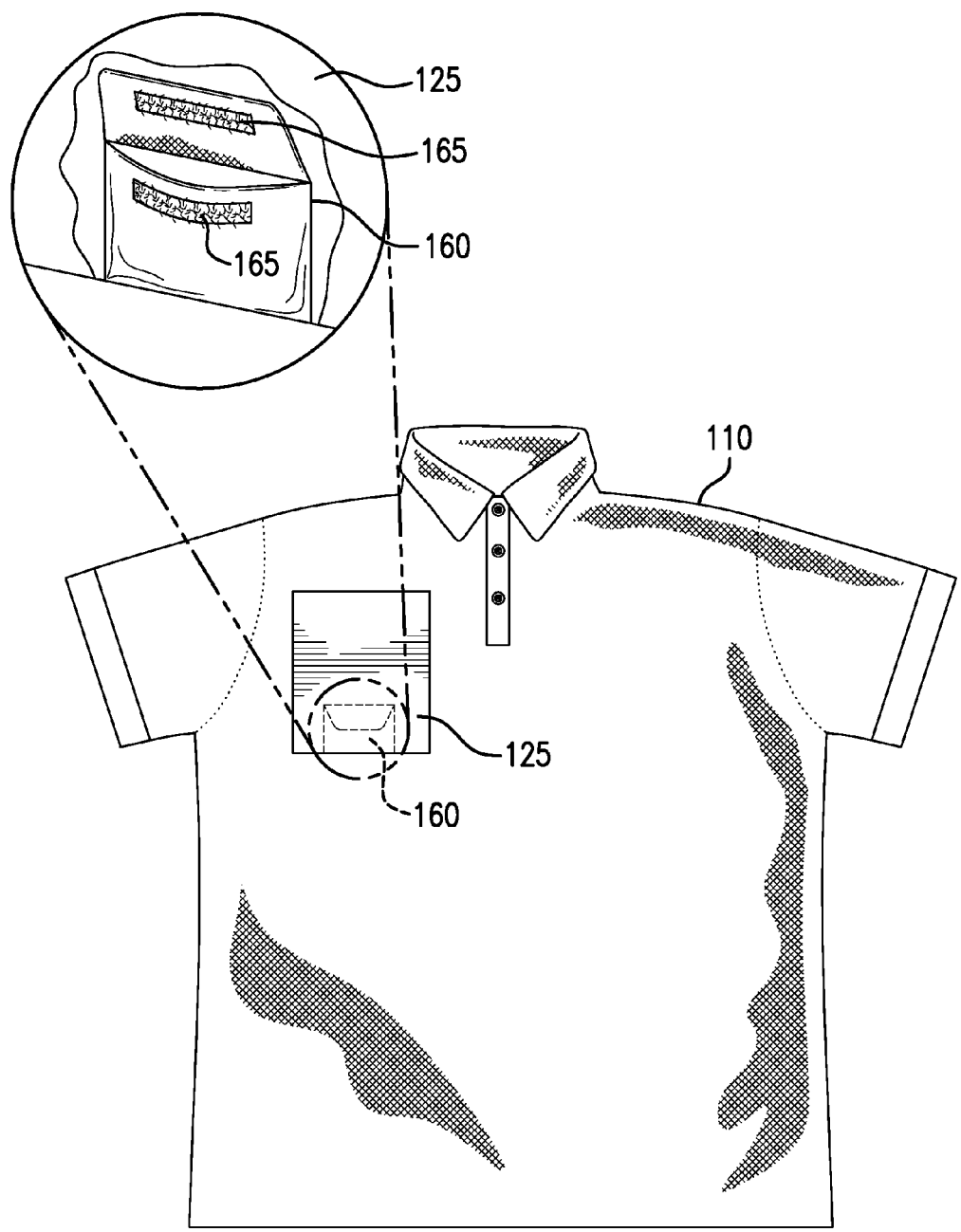

Referring now to FIGS. 1E-1F, front perspective views of garment 110 having a display panel 120, surrounded by one or more flaps (FIG. 1E) or by no flaps (FIG. 1F), and a pocket 160 located on a front portion of the garment 110 and having a hook and loop fastener 165 is illustratively depicted, in accordance with an embodiment of the present invention. According to an embodiment, pocket 160 is configured to receive wireless beacon 140 (shown in FIGS. 2, 3A-C, 5, 7, 8A-C, and 10).

While FIGS. 1A-1F show embodiments wherein the pockets (130, 150, 160) have button fasteners, snap fasteners, and hook and loop fasteners, other fasteners may also be implemented. For example, the garment 110 can have a pocket having fasteners such as, but not limited to, a pin assembly fastener, a snap fastener, a hook fastener, a touch fastener (e.g., VELCRO®, or another type of touch fastener), a magnetic fastener, a wire or cord fastener, etc.

Figure 2:
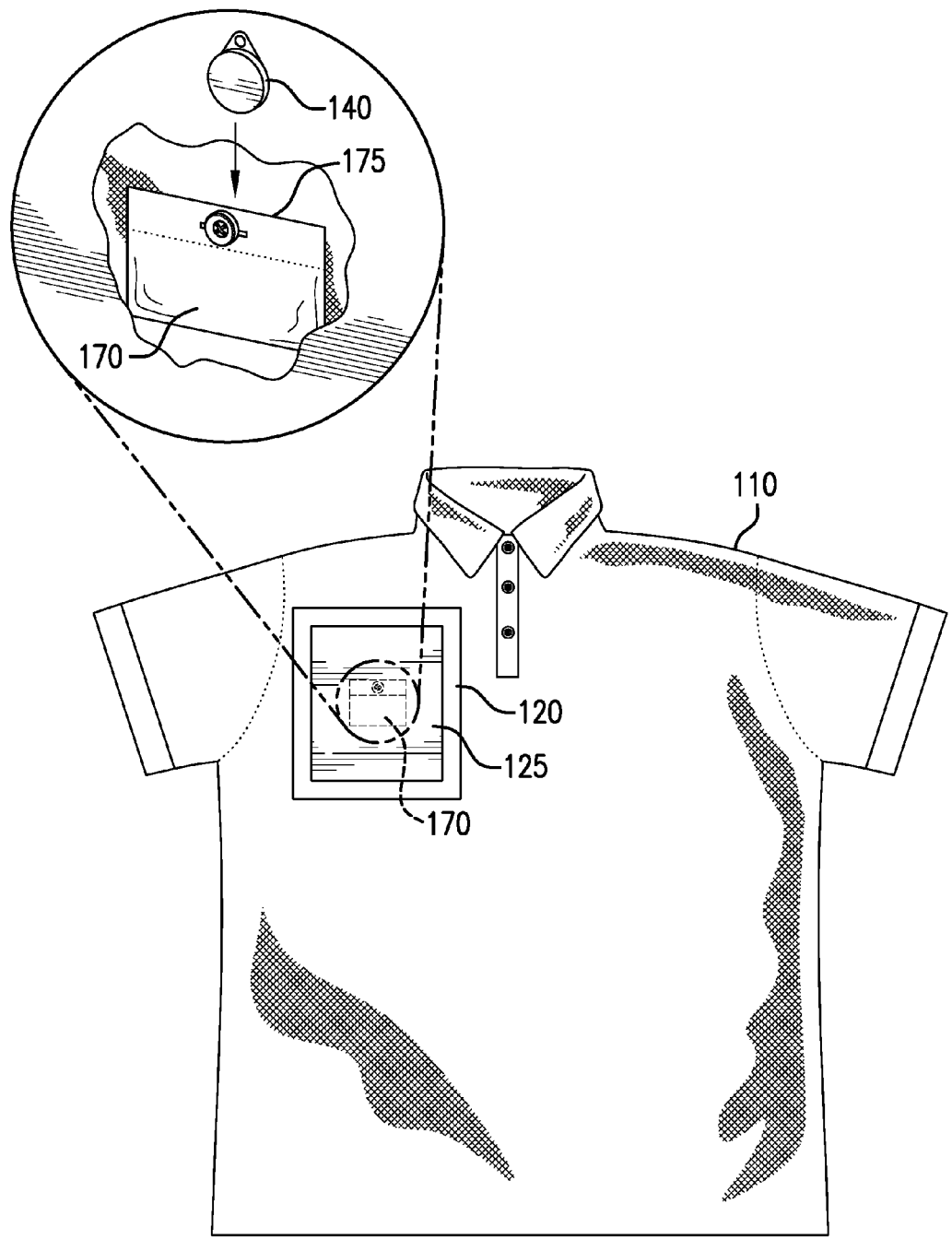
FIG. 2 shows a front perspective view of a garment having a display panel and a pocket having a slip opening for receiving a wireless beacon, according to an embodiment of the present invention.

Referring now to FIG. 2, a front perspective view of garment 110 having a display panel 120 and a pocket 170 having a slip opening 175 for receiving a wireless beacon 140 is illustratively depicted, in accordance with an embodiment of the present invention.

According to an embodiment, pocket 170 is built into garment 110 and has a slip opening 175 at the top of pocket 170 that is configured to receive wireless beacon 140.

The wireless beacon 140 can be an active or passive wireless transmitter device. According to an embodiment, the wireless beacon 140 wirelessly transmits digital messages to one or more mobile devices. According to some embodiments, the wireless beacon 140 uses a short-range wireless communication protocol to communicate with the mobile devices. Examples of short-range wireless communication protocols include the iBeacon protocol developed by Apple, any of the BLUETOOTH® standards developed by the Bluetooth Special Interest Group, the 802.11 family of standards developed by IEEE, and the Near Field Communication (NFC) standards developed by the NFC Forum, among others. According to an embodiment, the wireless beacon 140 wirelessly transmits one or more digital messages to each of one or more mobile devices that comes within a predefined distance from the wireless communication device.

According to an embodiment, the wireless beacon 140 includes a battery or other internal power supply. According to other embodiments, the wireless beacon 140 may include a memory or another type of digital data storage component. The wireless beacon 140 may also include a wireless transmitter that wirelessly transmits messages at radio frequencies or another frequency ranges.

According to some embodiments of the present invention, the wireless beacon 140 includes a housing (e.g., a plastic shell or other type of housing) that houses a battery and electronic circuitry configured to wirelessly transmit the message. The housing can have a small, thin shape that is easily accommodated in the pocket (130, 150, 160, 170, 210, 220, 230, 240, 250, 330, 350, 360, 370, 410, 420, 430, 440, 450) of the garment (110, 310). According to some embodiments, the wireless beacon 140 may be less than 1 inch, less than 2 inches, or less than 3 inches in its largest dimension (e.g., length, width, diameter). According to some embodiments, the wireless beacon 140 may be less than 0.25 inches, less than 0.5 inches or less than 1 inch in its smallest dimension (e.g., thickness or depth). However, other dimensions may also be used, while maintaining the spirit of the present invention.

According to some embodiments, the wireless beacon 140 includes a BLUETOOTH® Low Energy device that is configured to broadcast an identifier to nearby mobile devices. The identifier may cause the mobile device to execute instructions, fetch content, display information, or take other action.

According to some embodiments, the message transmitted by the wireless beacon 140 coordinates with (e.g., complements, supplements, reinforces, etc.) the visual content 125 on the display panel 120. For example, the visual content 125 may prompt a user to download an app, and the message transmitted by the wireless beacon 140 may include a link to download the app from, for example, an app store. According to some embodiments, the visual content 125 displays products, services, or promotions, and the message transmitted by the wireless beacon 140 includes a link to a related product or service description or coupons.

According to some embodiments, the wireless beacon 140 is configured to automatically send a stored message to any wireless device that is within range and able to detect wireless transmissions from the wireless beacon 140. The stored message can be an identifier, an address (e.g., a uniform resource locator (URL), a uniform resource name (URN), etc.), a text message, a media message, or any other type of message stored in the memory of the wireless beacon 140. According to several embodiments, the range of the wireless beacon 140 may be, for example, six inches, 1 foot, 10 feet, 100 feet, or longer, in some instances.

According to an embodiment, the wireless beacon 140 is located on the front chest of a shirt behind the display panel 120. The wireless beacon 140 can also be located on another location. For example, according to various embodiments, the wireless beacon 140 may be located on a sleeve, a front or back panel, a shoulder, a collar, etc. Other types of garments (e.g., pants, vests, aprons, etc.) may include a wireless beacon 140 in these or other types of locations. According to some embodiments, the wireless beacon 140 is incorporated in the garment without a display panel 120 or in a garment that includes a display panel 120 in a location different from that of the wireless beacon 140.

According to the embodiment shown in FIG. 2, the wireless beacon 140 resides in a pocket 170 located within the garment 110. According to an embodiment, the wireless beacon 140 may be secured to the garment 110 in another manner. For example, the wireless beacon 140 may be affixed or fastened to the garment 110 by a pin assembly, a snap, a hook, a stitching, a touch fastener (e.g., VELCRO®, or another type of touch fastener), a magnetic fastener, or a wire or cord fastener. Other types of fasteners may also be used to secure the wireless beacon 140 to the garment 110, while maintaining the spirit of the present invention. In some cases, the wireless beacon 140 is incorporated into the garment 110 in a seam, between fabric layers, etc.

The mobile devices may include any type of device or component that has the capability of receiving wireless messages. Examples of wireless devices include, but are not limited to, various types of mobile telecommunication devices, smartphones, smartcards, smart watches, identification devices, media players, headsets, personal digital assistants (PDAs), laptops, notebooks, tablets, phablets, etc.

According to some embodiments, the wireless beacon 140 interacts with mobile devices and provides other types of functionalities. For example, the message transmitted from the wireless beacon 140 to the mobile device may cause the mobile device to display a message to the user of the mobile device, fetch content from a remote address, request input from the user of the mobile device, or perform another action in accordance with the present invention. According to some embodiments, the wireless beacon 140 provides other types of functionalities.

According to various embodiments of the present invention, the content server includes one or more computing devices (e.g., Internet servers, server clusters, etc.) that can serve content over the communication network. According to an embodiment, the mobile devices interact with the content server by communicating over the communication network. For example, various mobile devices can be configured to communicate over Wireless Local Area Networks (WLANs), Personal Area Networks (PANs) (e.g., Bluetooth and other short-range communication systems), metropolitan area networks, public land mobile networks using cellular technology (e.g., Global System for Mobile Communication (GSM), Universal Mobile Telecommunication Services (UMTSs), Long-Term Evolution (LTE), etc.), and other types of wireless networks. In some cases, the communication network 107 can utilize one or more communication protocol standards such as, for example, 3G, 4G, GSM, CDMA, GPRS, EDGE, and LTE.

According to another aspect of the present invention, the wireless beacon 140 is housed within a fuel pump apparatus. This beacon 140 is configured to send notifications and other types of information to a user on one or more devices. This enables the beacon 140 to attempt to draw one or more users from the fuel pump apparatus to one or more stores.

According to an embodiment, the pocket 170 and/or the slip opening 175 are positioned behind the display panel 120.

Figure 3A:
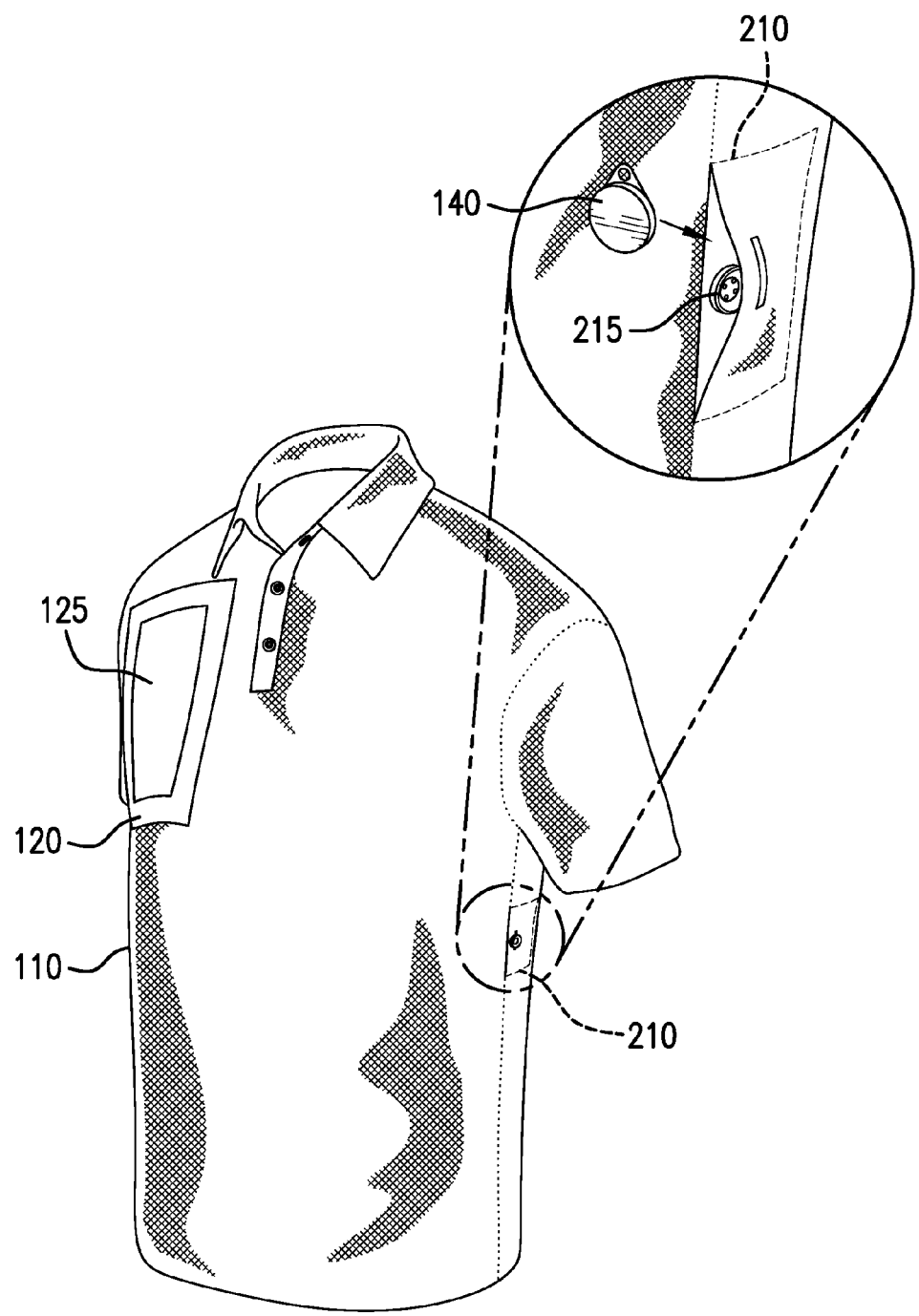
FIG. 3A shows an off-side perspective view of a garment having a display panel and a pocket located along a side seam and having a button fastener, according to an embodiment of the present invention.

Referring now to FIG. 3A, an off-side perspective view of the garment 110 having a display panel 120 and a pocket 210 located along a side seam and having a button fastener 215 is illustratively depicted, in accordance with an embodiment of the present invention.

Figure 3B:
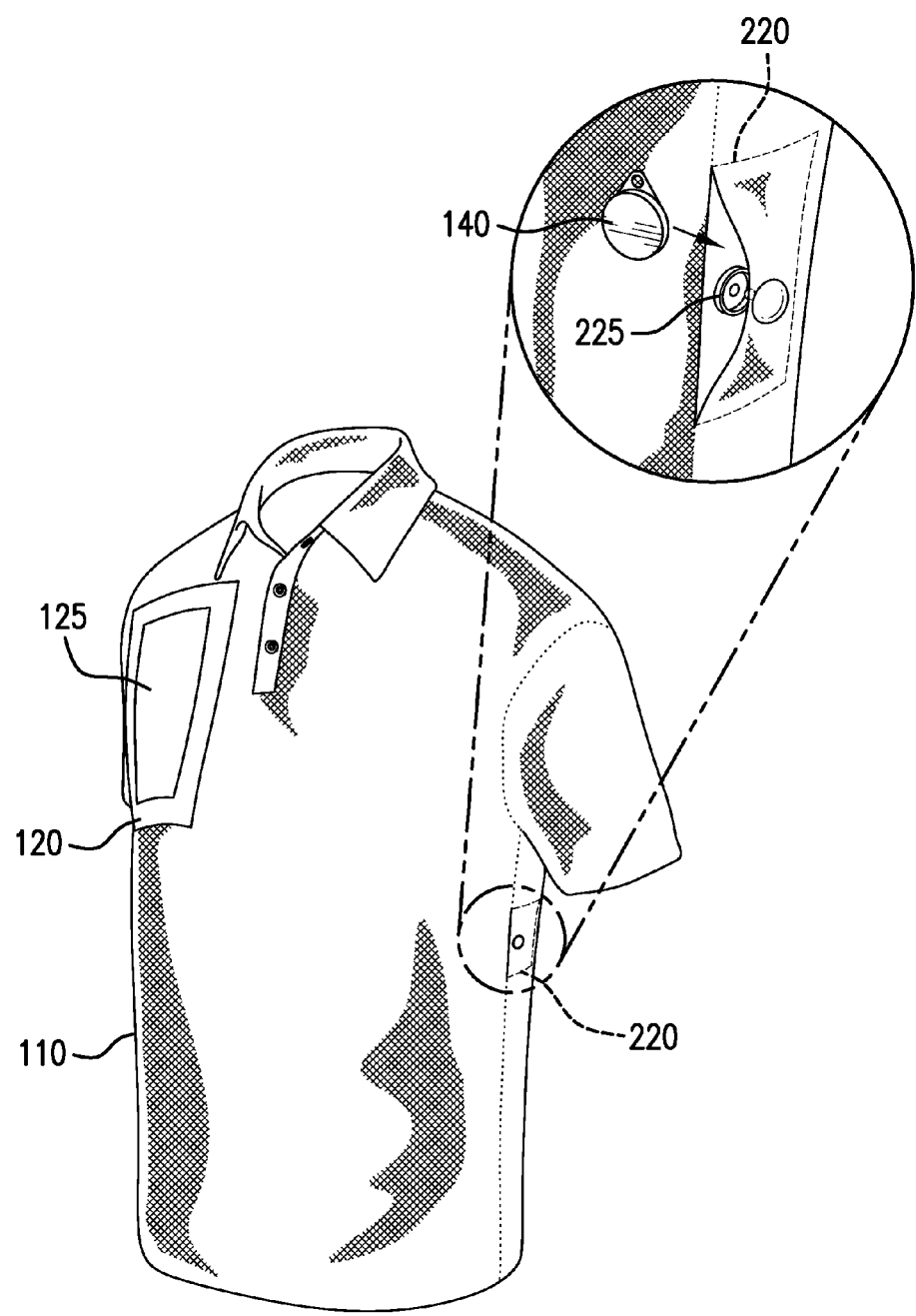
FIG. 3B shows an off-side perspective view of a garment having a display panel and a pocket located along a side seam and having a snap fastener, according to an embodiment of the present invention.

Referring now to FIG. 3B, an off-side perspective view of the garment 110 having a display panel 120 and a pocket 220 located along a side seam and having a snap fastener 225 is illustratively depicted, in accordance with an embodiment of the present invention.

Figure 3C:
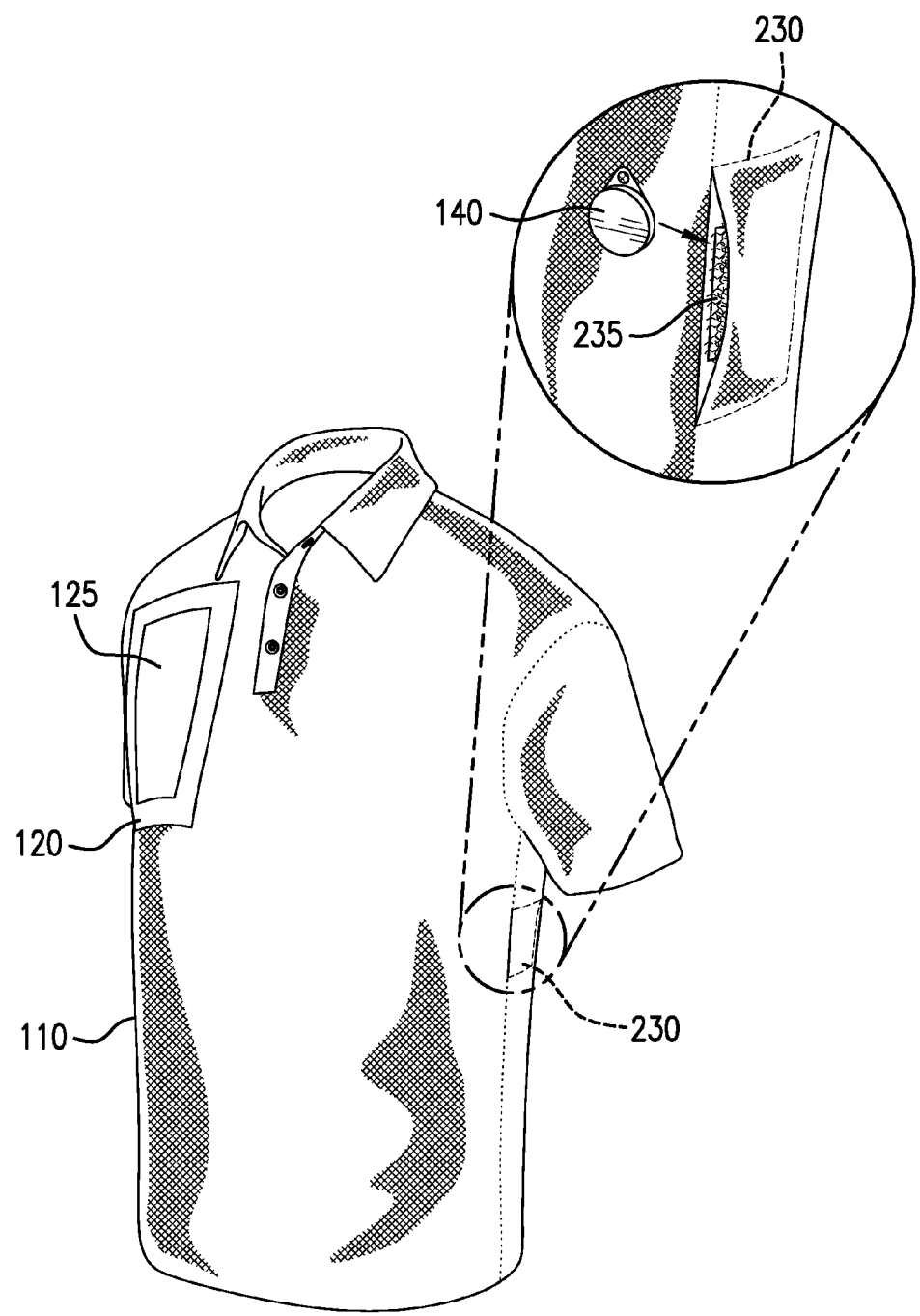
FIG. 3C shows an off-side perspective view of a garment having a display panel and a pocket located along a side seam and having a hook and loop fastener, according to an embodiment of the present invention.

Referring now to FIG. 3C, an off-side perspective view of the garment 110 having a display panel 120 and a pocket 230 located along a side seam and having a hoop and loop fastener is illustratively depicted, in accordance with an embodiment of the present invention.

While FIGS. 3A, 3B, and 3C show embodiments wherein the pockets (210, 220, 230) have button fasteners, snap fasteners, and hook and loop fasteners, other fasteners may also be implemented. For example, the garment 110 can have a pocket having fasteners such as, but not limited to, a pin assembly fastener, a snap fastener, a hook fastener, a touch fastener (e.g., VELCRO®, or another type of touch fastener), a magnetic fastener, a wire or cord fastener, etc.

Figure 4:
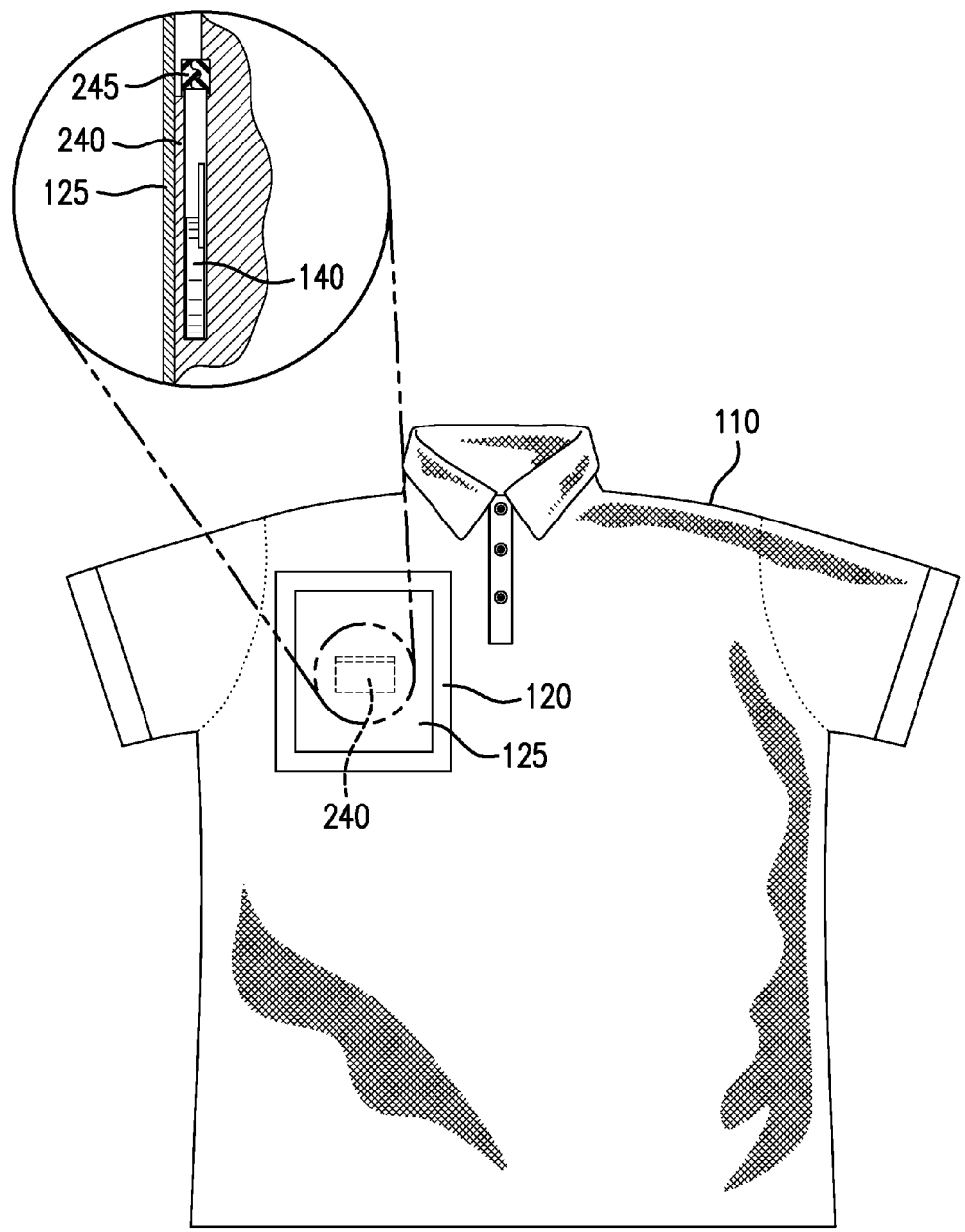
FIG. 4 shows a front perspective view of a garment having a display panel and a pocket located on a front portion of the garment and having a water-resistant seal, according to an embodiment of the present invention.

Referring now to FIG. 4, a front perspective view of the garment 110 having a display panel 120 and a pocket 240 located on a front portion of the garment 110 and having a water-resistant seal 245 is illustratively depicted, in accordance with an embodiment of the present invention.

According to various embodiments of the present invention, pocket 240 creates a water resistant seal 245 and/or is made of a water resistant material. This enables the garment 110 to become wet while keeping the wireless beacon 140 dry, thus helping prevent damage to the wireless beacon 140 caused by unwanted liquid contact.

According to an embodiment, the pocket 240 and/or the water resistant seal 245 are positioned behind the display panel 120.

Figure 5A:
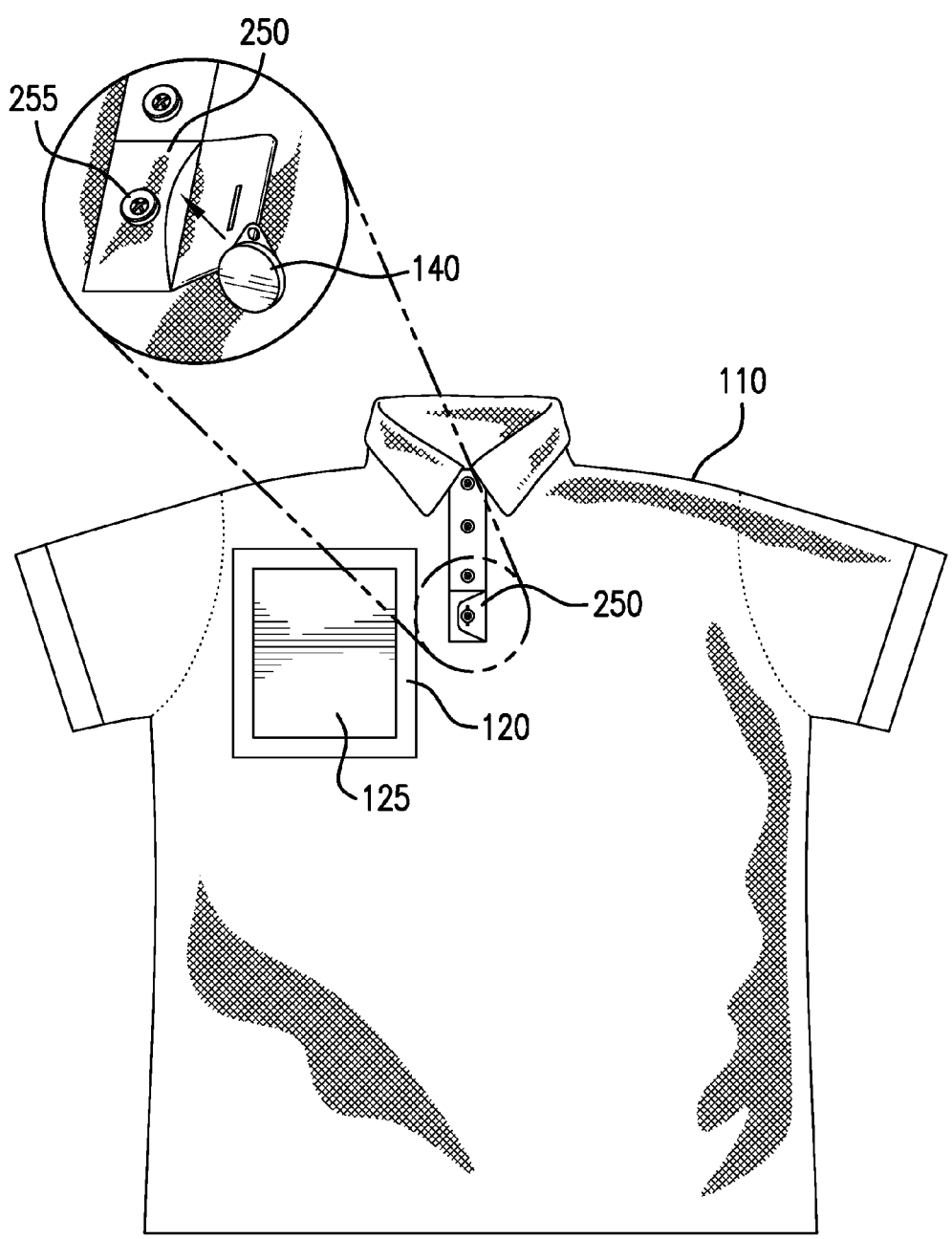
FIGS. 5A-5B show front perspective views of a garment having a display panel and a pocket located along an upper portion of the garment, according to an embodiment of the present invention.
Figure 5B:
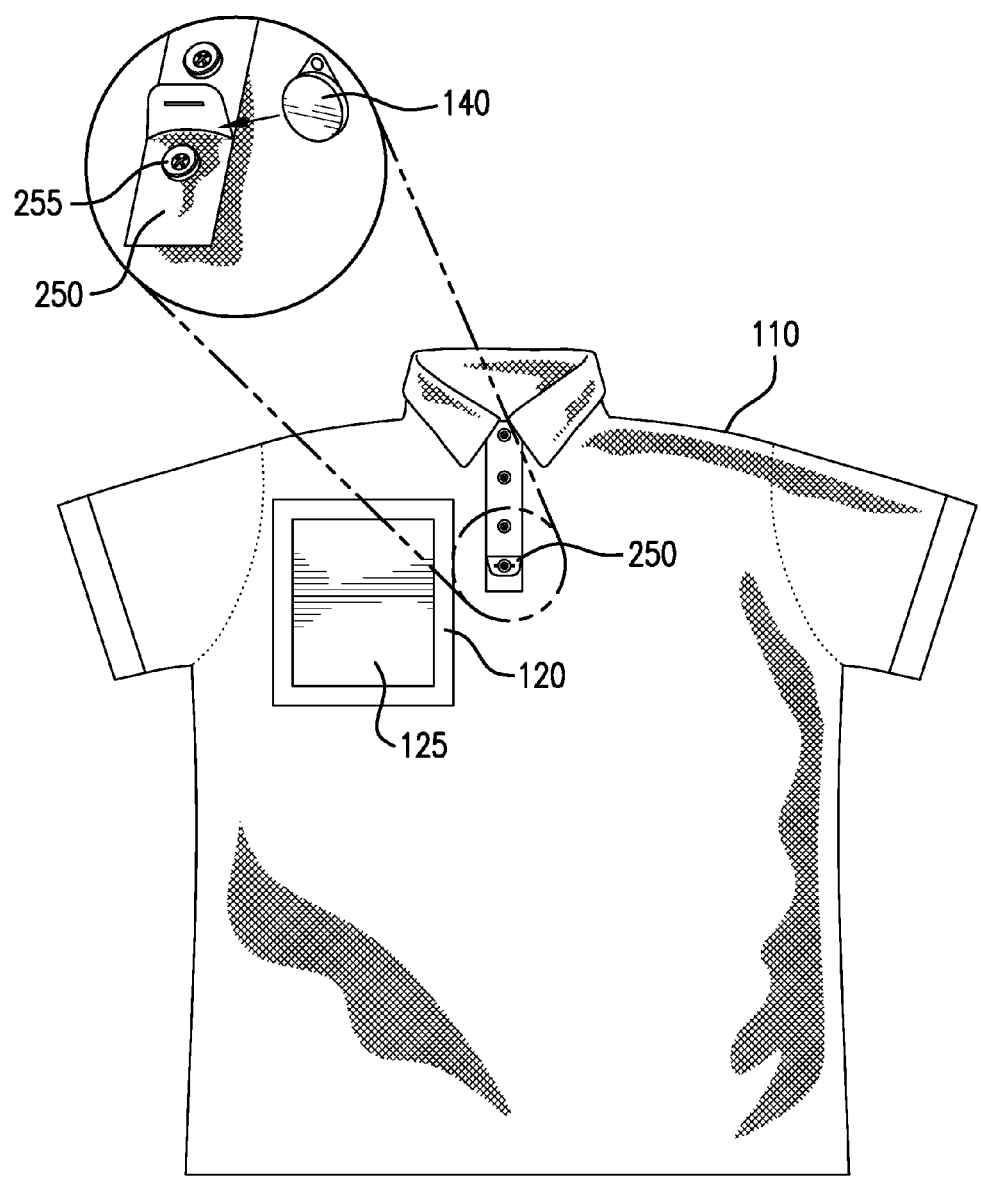

Referring now to FIGS. 5A-5B, front perspective views of the garment 110 having a display panel 120 and a pocket 250 located along an upper portion of the garment 110 is illustratively depicted, in accordance with an embodiment of the present invention.

According to the embodiment shown in FIG. 5A, the pocket 250 is located along the buttons of the garment 110 and opens perpendicular to the axis of the seam. According to the embodiment shown in FIG. 5B, the pocket 250 is located along the buttons of the garment 110 and opens parallel to the axis of the seam. However, the pocket 250 could be located on other locations along the upper portion of the garment 110. Also, according to the embodiments shown in FIGS. 5A-5B, the pocket 250 includes a snap fastener 255 and is configured to house the wireless beacon 140. However, other types of fasteners may be incorporated into the pocket such as, but not limited to, a pin assembly fastener, a snap fastener, a hook fastener, a touch fastener (e.g., VELCRO®, or another type of touch fastener), a magnetic fastener, a wire or cord fastener, etc.

Figure 6A:
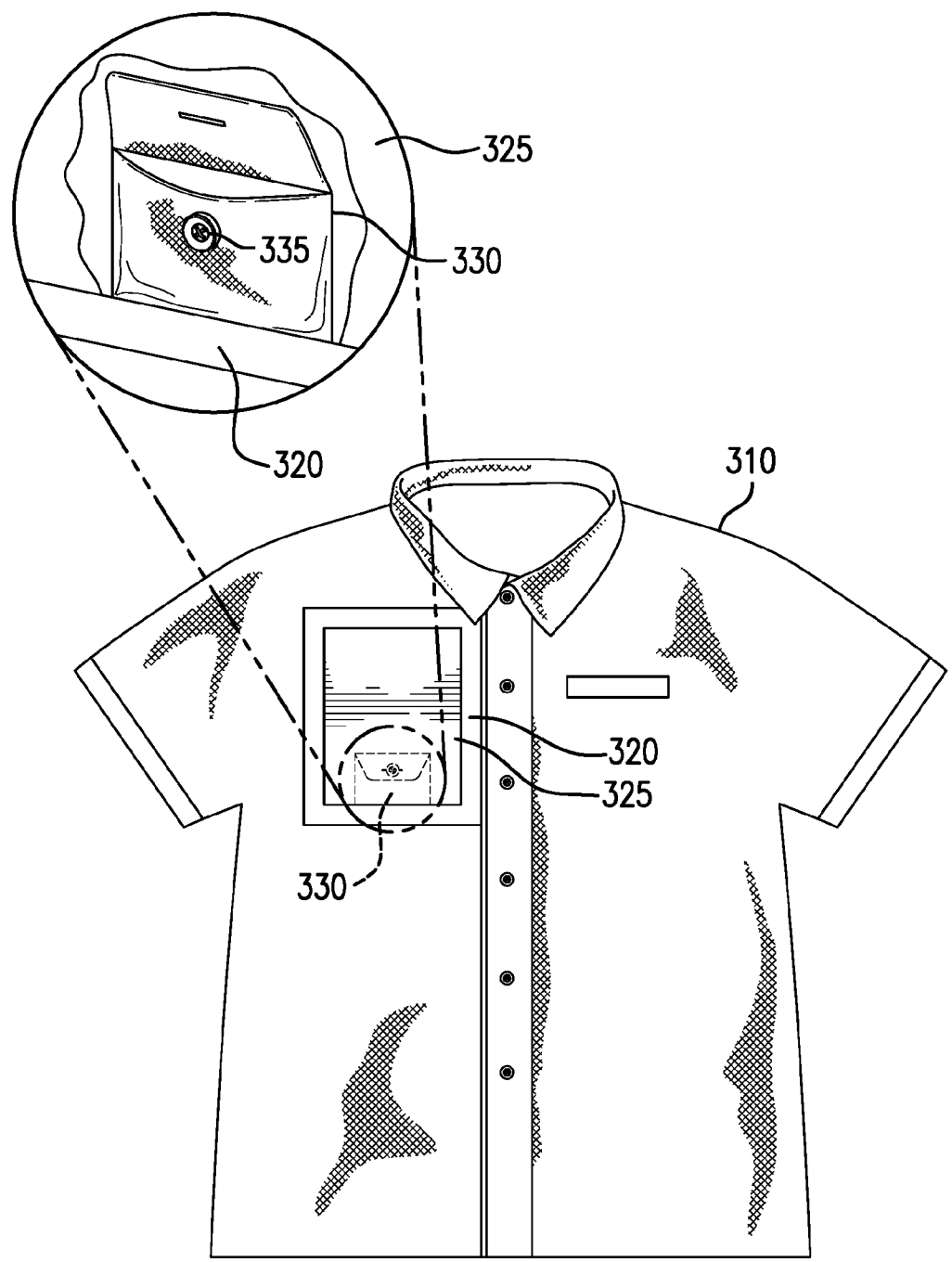
FIG. 6A-6B show front perspective views of a garment having a display panel and a pocket located on a front portion of the garment and having a button fastener, according to an embodiment of the present invention.
Figure 6B:
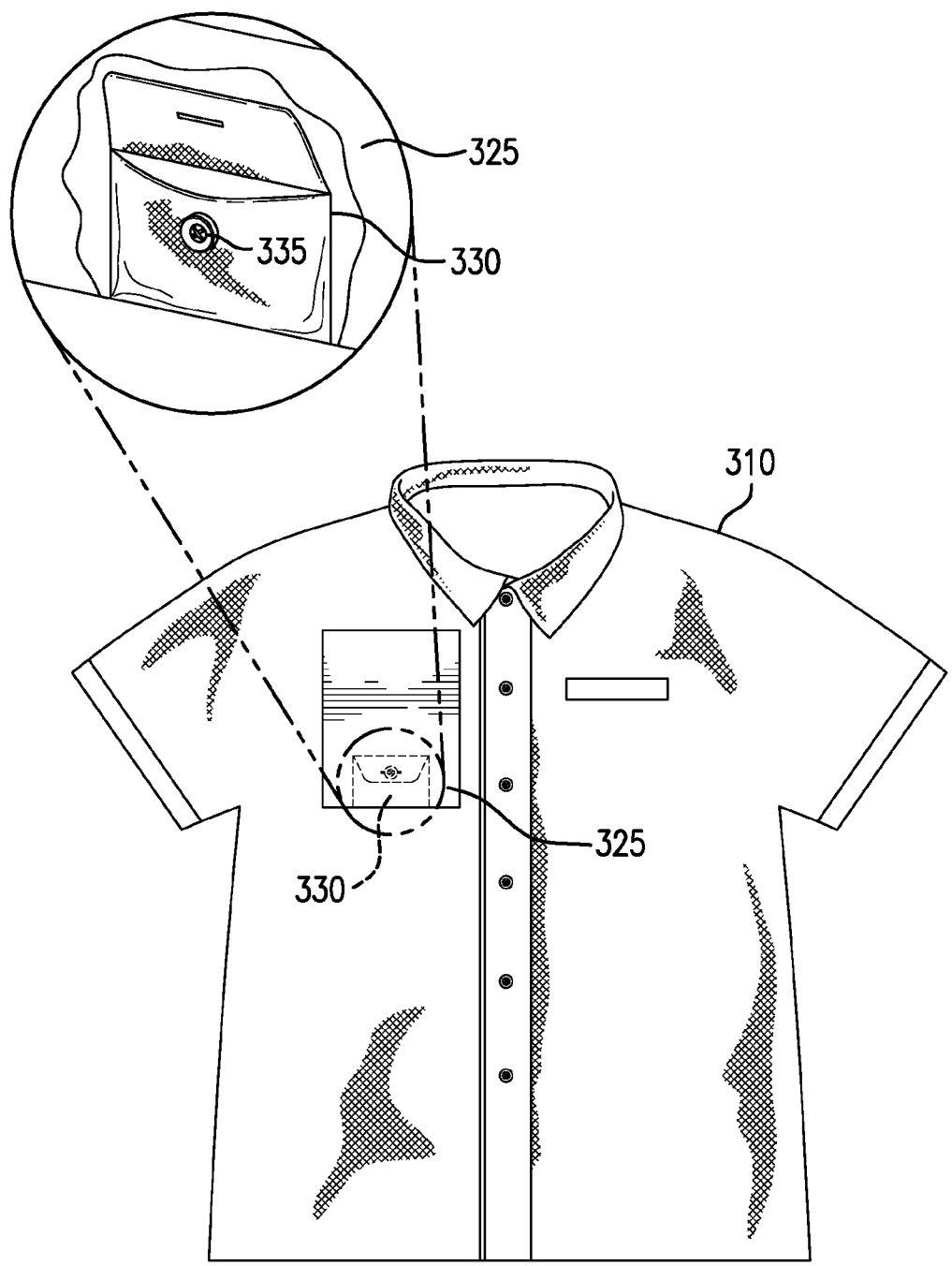

Referring now to FIGS. 6A-6B, front perspective views of a garment 310 having a display panel 320, surrounded by one or more flaps (FIG. 6A) or by no flaps (FIG. 6B), and a pocket 330 located on a front portion of the garment 310 and having a button fastener 335 is illustratively depicted, in accordance with an embodiment of the present invention.

According to embodiments of the present invention, the garment 310 is a button-down shirt and includes a display panel 320 that displays visible content 325 and a pocket 330 having a button fastener 335. According to various embodiments, the garment 310 may include additional or different features and the features of the garment 310 may be arranged in another configuration, all while maintaining the spirit of the present invention. According to various other embodiments, the garment 310 does not include the display panel 320.

According to various embodiments of the present invention, the pocket 330 is configured to house the wireless communication device 140 (e.g., a wireless beacon) (shown in FIGS. 2, 3A-C, 5, 7, 8A-C, and 10).

While garment 310 depicts a button-down shirt, the garment 310 can be any type of shirt (e.g., polo shirt, jersey, etc.), vest, jacket, apron, pants, shorts, hoodie, covering, or other garment worn by an individual. According to some embodiments, the garment 310 can be or include an accessory such as, for example, a scarf, bowtie, necktie, hat, etc. According to various embodiments, the garment 310 is primarily made of fabric or other wearable material. Other types of materials may also be used for the garment 310, while maintaining the spirit of the present invention.

According to an embodiment, the display panel 320 is a removable panel that includes visible content 325. For instance, the display panel 320 can be fabric or another type of material and includes text or graphic content that is printed, stitched, dyed or otherwise incorporated into the display panel 320. According to some embodiments, the display panel 320 includes snaps, touch fasteners, or other types of fasteners that allow the display panel 320 to be removed or interchanged with other display panels 320 that, for instance, include other visible content 325.

According to an embodiment, the display panel 320 is secured to the garment 310 with a fastener such as, but not limited to, a pin assembly fastener, a snap fastener, a hook fastener, a touch fastener (e.g., VELCRO®, or another type of touch fastener), a magnetic fastener, a wire or cord fastener, etc. The display panel 320, once secured to the garment 310, can cover the pocket 330 so that the pocket 330 is not visible.

The pocket 330 can be a fabric slot or any other type of pocket-sized containing unit configured to receive the wireless beacon 140. According to an embodiment, the pocket 330 includes an opening configured to allow the wireless beacon 140 to be quickly removed or inserted if the wireless beacon 140 needs, for example, charging, battery replacement, reprogramming, or other types of maintenance. According to some embodiments, the wireless beacon 140 is configured to be easily interchanged with other wireless beacons 140, for instance, each time the display panel 320 is updated or interchanged. For example, in cases where the message transmitted by the wireless beacon 140 and the visible content 325 on the display panel 320 are coordinated, one or both of them can be replaced to update the garment 310 with new content or information According to the embodiment shown in FIG. 6A, the display panel 320 is located on the front chest of a shirt (the garment 310). The garment 310 can include a display panel 320 in another location. For example, a display panel 320 can be located on a sleeve, a front or back panel, a shoulder, a collar, etc. Other types of garments (e.g., pants, vests, aprons, etc.) may include a display panel 320 in these or other types of visible locations.

Figure 6C:
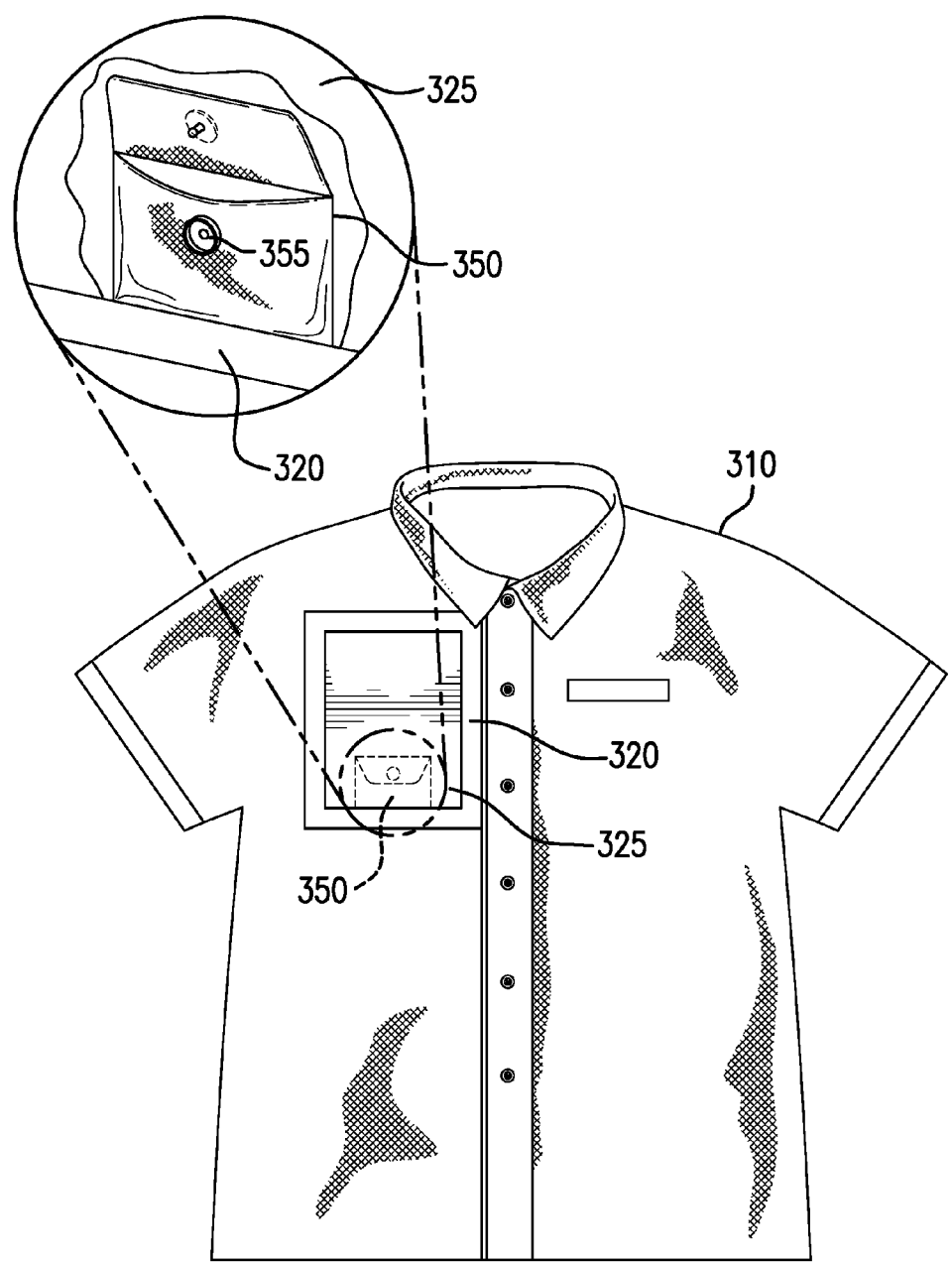
FIG. 6C-6D show front perspective views of a garment having a display panel and a pocket located on a front portion of the garment and having a snap fastener, according to an embodiment of the present invention.
Figure 6D:
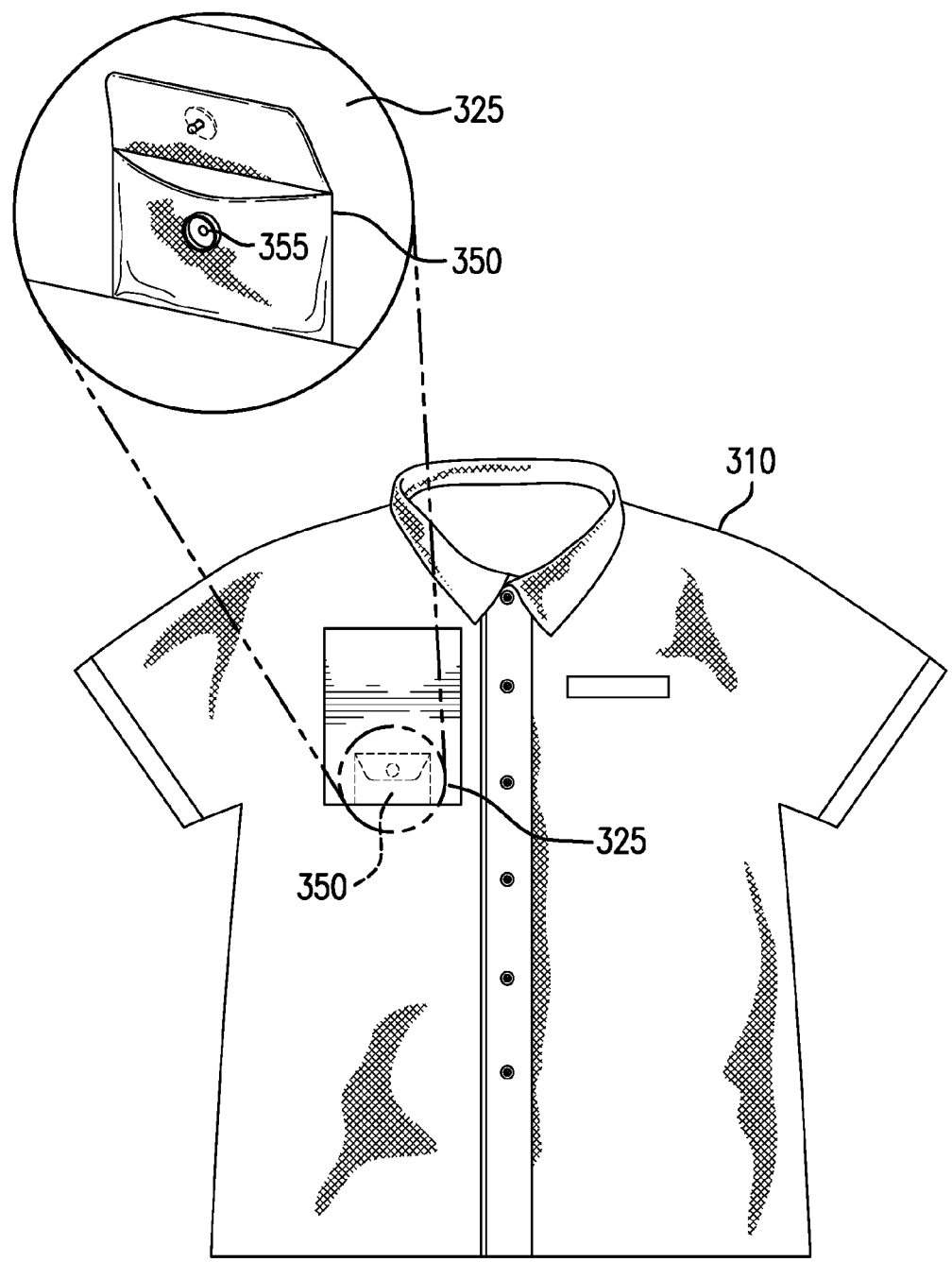

Referring now to FIGS. 6C-6D, front perspective views of garment 310 (shown in FIG. 6A) having a display panel 320, surrounded by one or more flaps (FIG. 6C) or by no flaps (FIG. 6D), and a pocket 350 located on a front portion of the garment 310 and having a snap fastener 355 is illustratively depicted, in accordance with an embodiment of the present invention. According to an embodiment, pocket 350 is configured to receive wireless beacon 140 (shown in FIGS. 2, 3A-C, 5, 7, 8A-C, and 10).

Figure 6E:
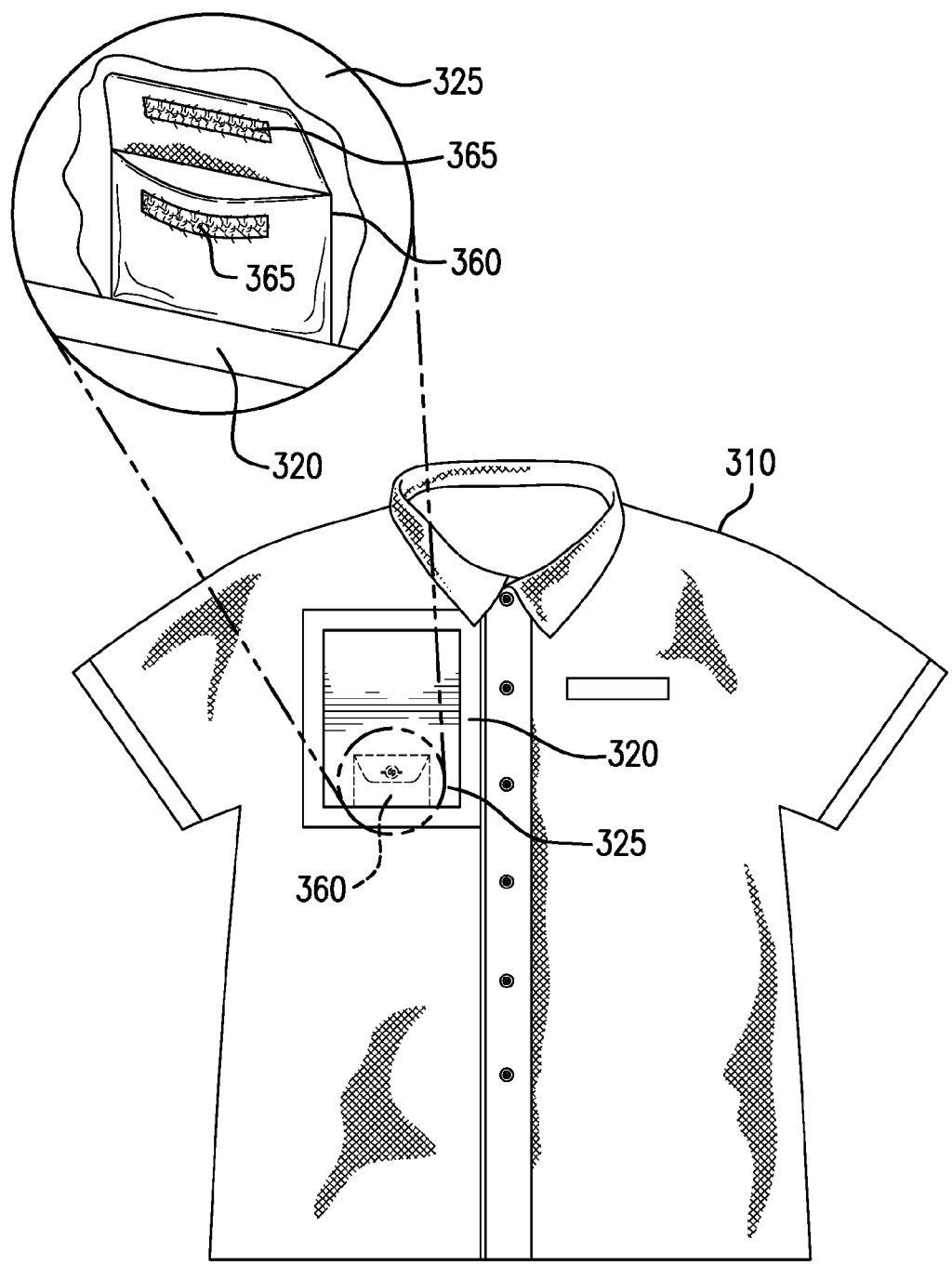
FIG. 6E-6F show front perspective views of a garment having a display panel and a pocket located on a front portion of the garment and having a hook and loop fastener, according to an embodiment of the present invention.
Figure 6F:
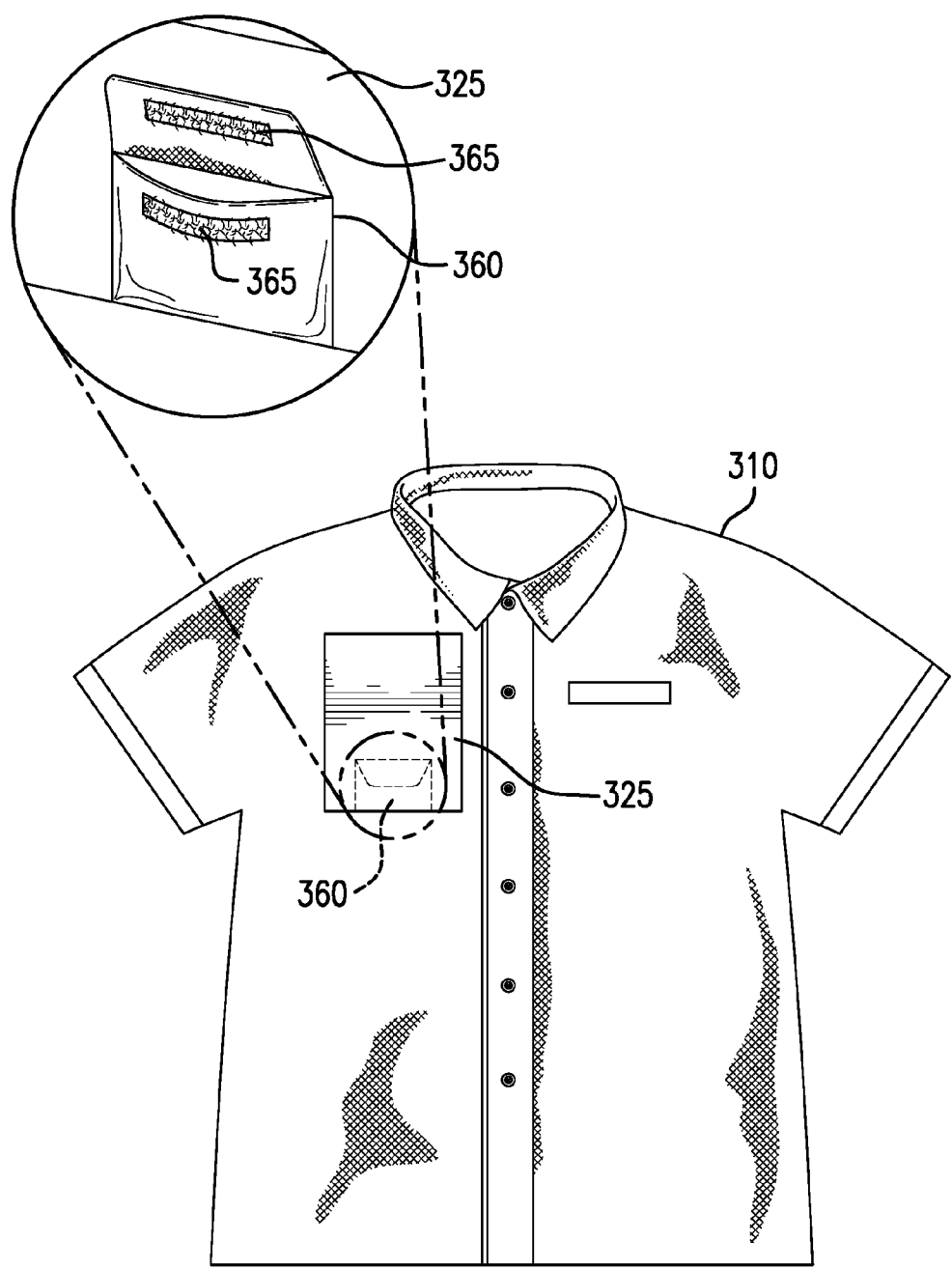

Referring now to FIGS. 6E-6F, front perspective views of garment 310 having a display panel 320, surrounded by one or more flaps (FIG. 6E) or by no flaps (FIG. 6F), and a pocket 360 located on a front portion of the garment 310 and having a hook and loop fastener 365 is illustratively depicted, in accordance with an embodiment of the present invention. According to an embodiment, pocket 360 is configured to receive wireless beacon 140 (shown in FIGS. 2, 3A-C, 5, 7, 8A-C, and 10).

While FIGS. 6A-6F show embodiments wherein the pockets (330, 350, 360) have button fasteners, snap fasteners, and hook and loop fasteners, other fasteners may also be implemented. For example, the garment 310 can have a pocket having fasteners such as, but not limited to, a pin assembly fastener, a snap fastener, a hook fastener, a touch fastener (e.g., VELCRO®, or another type of touch fastener), a magnetic fastener, a wire or cord fastener, etc.

Figure 7:
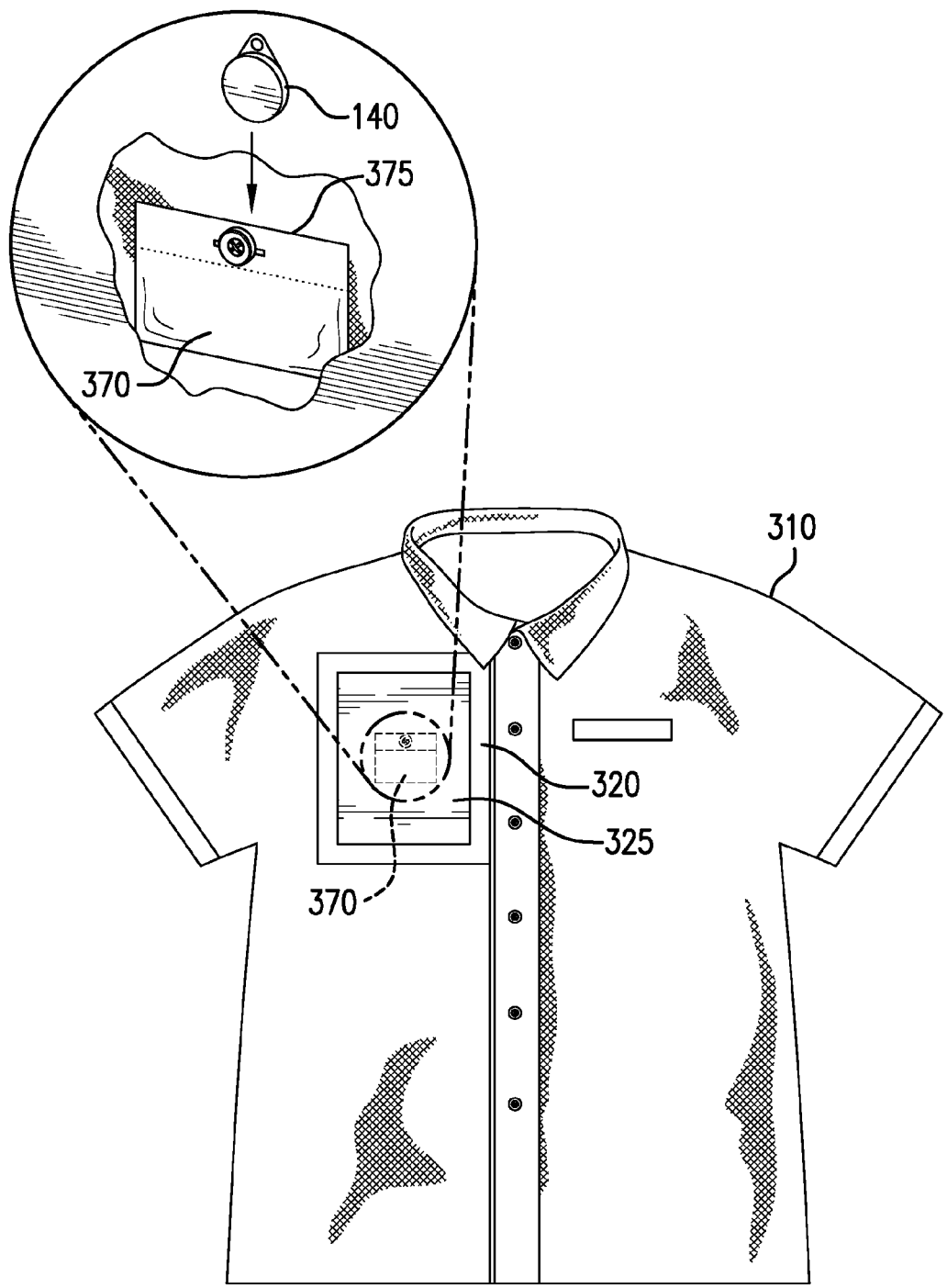
FIG. 7 shows a front perspective view of a garment having a display panel and a pocket having a slip opening for receiving a wireless beacon, according to an embodiment of the present invention.

Referring now to FIG. 7, a front perspective view of garment 310 having a display panel 320 and a pocket 370 having a slip opening 375 for receiving a wireless beacon 140 is illustratively depicted, in accordance with an embodiment of the present invention.

According to an embodiment, pocket 370 is built into garment 310 and has a slip opening 375 at the top of pocket 370 that is configured to receive wireless beacon 140.

According to an embodiment, the wireless beacon 140 is located on the front chest of a shirt behind the display panel 320. The wireless beacon 140 can also be located on another location. For example, according to various embodiments, the wireless beacon 140 may be located on a sleeve, a front or back panel, a shoulder, a collar, etc. Other types of garments (e.g., pants, vests, aprons, etc.) may include a wireless beacon 140 in these or other types of locations. According to some embodiments, the wireless beacon 140 is incorporated in the garment without a display panel 320 or in a garment that includes a display panel 320 in a location different from that of the wireless beacon 140.

According to the embodiment shown in FIG. 7, the wireless beacon 140 resides in a pocket 370 located within the garment 310. According to an embodiment, the wireless beacon 140 may be secured to the garment 310 in another manner. For example, the wireless beacon 140 may be affixed or fastened to the garment 310 by a pin assembly, a snap, a hook, a stitching, a touch fastener (e.g., VELCRO®, or another type of touch fastener), a magnetic fastener, or a wire or cord fastener. Other types of fasteners may also be used to secure the wireless beacon 140 to the garment 310, while maintaining the spirit of the present invention. In some cases, the wireless beacon 140 is incorporated into the garment 310 in a seam, between fabric layers, etc.

The mobile devices may include any type of device or component that has the capability of receiving wireless messages. Examples of wireless devices include, but are not limited to, various types of mobile telecommunication devices, smartphones, smartcards, smart watches, identification devices, media players, headsets, personal digital assistants (PDAs), laptops, notebooks, tablets, phablets, etc.

According to an embodiment, the pocket 370 and/or the slip opening 375 are positioned behind the display panel 320.

Figure 8A:
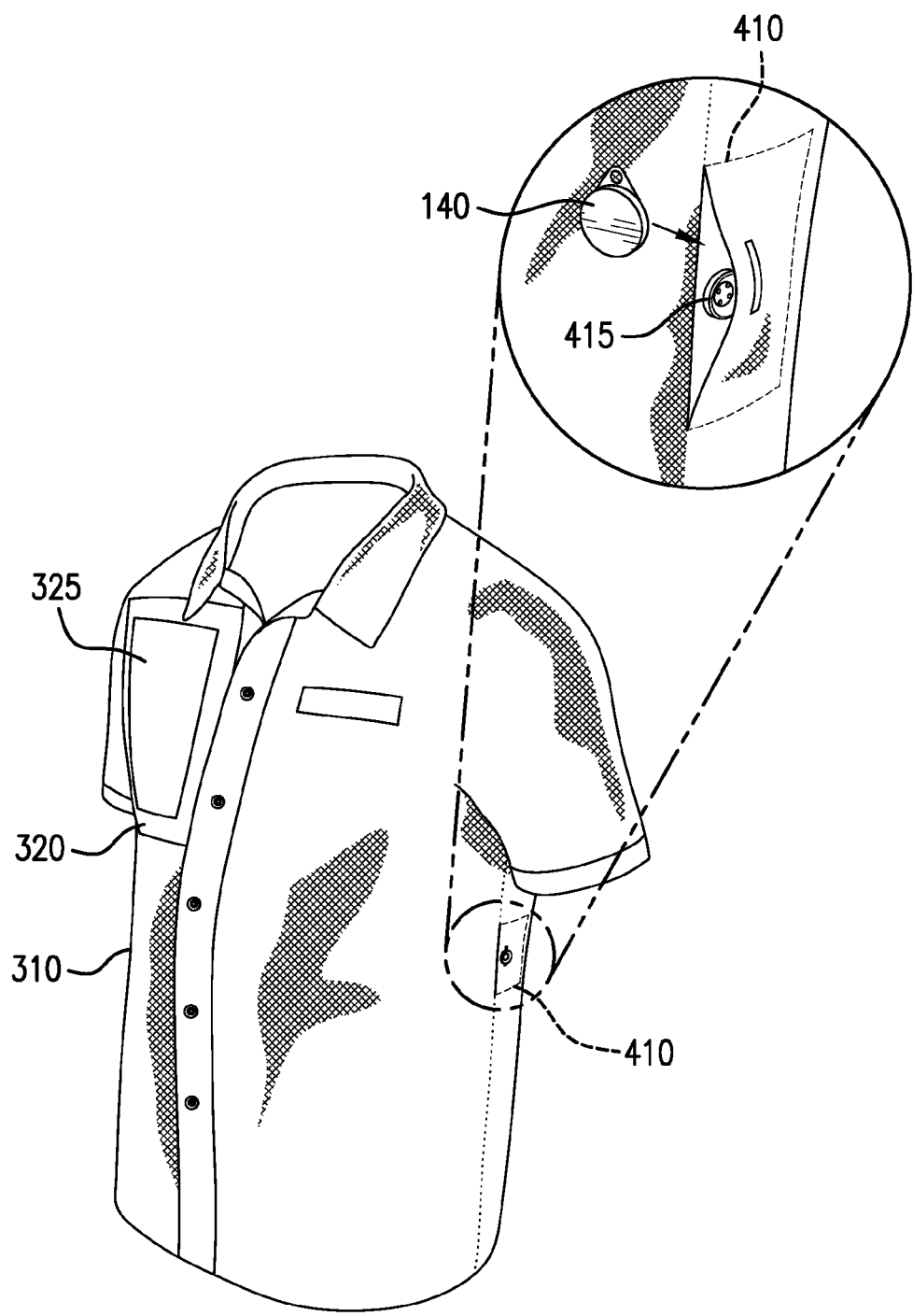
FIG. 8A shows an off-side perspective view of a garment having a display panel and a pocket located along a side seam and having a button fastener, according to an embodiment of the present invention.

Referring now to FIG. 8A, an off-side perspective view of the garment 310 having a display panel 320 and a pocket 410 located along a side seam and having a button fastener 415 is illustratively depicted, in accordance with an embodiment of the present invention.

Figure 8B:
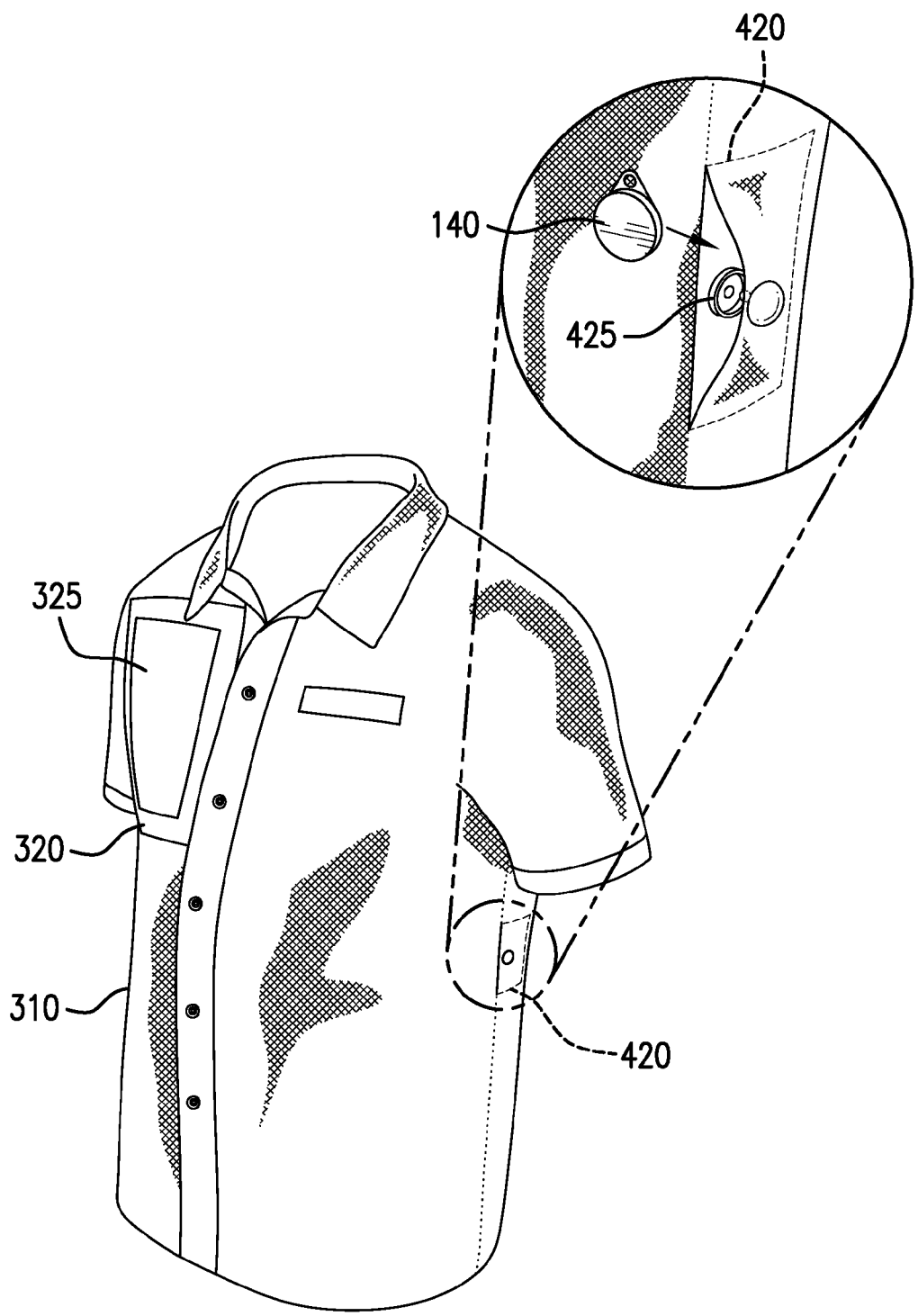
FIG. 8B shows an off-side perspective view of a garment having a display panel and a pocket located along a side seam and having a snap fastener, according to an embodiment of the present invention.

Referring now to FIG. 8B, an off-side perspective view of the garment 310 having a display panel 320 and a pocket 420 located along a side seam and having a snap fastener 425 is illustratively depicted, in accordance with an embodiment of the present invention.

Figure 8C:
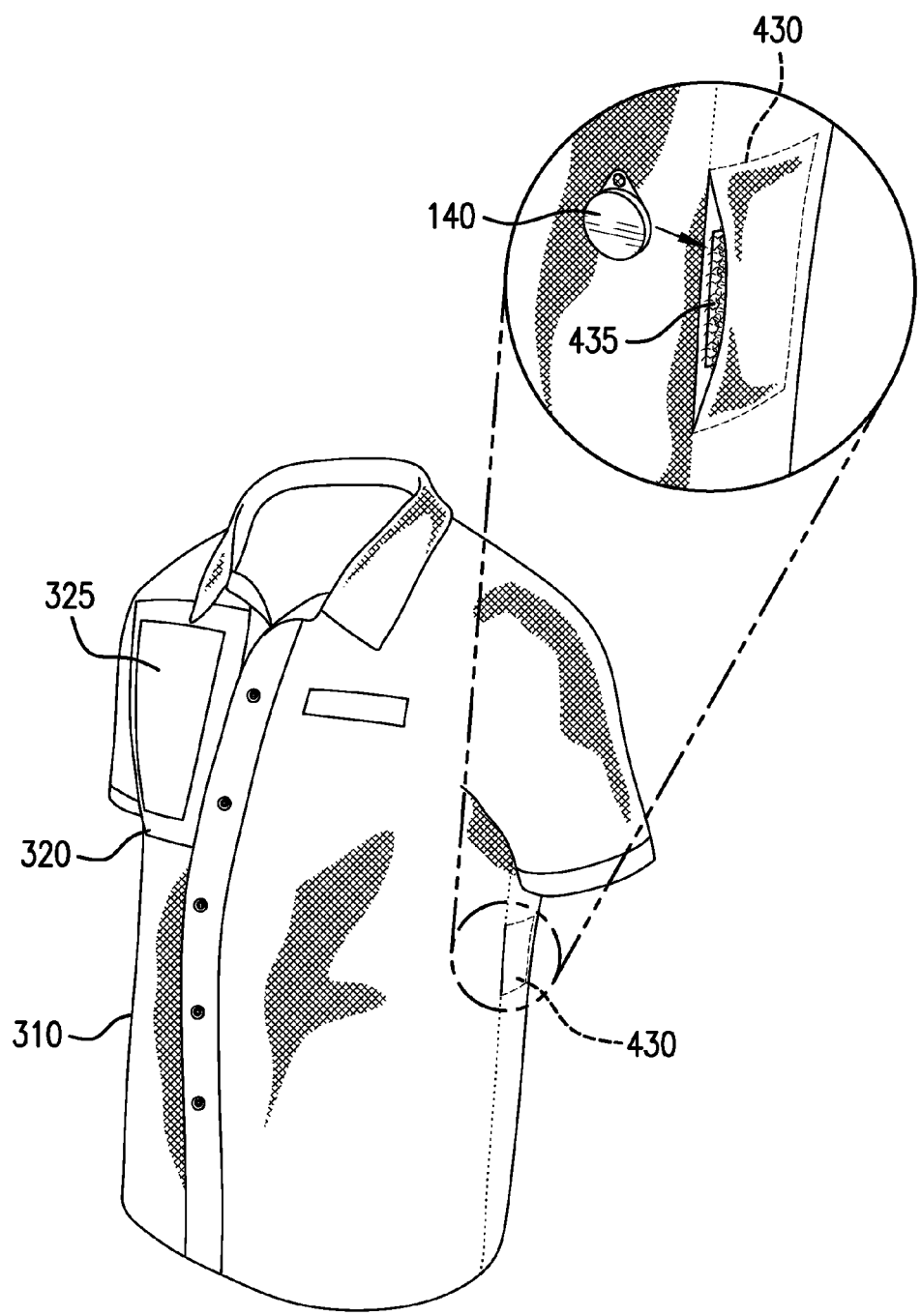
FIG. 8C shows an off-side perspective view of a garment having a display panel and a pocket located along a side seam and having a hook and loop fastener, according to an embodiment of the present invention.

Referring now to FIG. 8C, an off-side perspective view of the garment 310 having a display panel 320 and a pocket 430 located along a side seam and having a hoop and loop fastener is illustratively depicted, in accordance with an embodiment of the present invention.

While FIGS. 8A, 8B, and 8C show embodiments wherein the pockets (410, 420, 430) have button fasteners, snap fasteners, and hook and loop fasteners, other fasteners may also be implemented. For example, the garment 310 can have a pocket having fasteners such as, but not limited to, a pin assembly fastener, a snap fastener, a hook fastener, a touch fastener (e.g., VELCRO®, or another type of touch fastener), a magnetic fastener, a wire or cord fastener, etc.

Figure 9:
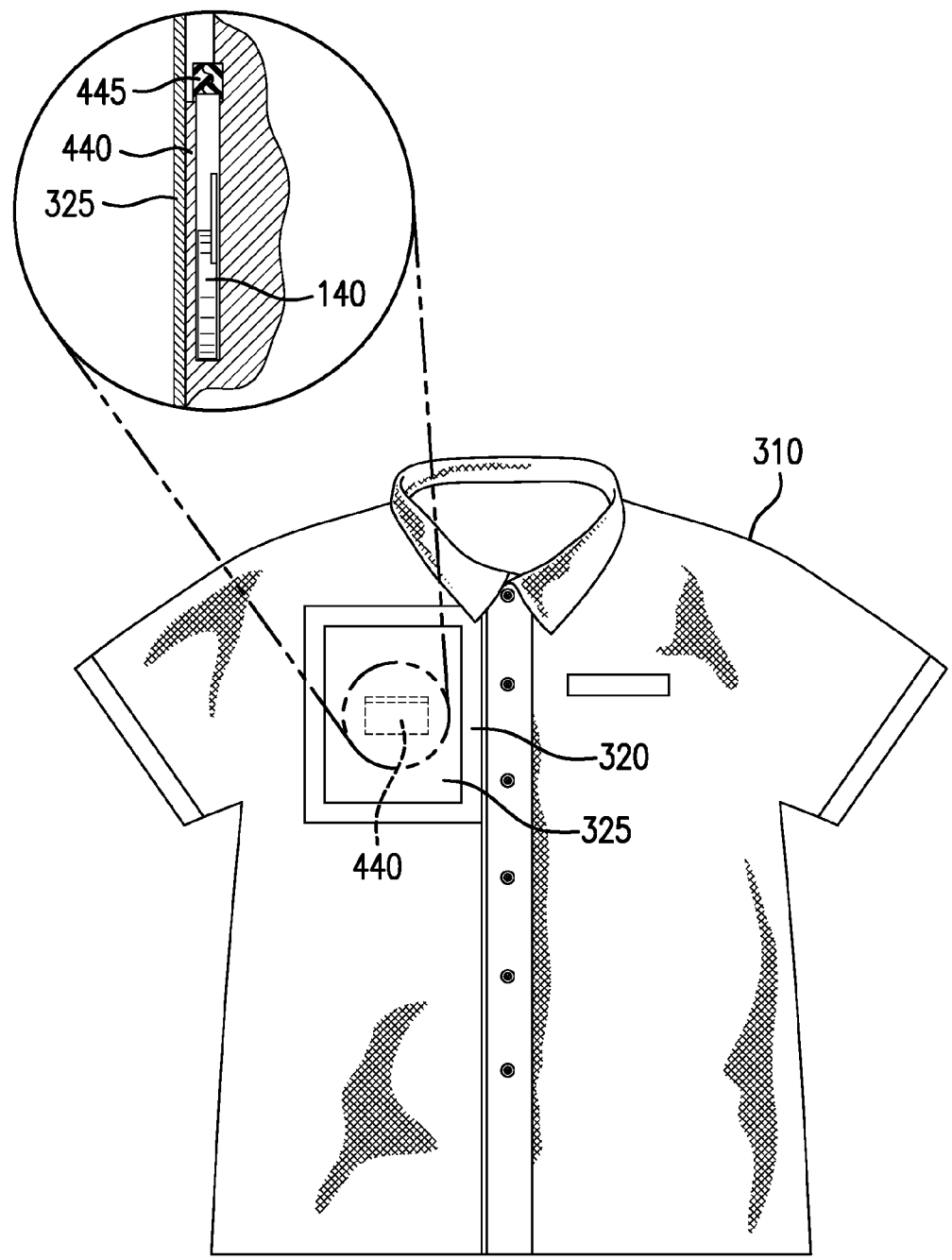
FIG. 9 shows a front perspective view of a garment having a display panel and a pocket located on a front portion of the garment and having a water-resistant seal, according to an embodiment of the present invention.

Referring now to FIG. 9, a front perspective view of the garment 310 having a display panel 320 and a pocket 440 located on a front portion of the garment 310 and having a water-resistant seal 445 is illustratively depicted, in accordance with an embodiment of the present invention.

According to various embodiments of the present invention, pocket 440 creates a water resistant seal 445 and/or is made of a water resistant material. This enables the garment 310 to become wet while keeping the wireless beacon 140 dry, thus helping prevent damage to the wireless beacon 140 caused by unwanted liquid contact.

According to an embodiment, the pocket 440 and/or the water resistant seal 445 are positioned behind the display panel 320.

Figure 10A:
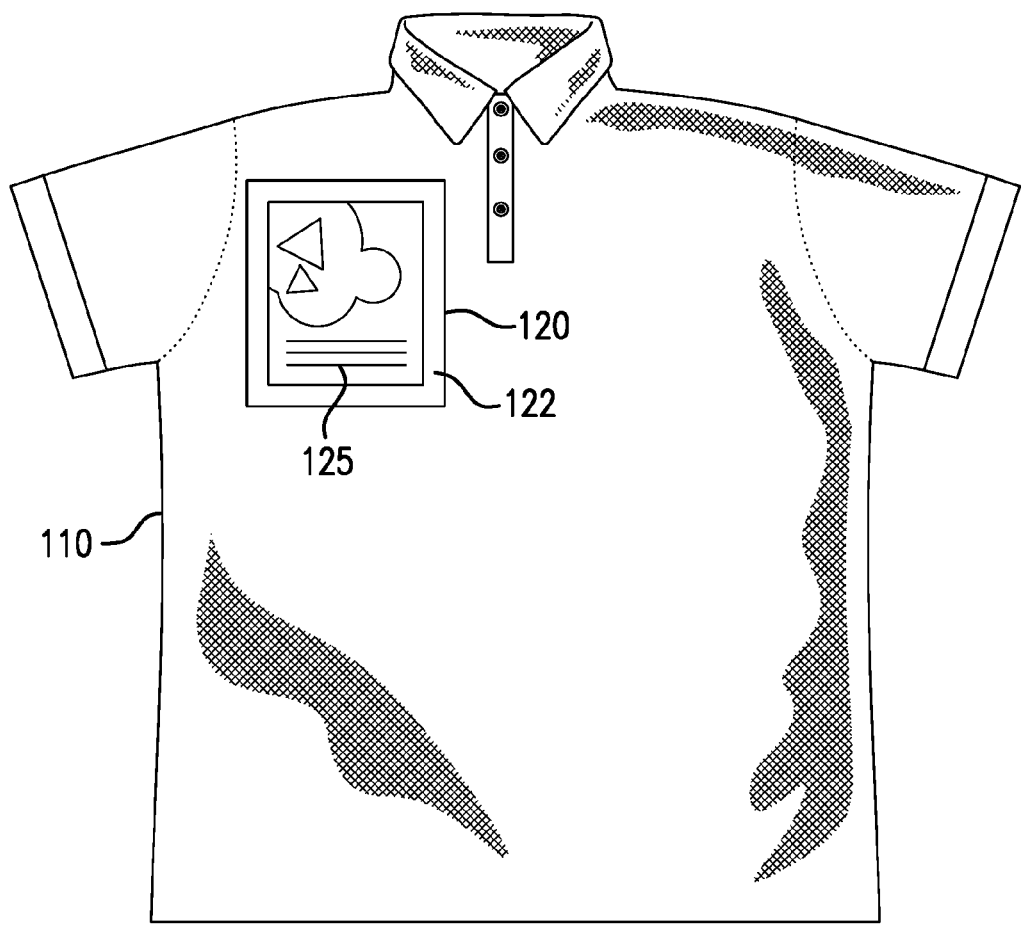
FIG. 10A shows a front perspective view of a garment having a display panel having visual content surrounded by four flaps, according to an embodiment of the present invention.
Figure 10B:
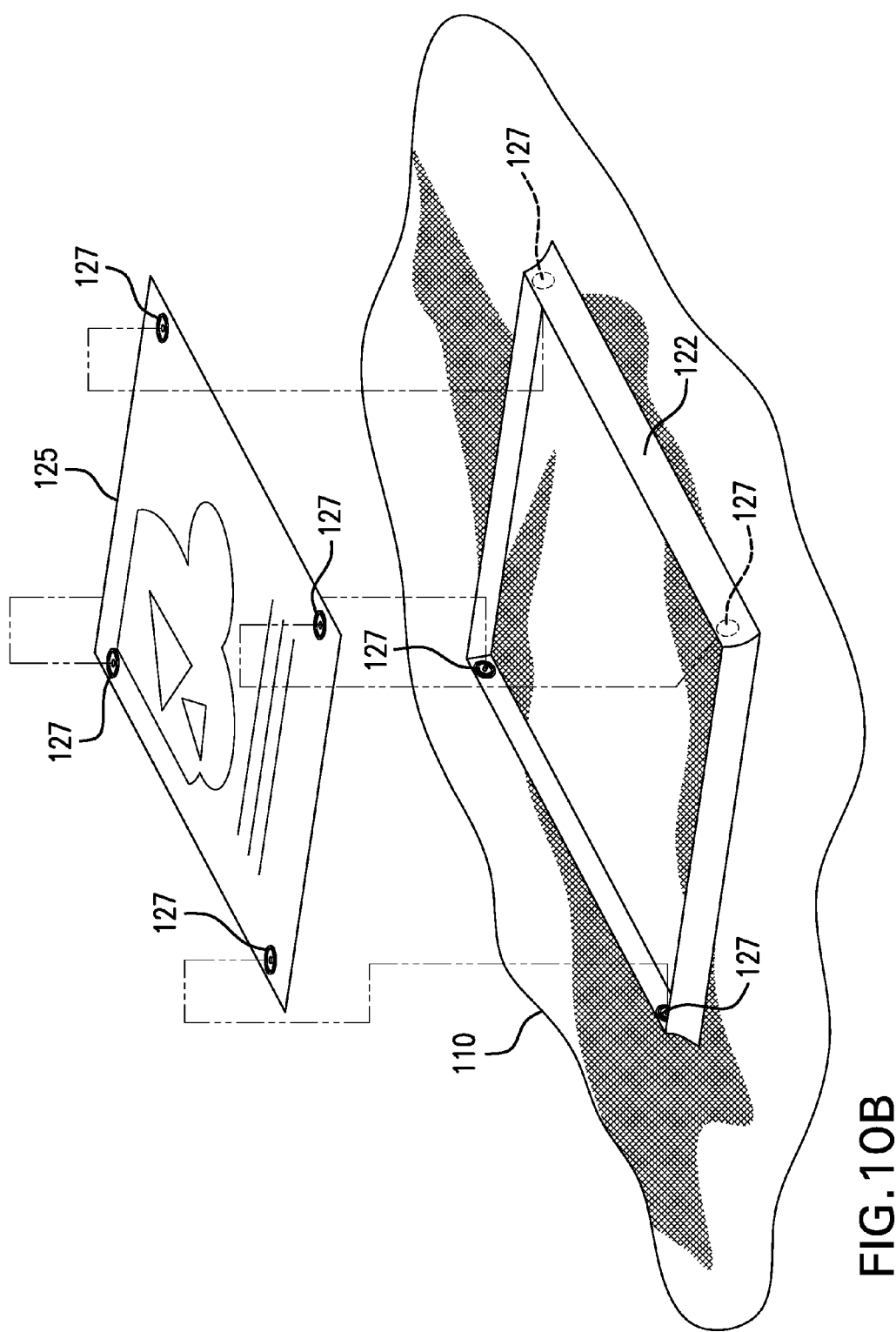
FIG. 10B shows an exploded view of a display panel having visual content surrounded by four flaps, according to an embodiment of the present invention.

Referring now to FIGS. 10A-10B, a front perspective view (FIG. 10A) and an exploded view (FIG. 10B) of a garment 110 having a display panel 120 having visual content 125 surrounded by four flaps 122 is illustratively depicted, in accordance with an embodiment of the present invention.

According to an embodiment, the visual content 125 is removable and can be secured onto the garment 110 using fasteners 127 located on the visual content 125 and the flaps 122. The fasteners 127 may include, but are not limited to, mating snaps, magnets, hook and loop fasteners, ties, buttons, temporary glue, buckles, etc. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to an embodiment, the visual content 125 is secured to the inner portion of the flaps 122. According to an embodiment, the flaps may be sewn into the seam, body, button placket, or face of the garment 110.

Figure 10C:
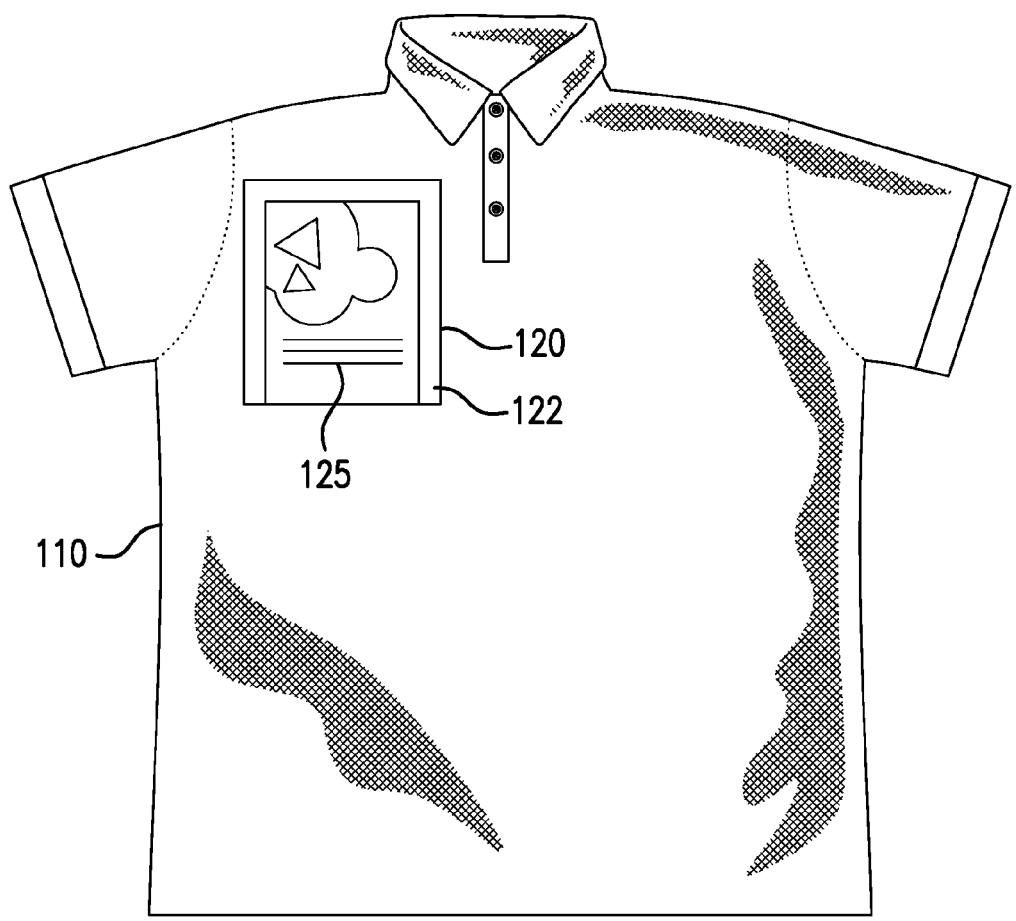
FIG. 10C shows a front perspective view of a garment having a display panel having visual content surrounded by three flaps, according to an embodiment of the present invention.
Figure 10D:
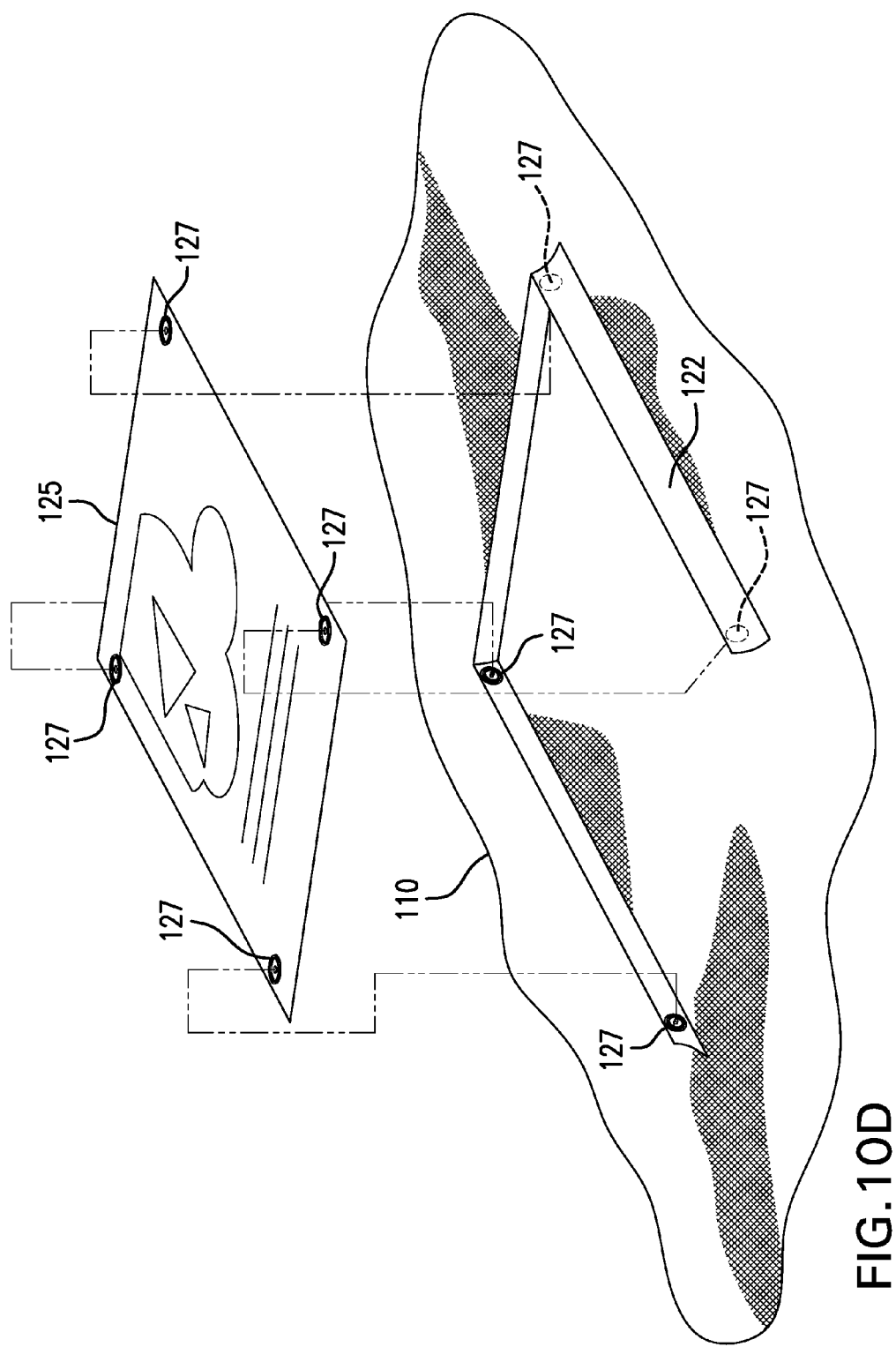
FIG. 10D shows an exploded view of a display panel having visual content surrounded by three flaps, according to an embodiment of the present invention.

Referring now to FIGS. 10C-10D, a front perspective view (FIG. 10C) and an exploded view (FIG. 10D) of a garment 110 having a display panel 120 having visual content 125 surrounded by three flaps 122 is illustratively depicted, in accordance with an embodiment of the present invention.

According to an embodiment, the visual content 125 is removable and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to an embodiment, the visual content 125 is secured to the inner portion of the flaps 122. According to an embodiment, the flaps may be sewn into the seam, body, button placket, or face of the garment 110.

Figure 10E:
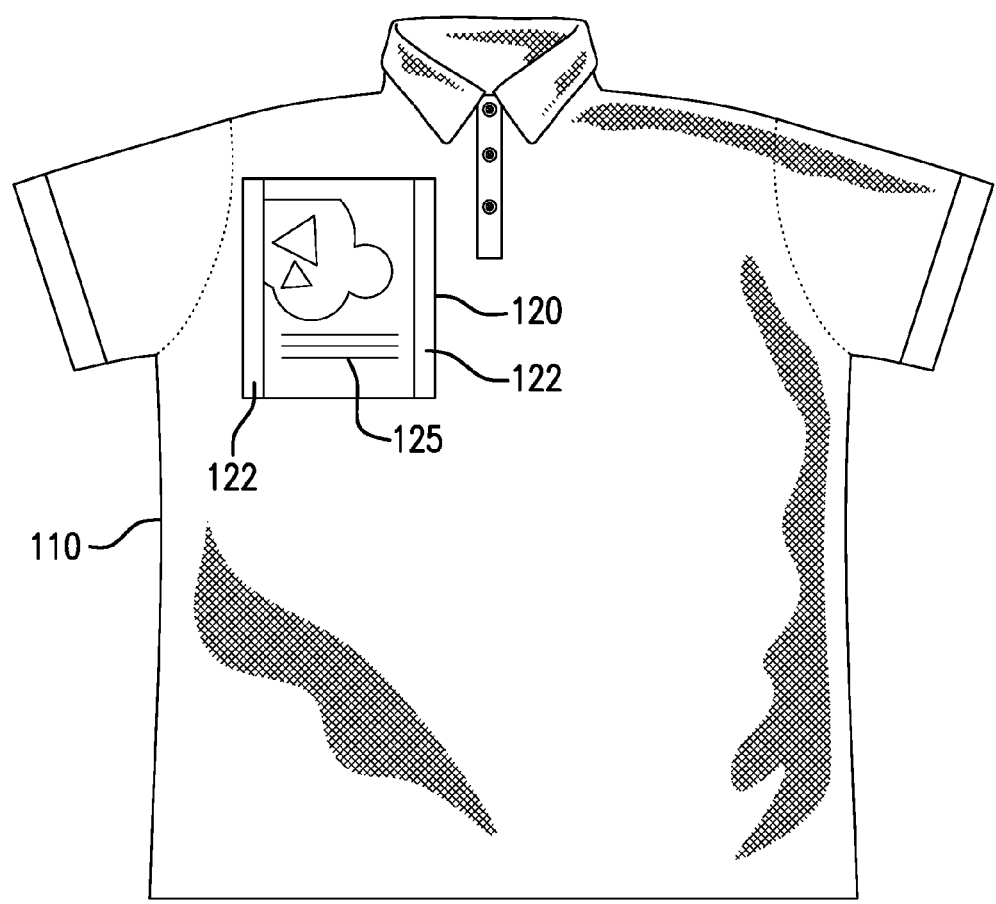
FIG. 10E shows a front perspective view of a garment having a display panel having visual content surrounded by two flaps, according to an embodiment of the present invention.
Figure 10F:
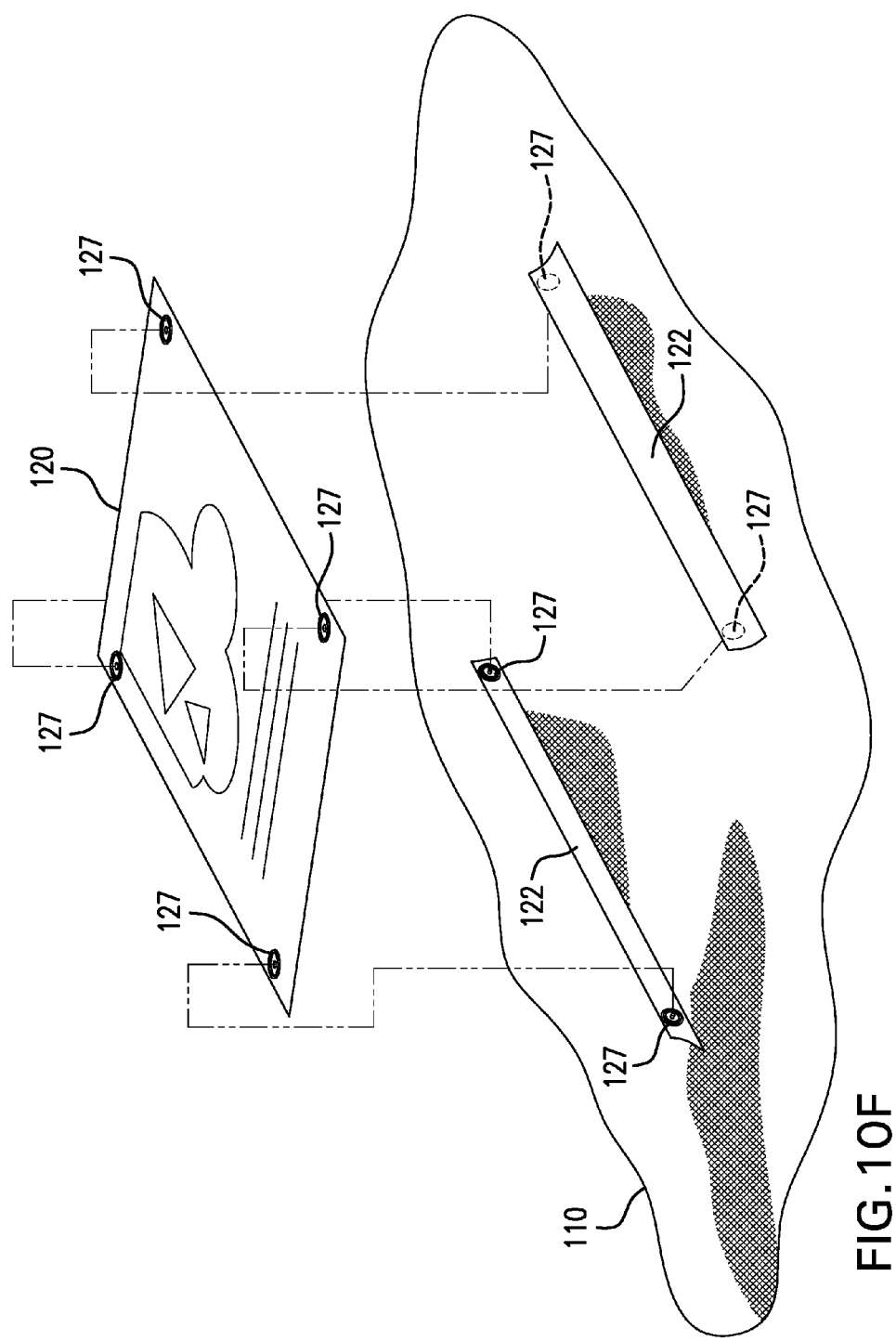
FIG. 10F shows an exploded view of a display panel having visual content surrounded by two flaps, according to an embodiment of the present invention.

Referring now to FIGS. 10E-10F, a front perspective view (FIG. 10E) and an exploded view (FIG. 10F) of a garment 110 having a display panel 120 having visual content 125 surrounded by three flaps 122 is illustratively depicted, in accordance with an embodiment of the present invention.

According to an embodiment, the visual content 125 is removable and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to an embodiment, the visual content 125 is secured to the inner portion of the flaps 122. According to an embodiment, the flaps may be sewn into the seam, body, button placket, or face of the garment 110.

Figure 11A:
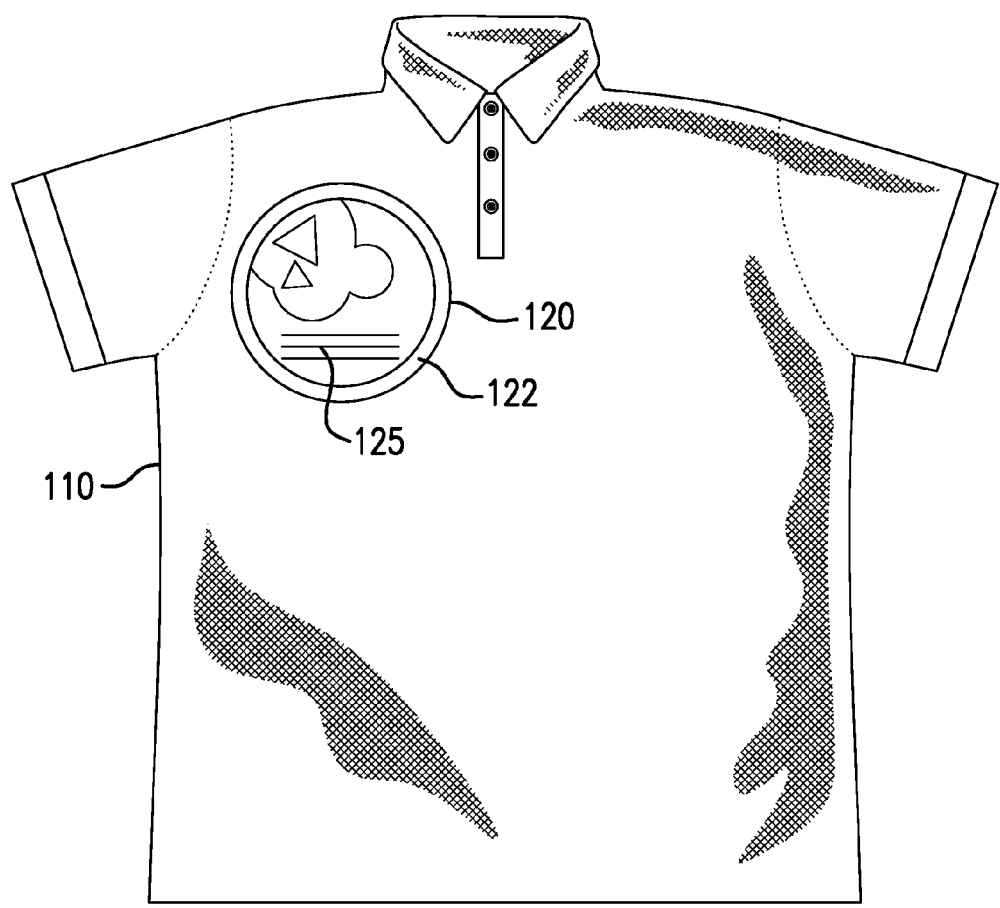
FIG. 11A shows a front perspective view of a garment having a display panel having visual content surrounded by a circular flap, according to an embodiment of the present invention.
Figure 11B:
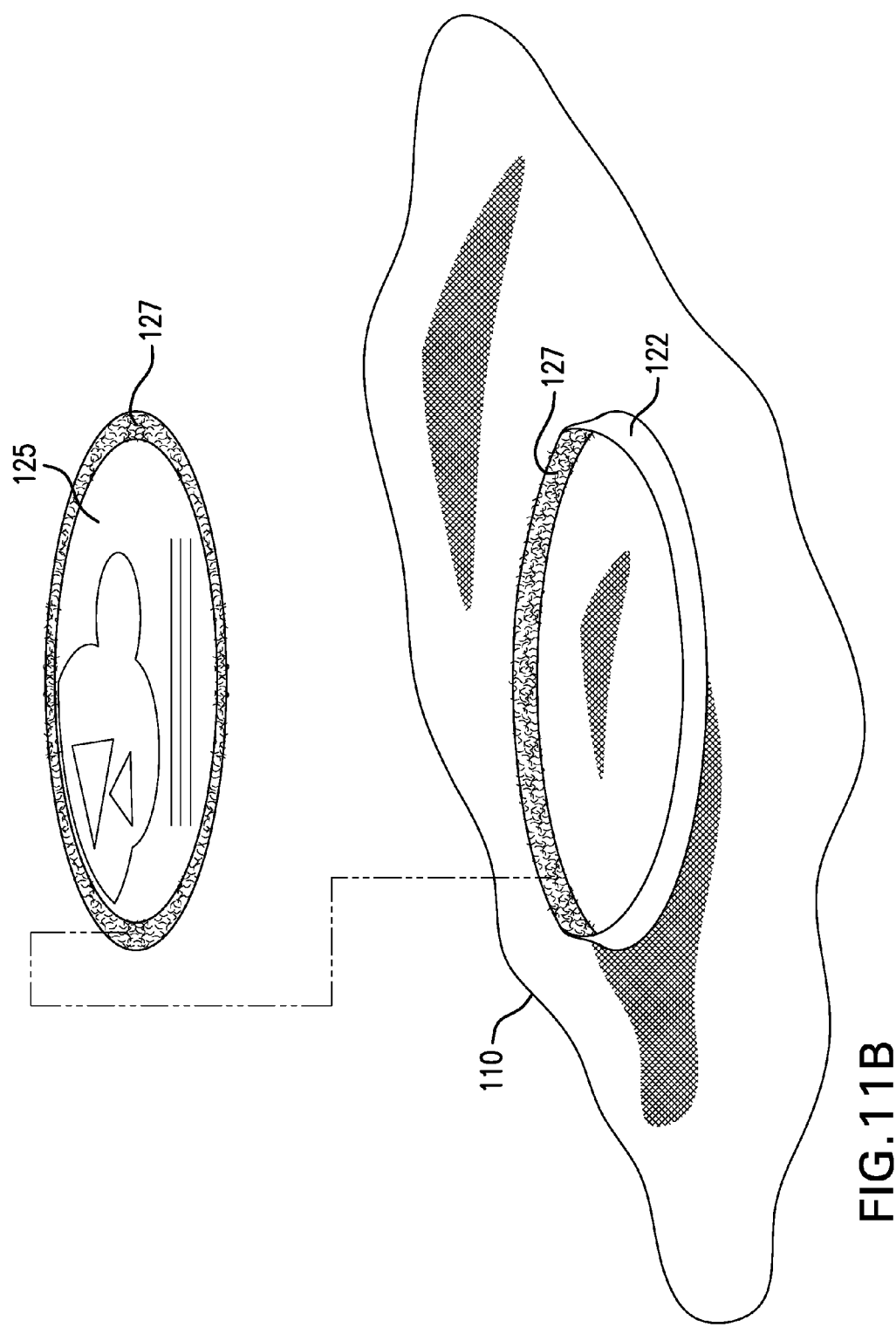
FIG. 11B shows an exploded view of a display panel having visual content surrounded by a circular flap, according to an embodiment of the present invention.

Referring now to FIGS. 11A-11B, a front perspective view (FIG. 11A) and an exploded view (FIG. 11B) of a garment 110 having a display panel 120 having visual content 125 surrounded by a circular flap 122 is illustratively depicted, in accordance with an embodiment of the present invention.

According to an embodiment, the visual content 125 is removable and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to the embodiment shown in FIG. 11B, the visual content 125 is secured to the inner portion of the flaps 122 using a hook and loop fastener 127. It is noted, however, that other types of fasteners 127 may also be used, while maintaining the spirit of the present invention. According to an embodiment, the flaps may be sewn into the seam, body, button placket, or face of the garment 110.

Figure 12A:
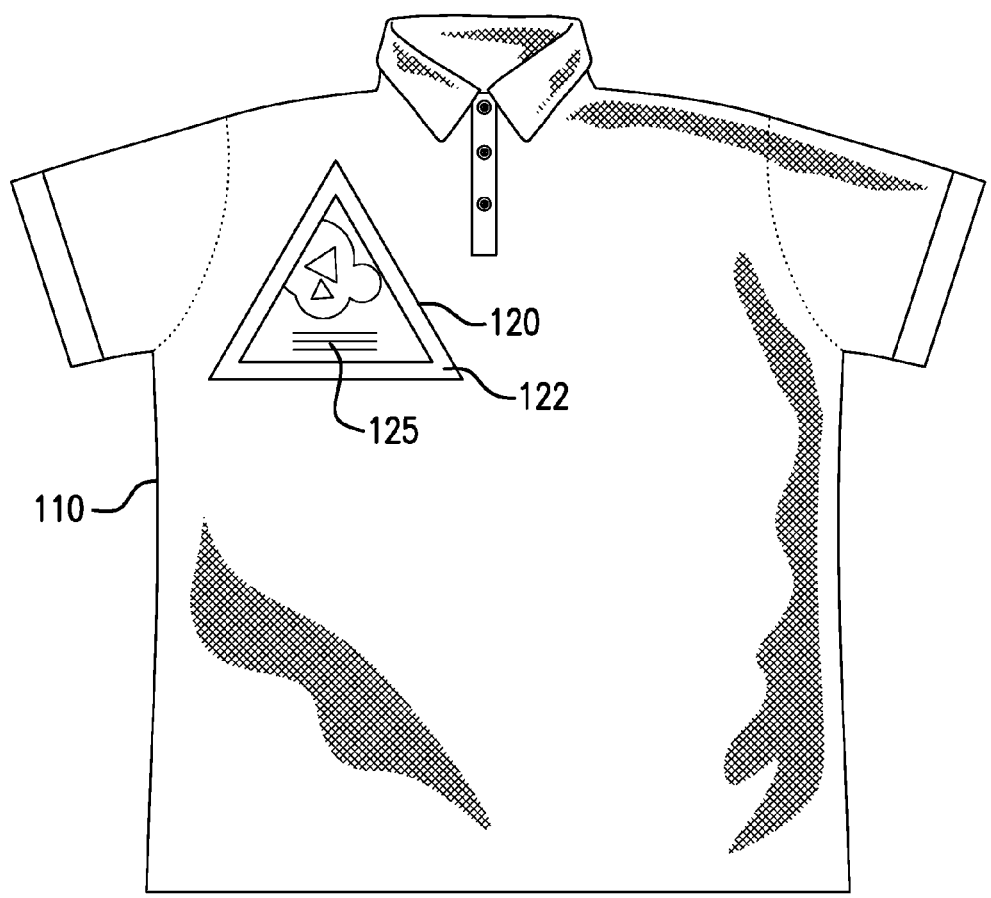
FIG. 12A shows a front perspective view of a garment having a display panel having visual content surrounded by a triangular flap, according to an embodiment of the present invention.
Figure 12B:
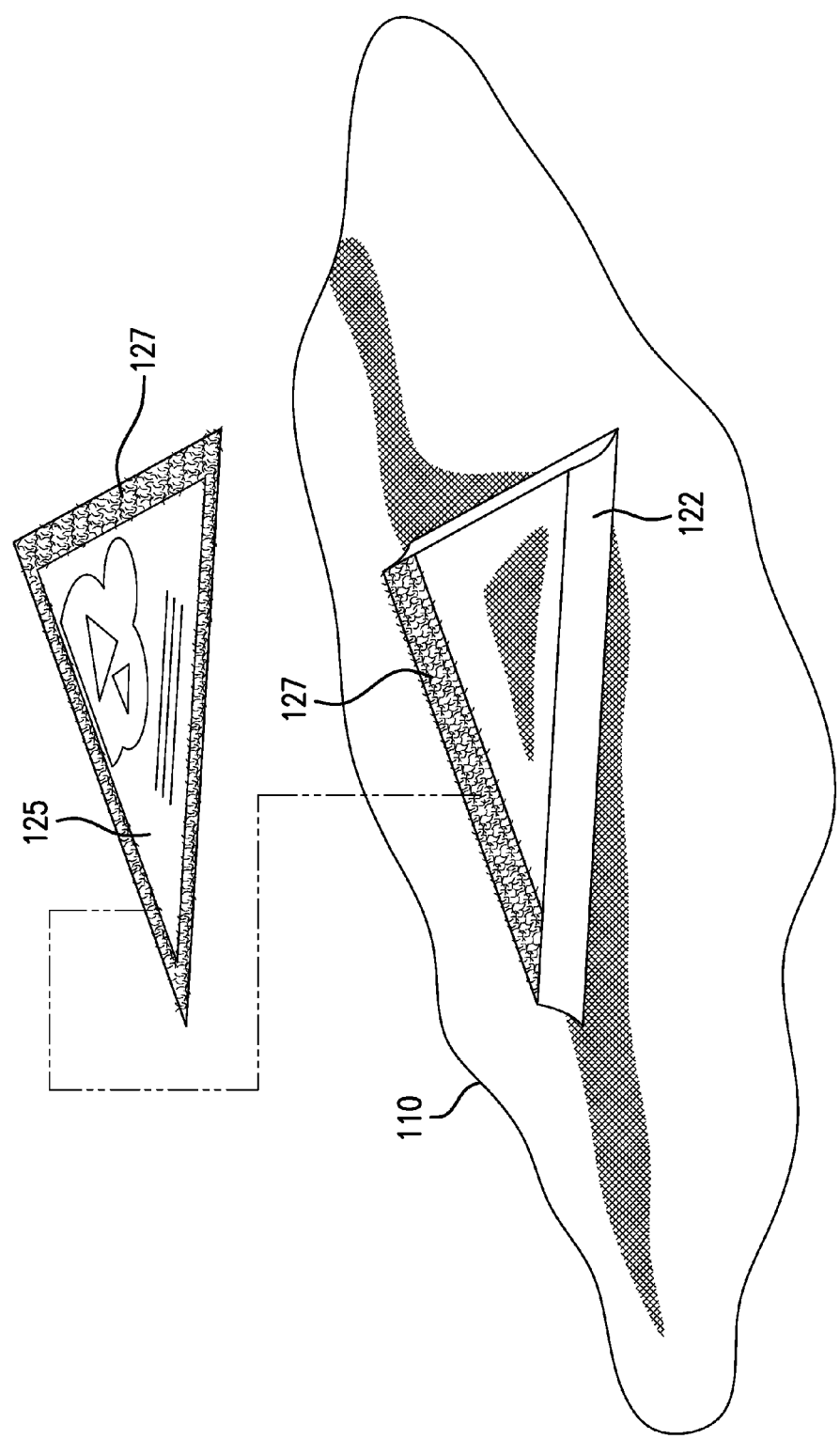
FIG. 12B shows an exploded view of a display panel having visual content surrounded by a triangular flap, according to an embodiment of the present invention.

Referring now to FIGS. 12A-12B, a front perspective view (FIG. 12A) and an exploded view (FIG. 12B) of a garment 110 having a display panel 120 having visual content 125 surrounded by a triangular flap 122 is illustratively depicted, in accordance with an embodiment of the present invention.

According to an embodiment, the visual content 125 is removable and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to the embodiment shown in FIG. 12B, the visual content 125 is secured to the inner portion of the flaps 122 using a hook and loop fastener 127. It is noted, however, that other types of fasteners 127 may also be used, while maintaining the spirit of the present invention. According to an embodiment, the flaps may be sewn into the seam, body, button placket, or face of the garment 110.

Figure 13A:
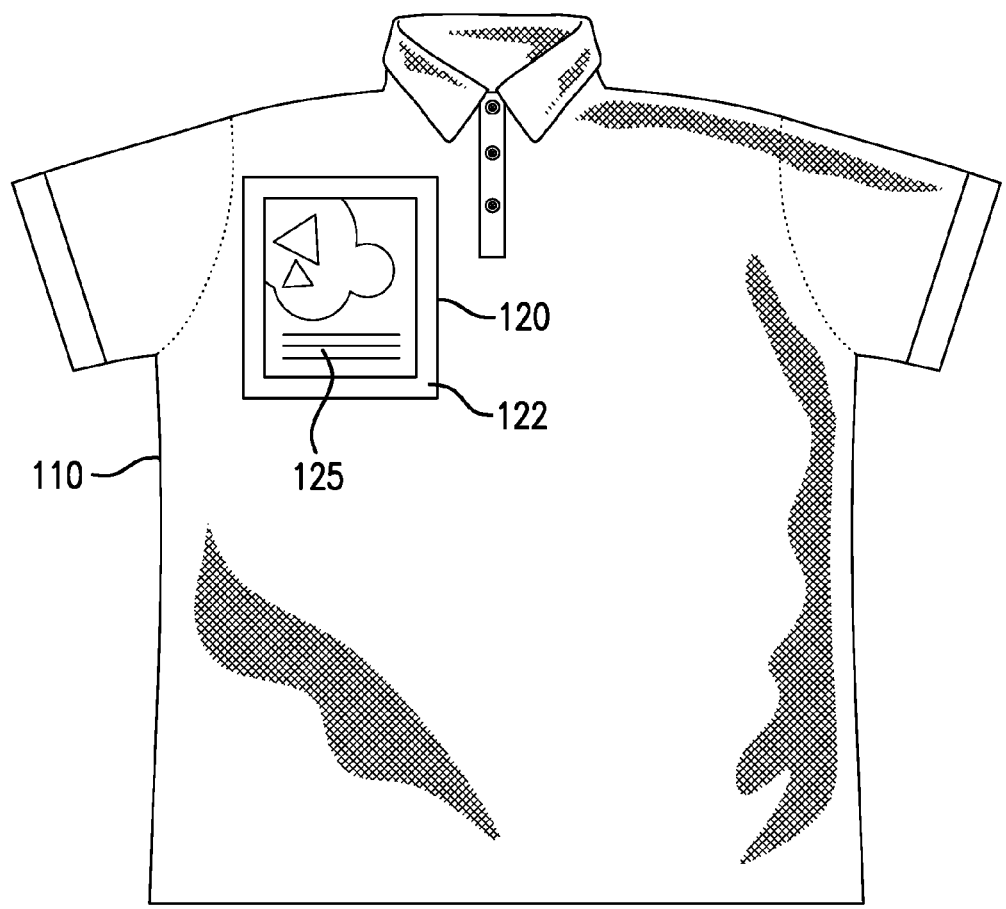
FIG. 13A shows a front perspective view of a garment having a display panel having visual content surrounded by a plurality of flaps and having fasteners positioned on the garment, according to an embodiment of the present invention.
Figure 13B:
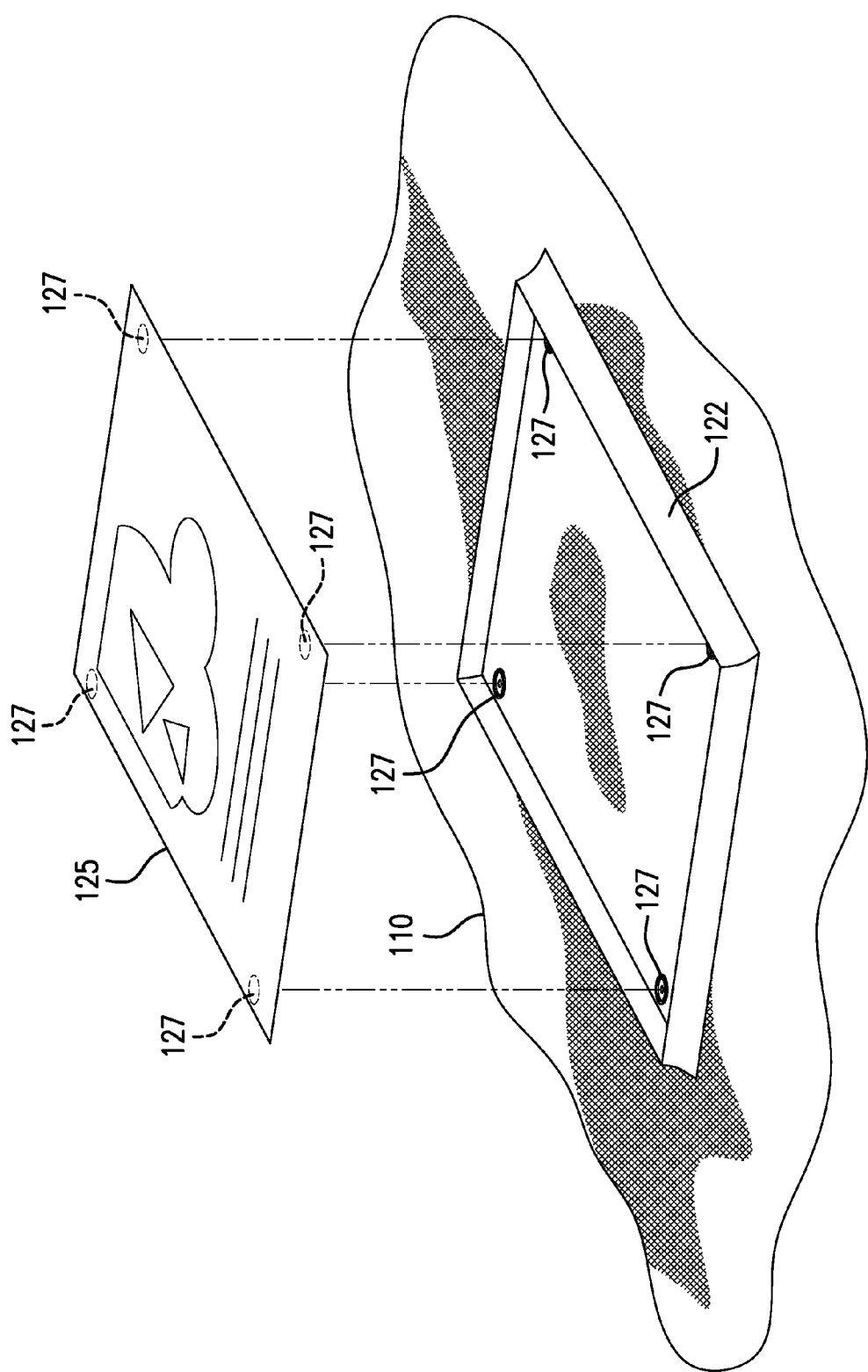
FIG. 13B shows an exploded view of a display panel having visual content surrounded by a plurality of flaps and having fasteners positioned on the garment, according to an embodiment of the present invention.

Referring now to FIGS. 13A-12B, a front perspective view (FIG. 13A) and an exploded view (FIG. 13B) of a garment 110 having a display panel 120 having visual content 125 surrounded by a plurality of flaps 122 and having fasteners 127 positioned on the garment 110 is illustratively depicted, in accordance with an embodiment of the present invention.

According to an embodiment, the visual content 125 is removable and can be secured onto the garment 110 using fasteners 127 located on the visual content 125 and the garment 110. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the garment 110.

Figure 14A:
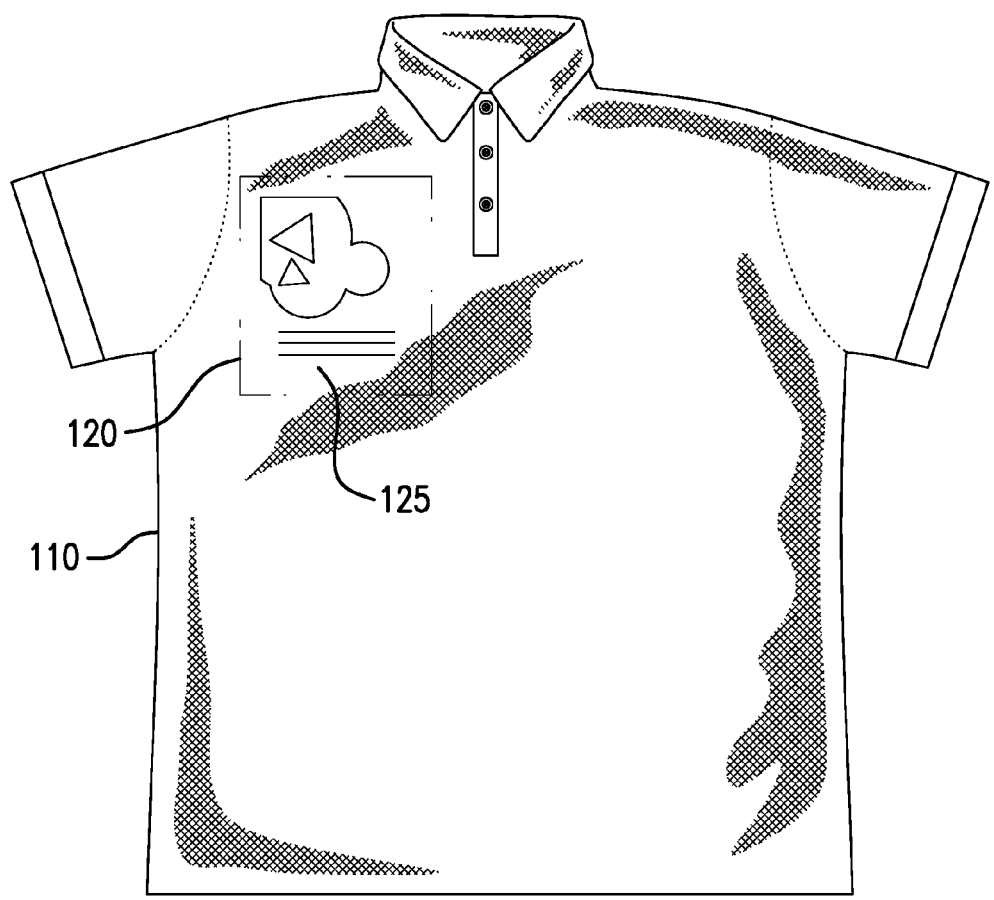
FIG. 14A shows a front perspective view of a garment having a display panel having visual content surrounded by no flaps, according to an embodiment of the present invention.
Figure 14B:
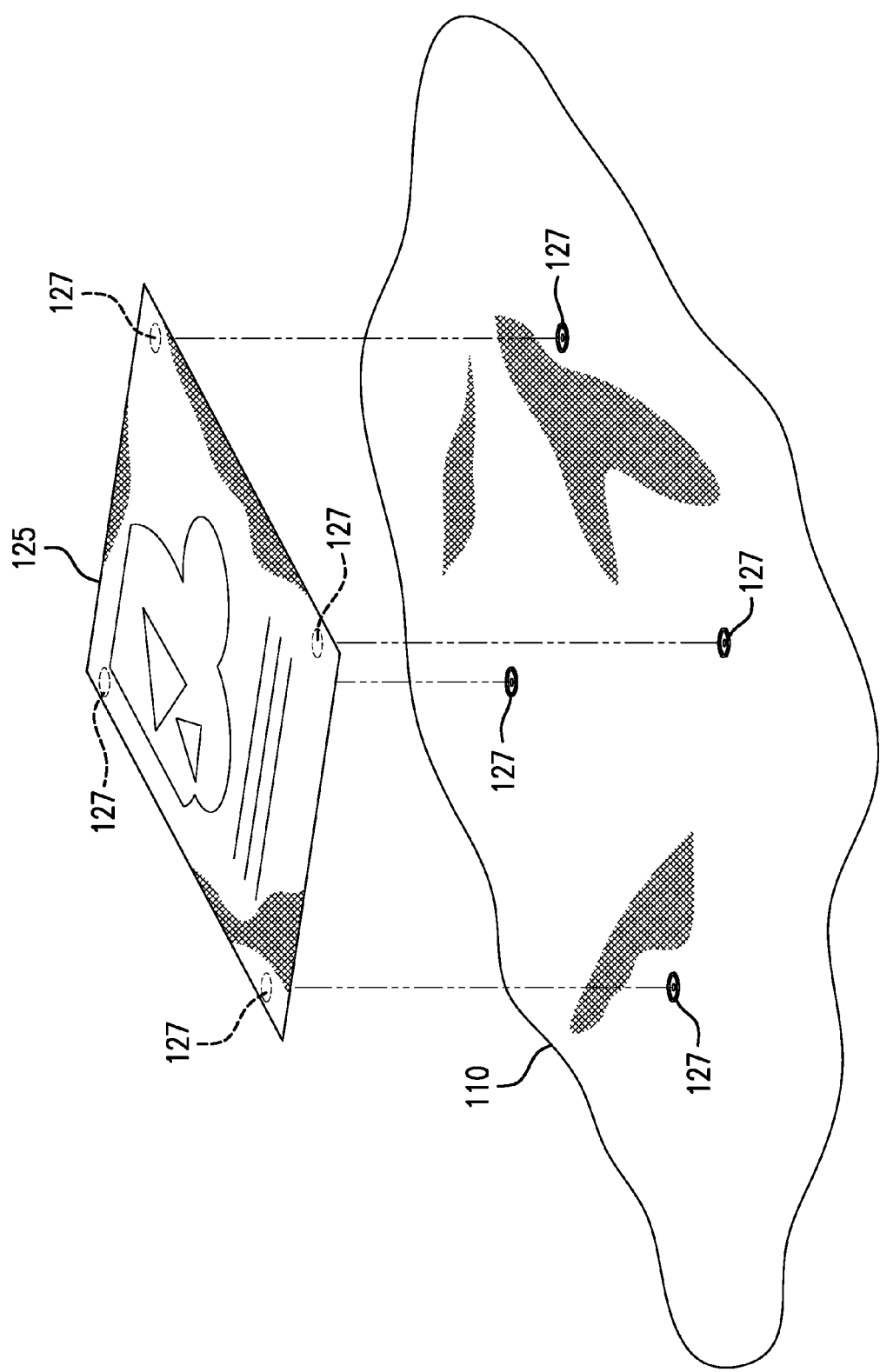
FIG. 14B shows an exploded view of a display panel having visual content surrounded by no flaps, according to an embodiment of the present invention.

Referring now to FIGS. 14A-14B, a front perspective view (FIG. 14A) and an exploded view (FIG. 14B) of a garment 110 having a display panel 120 having visual content 125 surrounded by no flaps 122 and having fasteners 127 positioned on the garment 110 is illustratively depicted, in accordance with an embodiment of the present invention.

According to an embodiment, the visual content 125 is removable and can be secured onto the garment 110 using fasteners 127 located on the visual content 125 and the garment 110. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the garment 110.

By having no flaps 122 secured to the garment 110, the visual content 125 may have an appearance of looking flush, complete, or blended with the garment 110.

Figure 15A:
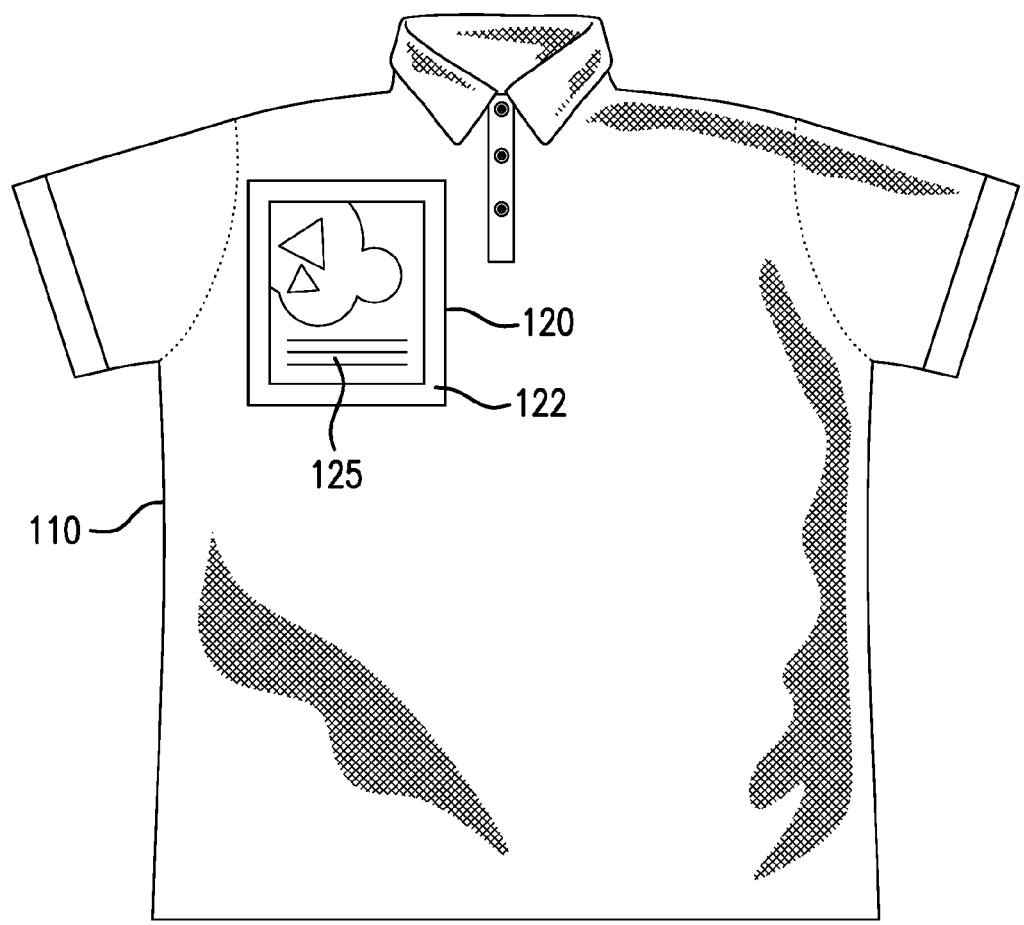
FIG. 15A shows a front perspective view of a garment having a display panel having visual content fastened to the garment with magnets, according to an embodiment of the present invention.
Figure 15B:
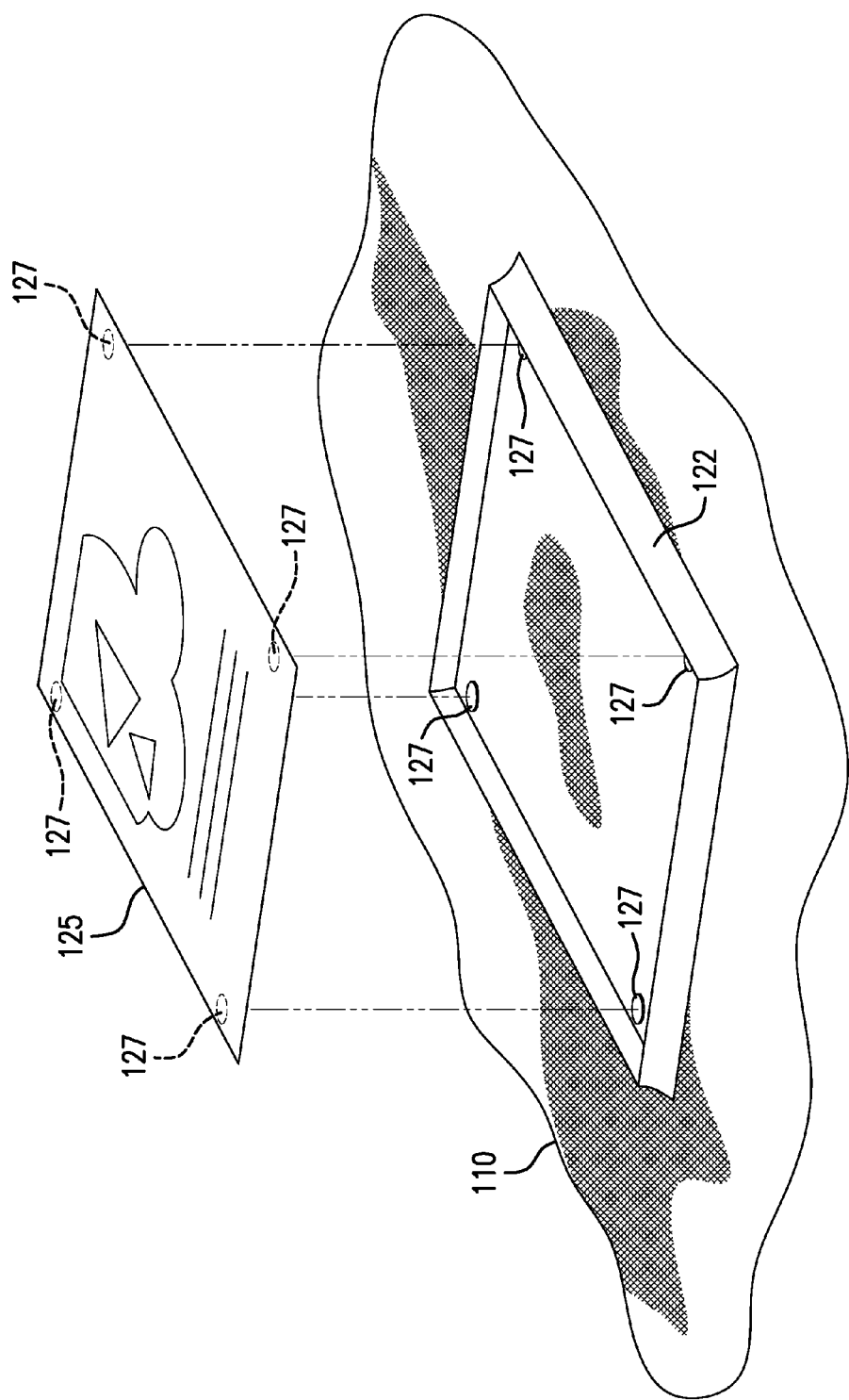
FIG. 15B shows an exploded view of a display panel having visual content fastened to the garment with magnets, according to an embodiment of the present invention.

Referring now to FIGS. 15A-15B, a front perspective view (FIG. 15A) and an exploded view (FIG. 15B) of a garment 110 having a display panel 120 having visual content 125 surrounded by flaps 122 and fastened to the garment 110 using magnets is illustratively depicted, in accordance with an embodiment of the present invention.

According to an embodiment, the visual content 125 is removable and can be secured onto the garment 110 using fasteners 127 located on the visual content 125 and the garment 110. According to the embodiment shown in FIGS. 15A-15B, the fasteners 127 are magnets and/or have magnetic qualities, enabling the visual content 125 to be magnetically secured to the garment 110

According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the garment 110.

Figure 16A:
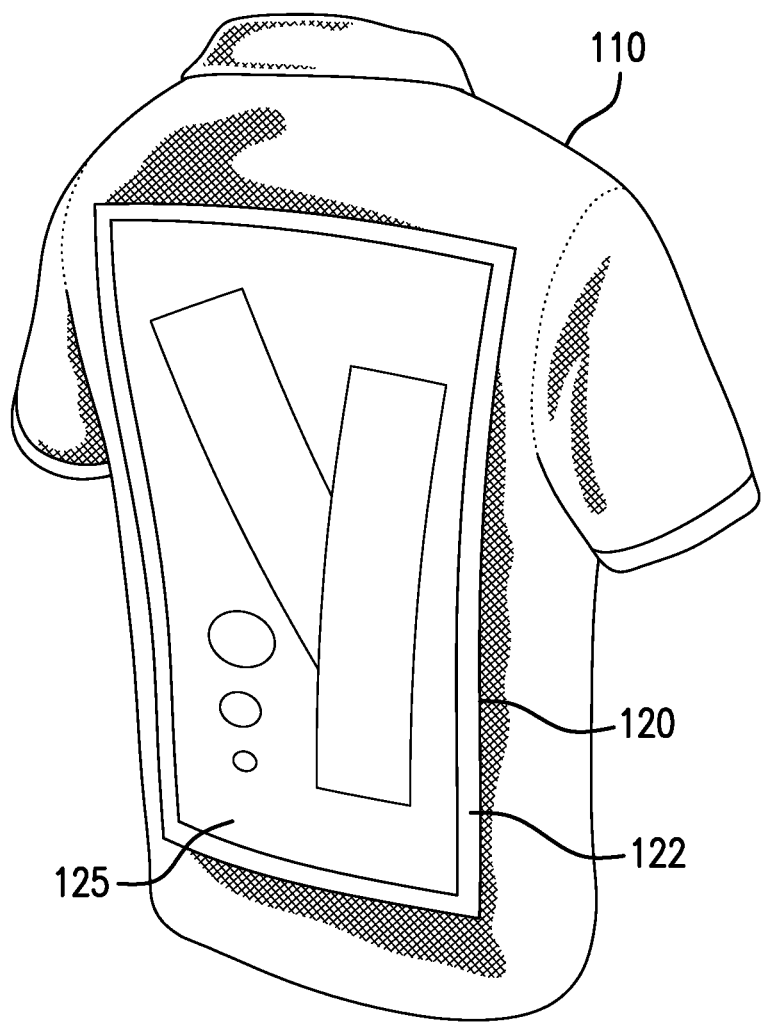
FIG. 16A shows a rear perspective view of a garment having a display panel having visual content surrounded by a plurality of flaps, according to an embodiment of the present invention.
Figure 16B:
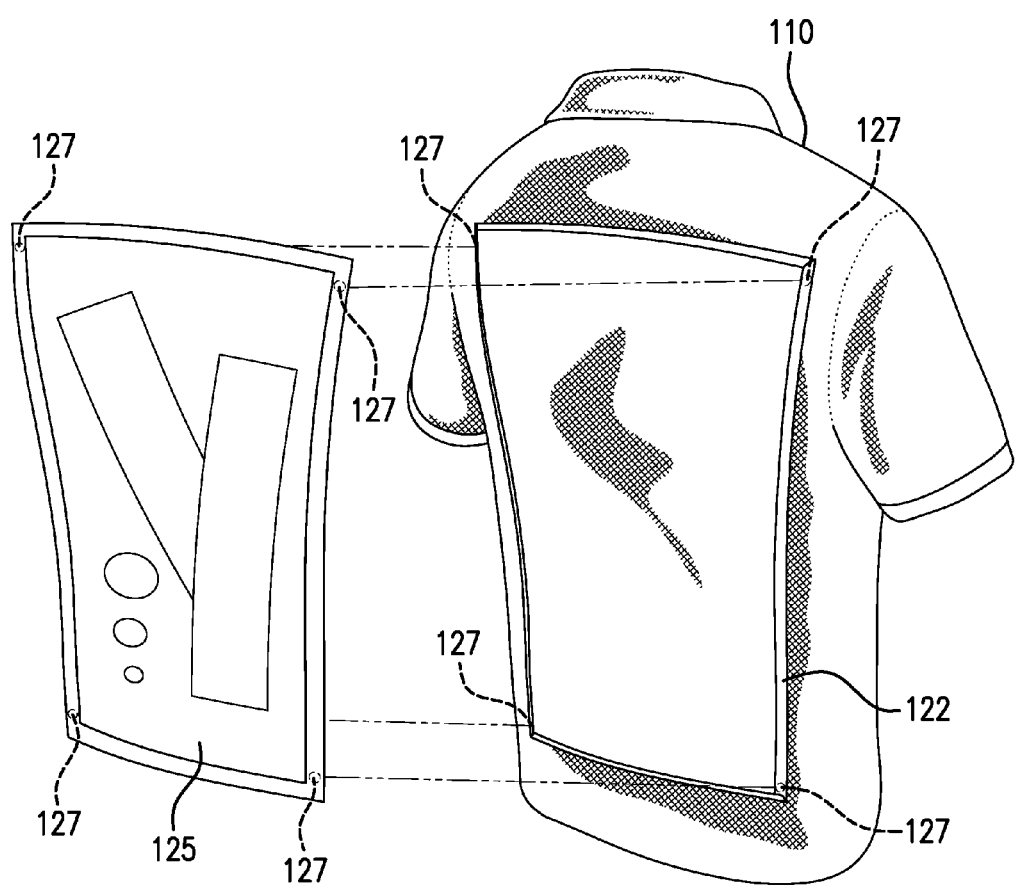
FIG. 16B shows an exploded rear perspective view of a display panel having visual content surrounded by a plurality of flaps, according to an embodiment of the present invention.

Referring now to FIGS. 16A-16B, a rear perspective view (FIG. 16A) and an exploded rear perspective view (FIG. 16B) of a garment 110 having a display panel 120 having visual content 125 surrounded by a plurality of flaps 122 is illustratively depicted, in accordance with an embodiment of the present invention.

According to an embodiment, the visual content 125 is located on the back of the garment 110, is removable, and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the inner portion of the flaps 122. According to an embodiment, the flaps may be sewn into the seam, body, button placket, or face of the garment 110.

Figure 17A:
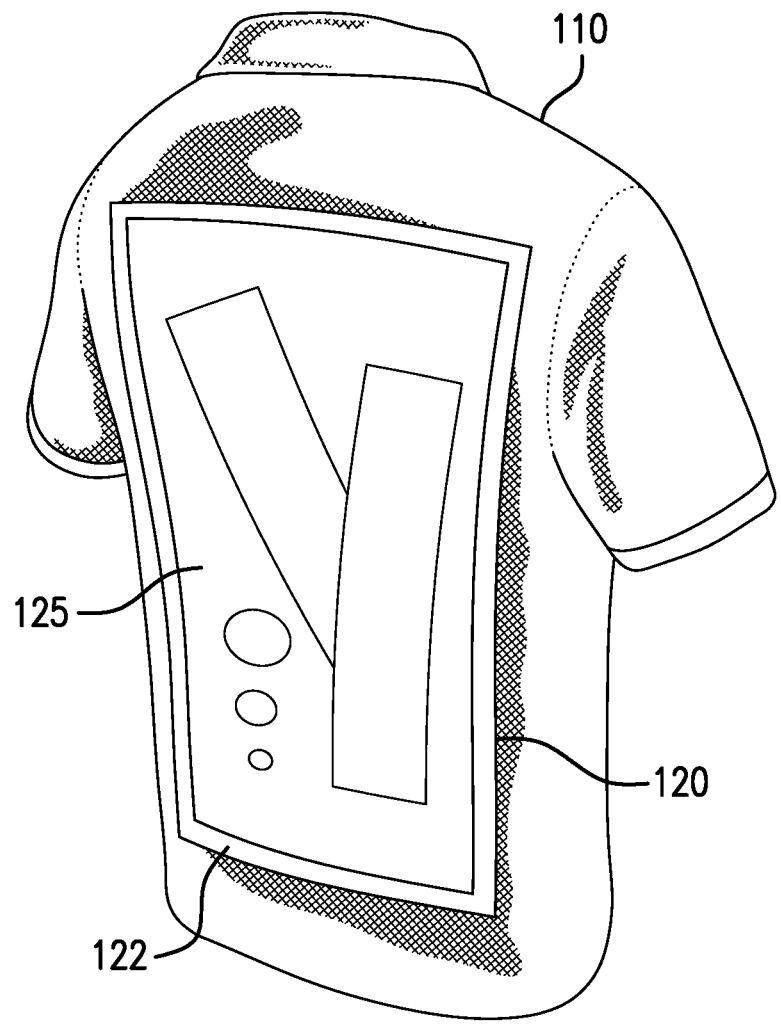
FIG. 17A shows a rear perspective view of a garment having a display panel having visual content surrounded by a plurality of flaps and having fasteners positioned on the garment, according to an embodiment of the present invention.
Figure 17B:
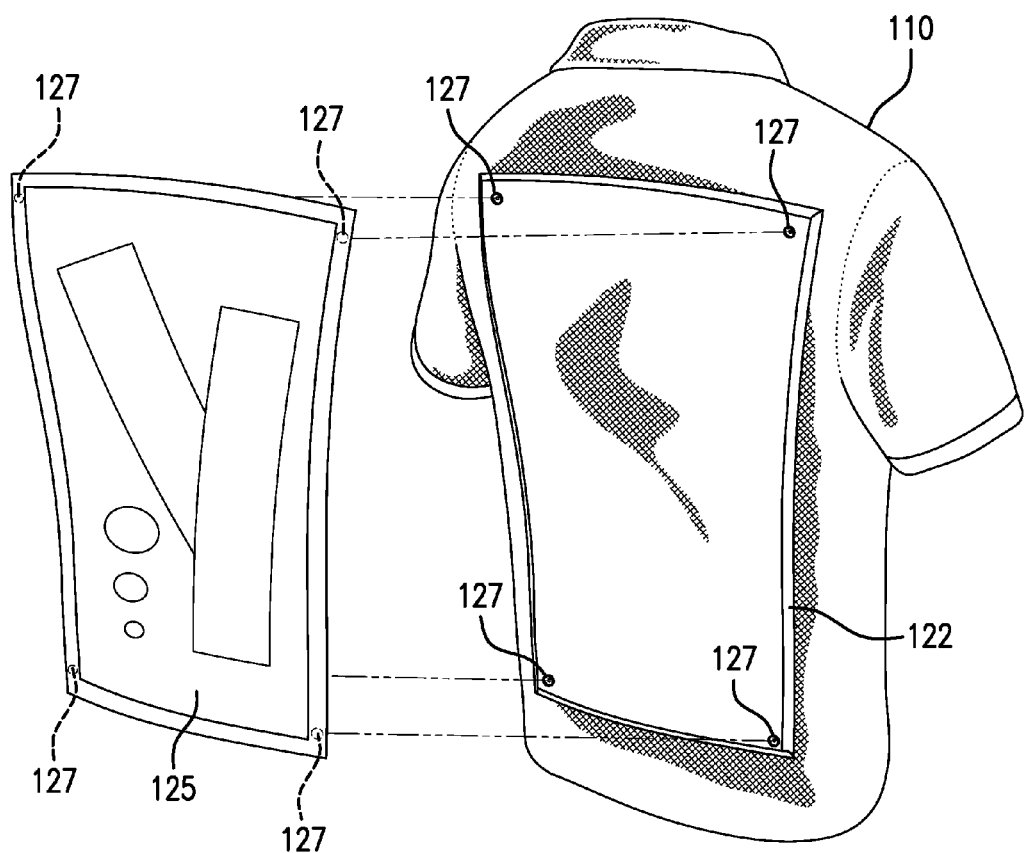
FIG. 17B shows an exploded rear perspective view of a display panel having visual content surrounded by a plurality of flaps and having fasteners positioned on the garment, according to an embodiment of the present invention.

Referring now to FIGS. 17A-17B, a rear perspective view (FIG. 17A) and an exploded rear perspective view (FIG. 17B) of a garment 110 having a display panel 120 having visual content 125 surrounded by a plurality of flaps 122 and having fasteners 127 positioned on the garment 110 is illustratively depicted, in accordance with an embodiment of the present invention.

According to an embodiment, the visual content 125 is located on the back of the garment 110, is removable, and can be secured onto the garment 110 using fasteners 127 located on the visual content 125 and the garment 110. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the garment 110.

Figure 18A:
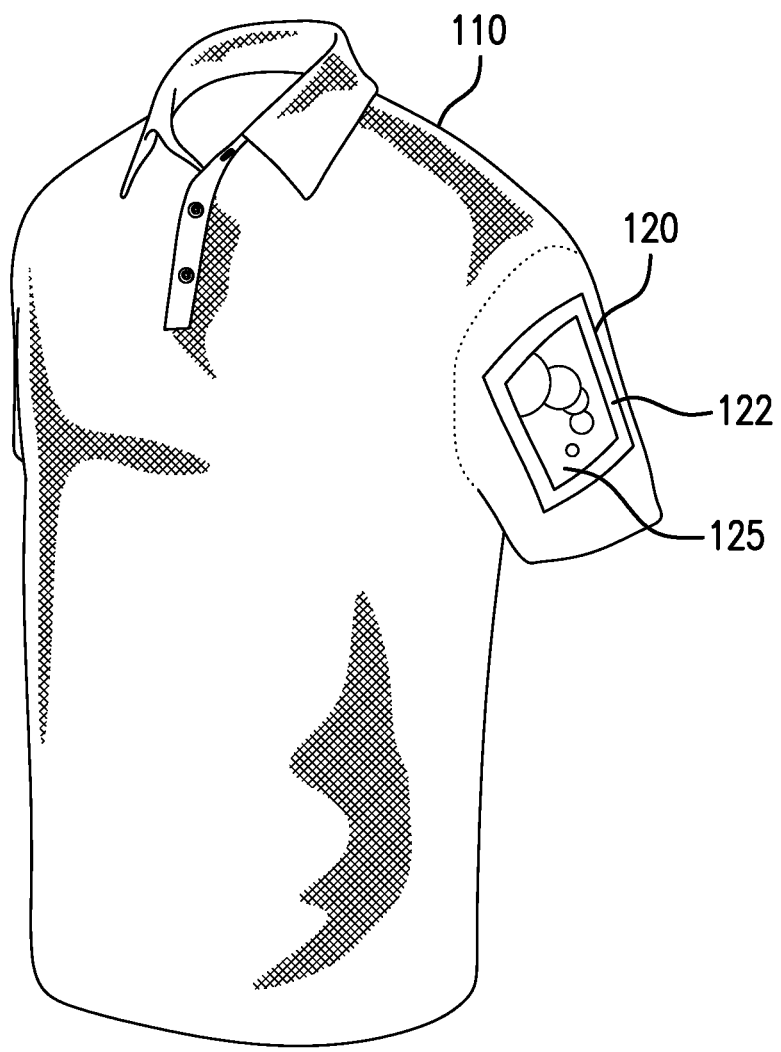
FIG. 18A shows an off-side perspective view of a garment having a display panel having visual content on a sleeve surrounded by a plurality of flaps, according to an embodiment of the present invention.
Figure 18B:
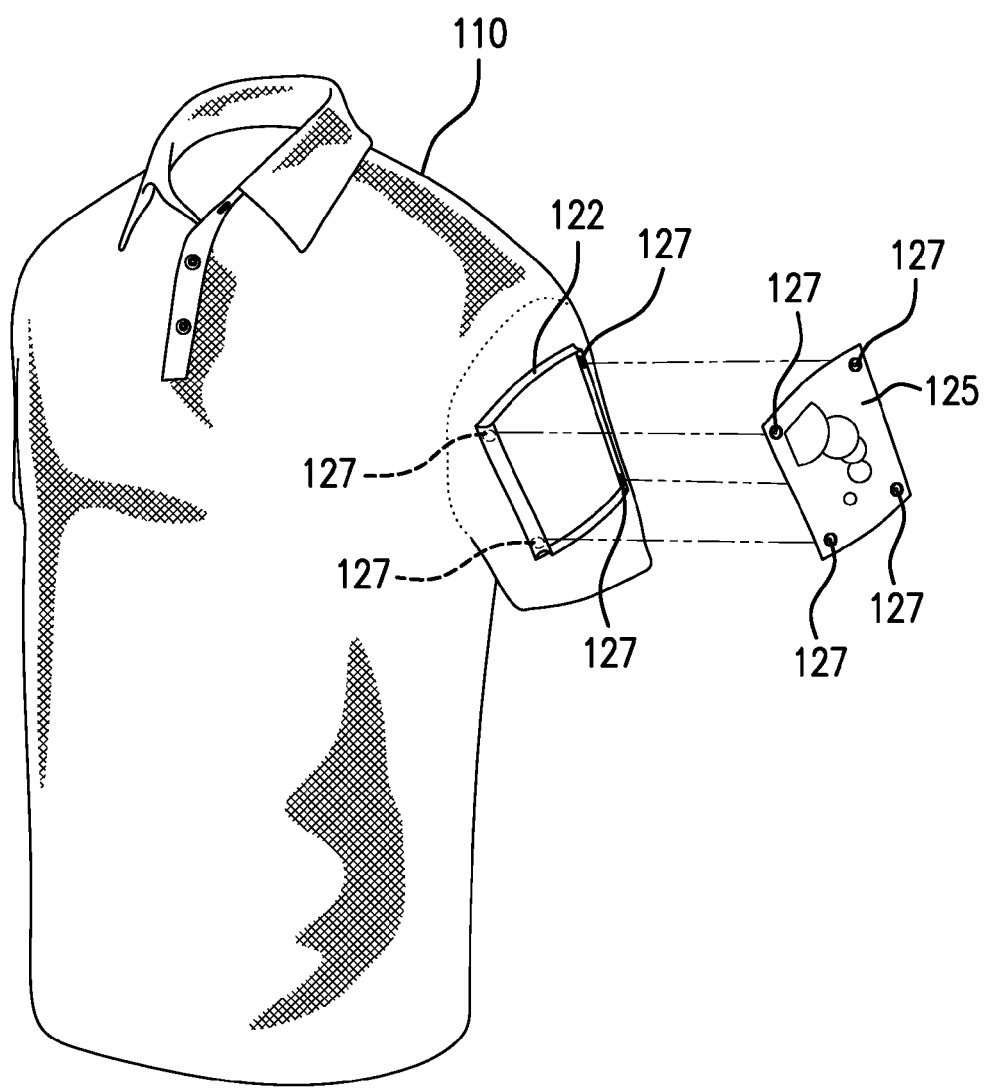
FIG. 18B shows an exploded off-side perspective view of a display panel having visual content on a sleeve surrounded by a plurality of flaps, according to an embodiment of the present invention.

Referring now to FIGS. 18A-18B, an off-side perspective view (FIG. 18A) and an exploded off-side perspective view (FIG. 18B) of a garment 110 having a display panel 120 having visual content 125 surrounded by a plurality of flaps 122 is illustratively depicted, in accordance with an embodiment of the present invention.

According to an embodiment, the visual content 125 is located on a sleeve of the garment 110, is removable, and can be secured onto the garment 110 using fasteners 127 located on the visual content 125 and the flaps 122. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110.

According to an embodiment, the visual content 125 is secured to the inner portion of the flaps 122. According to an embodiment, the flaps may be sewn into the seam, body, button placket, or face of the garment 110.

Figure 19A:
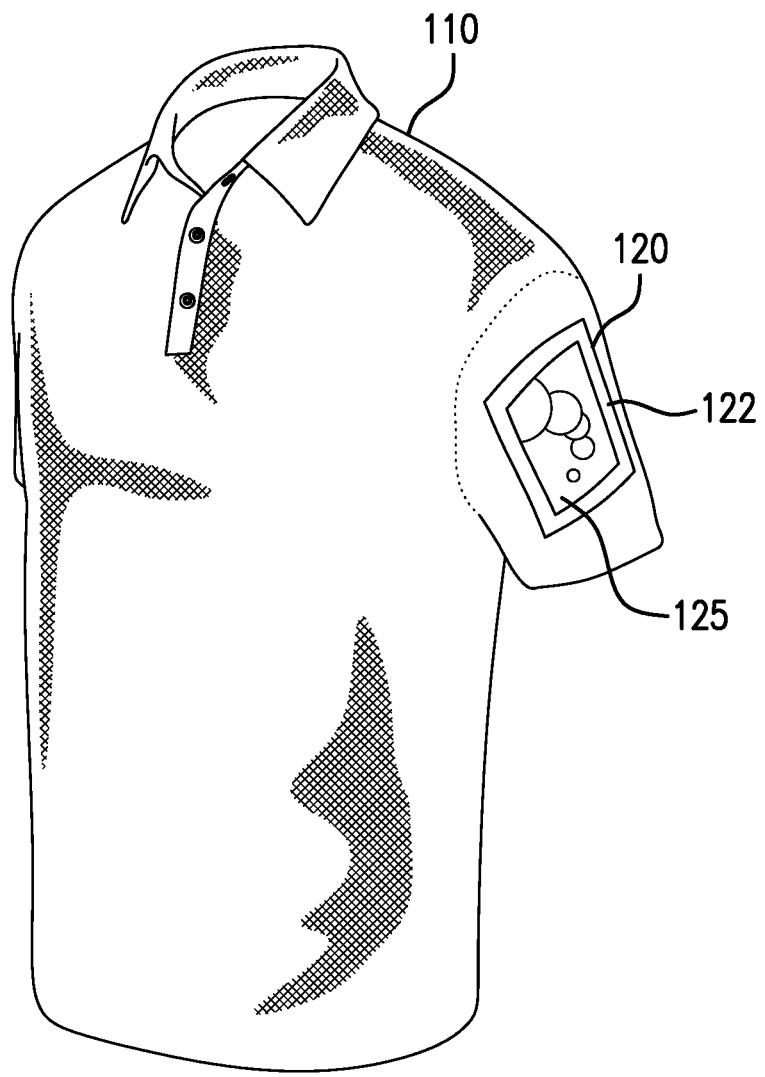
FIG. 19A shows an off-side perspective view of a garment having a display panel having visual content on a sleeve surrounded by a plurality of flaps and having fasteners positioned on the garment, according to an embodiment of the present invention.
Figure 19B:
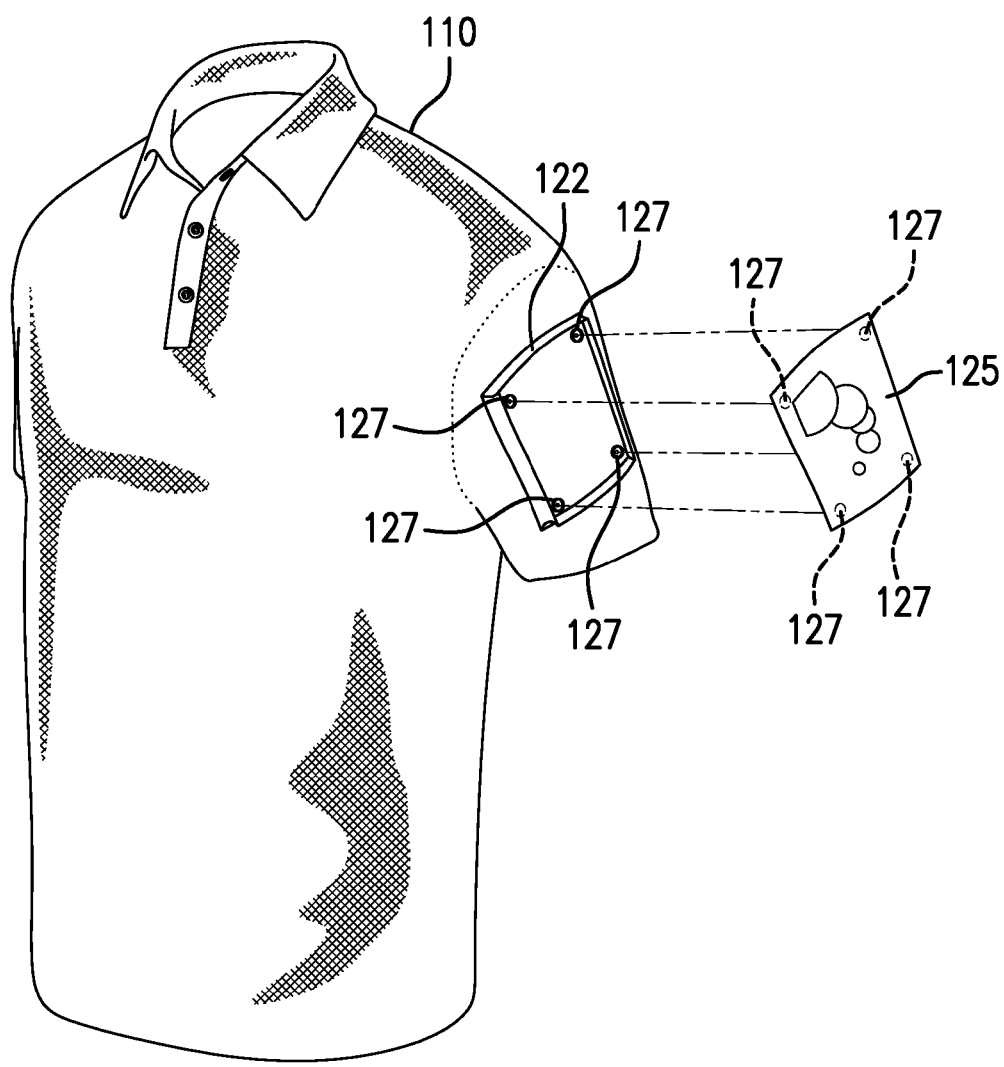
FIG. 19B shows an exploded off-side perspective view of a display panel having visual content on a sleeve surrounded by a plurality of flaps and having fasteners positioned on the garment, according to an embodiment of the present invention.

Referring now to FIGS. 19A-19B, an off-side perspective view (FIG. 19A) and an exploded off-side perspective view (FIG. 19B) of a garment 110 having a display panel 120 having visual content 125 surrounded by a plurality of flaps 122 and having fasteners 127 positioned on the garment 110 is illustratively depicted, in accordance with an embodiment of the present invention.

According to an embodiment, the visual content 125 is located on a sleeve of the garment 110, is removable, and can be secured onto the garment 110 using fasteners 127 located on the visual content 125 and the garment 110. According to an embodiment, the visual content can be any dimension, any shape, on one- or two-sided print, printed or digital, transparent or opaque, a logo, an image, a price, a promotion, a message, etc. The visual content may or may not cover the entire front and/or back of the garment 110. According to an embodiment, the visual content 125 is secured to the garment 110.

Figure 20:
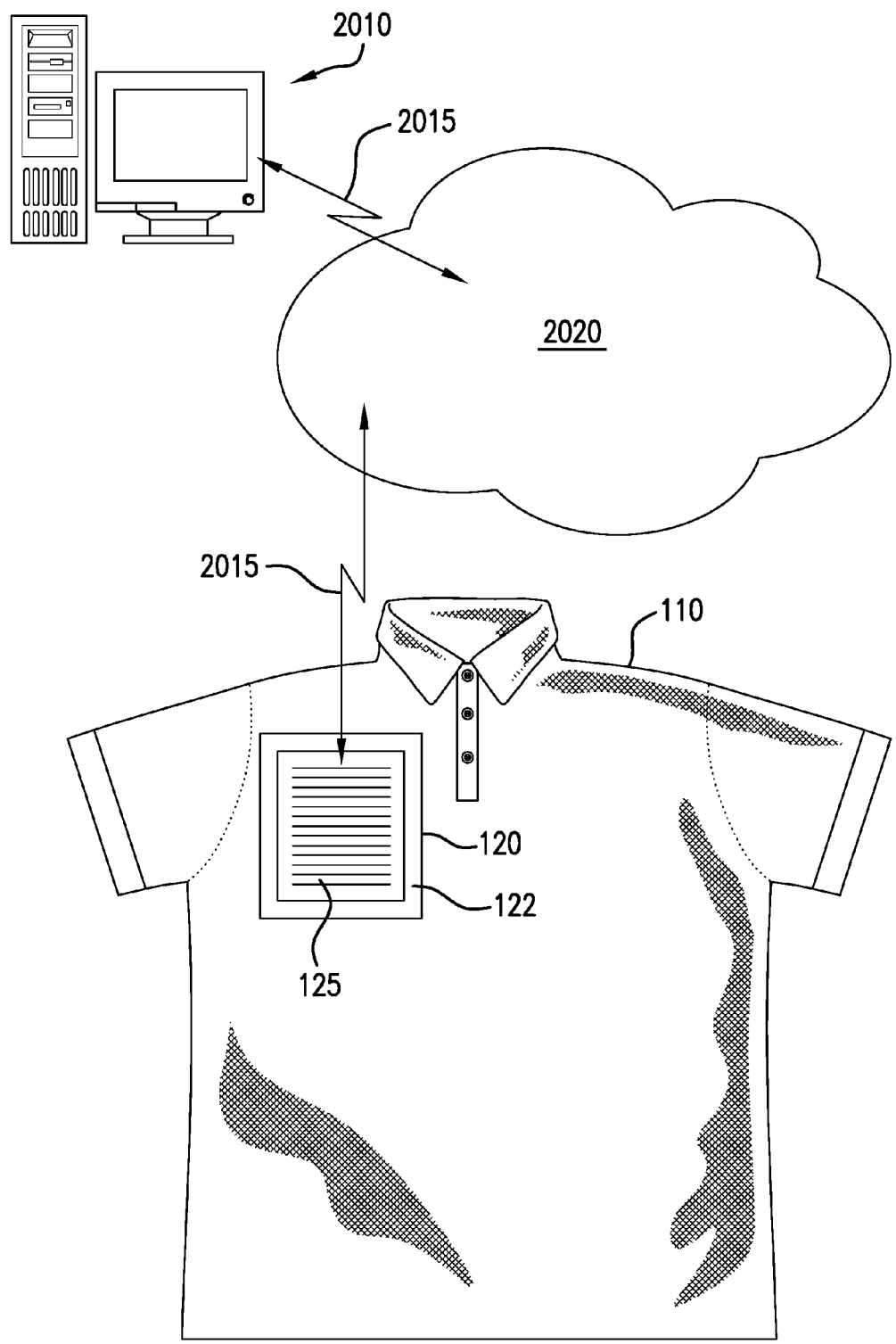
FIG. 20 shows a front perspective view of a garment having a digital display panel, according to an embodiment of the present invention.

Referring now to FIG. 20, a front perspective view of a garment 110 having a digital display panel 120 is illustratively depicted, in accordance with an embodiment of the present invention.

According to an embodiment, the visual content 125 includes one or more monitors to digitally display an image on the visual content. According to an embodiment, a computing device 2010 sends a signal 2015 to the digital display panel 120 through, e.g., the Internet and/or the cloud 2020, enabling the digital display panel 120 to display an image in the signal 2015 on the visual content 125. According to an embodiment, a signal 2015 can be returned to the computing device 2010.

Figure 21A:
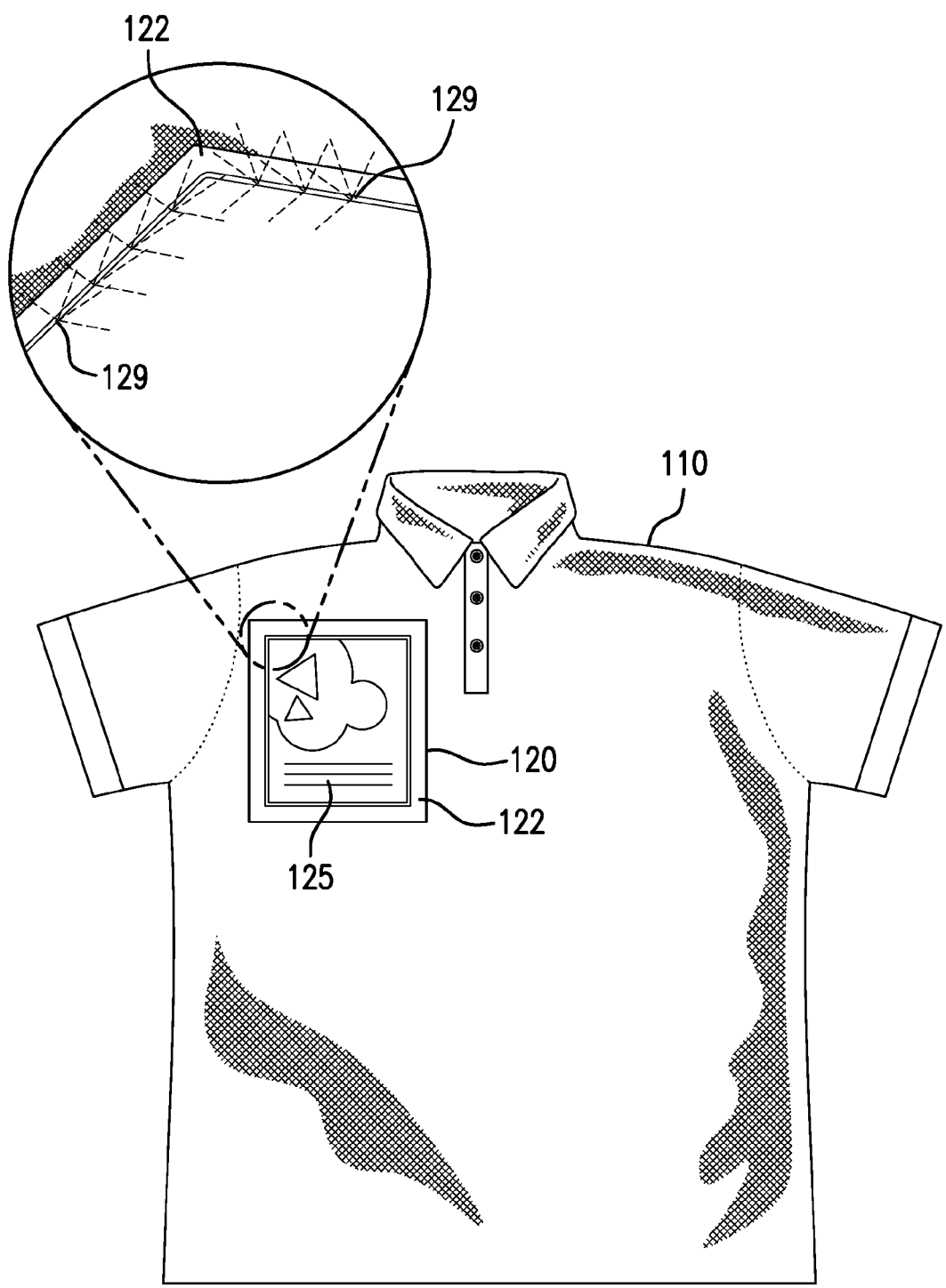
FIG. 21A shows a front perspective view of a garment having a display panel having one or more Light Emitting Diodes (LEDs), according to an embodiment of the present invention.
Figure 21B:
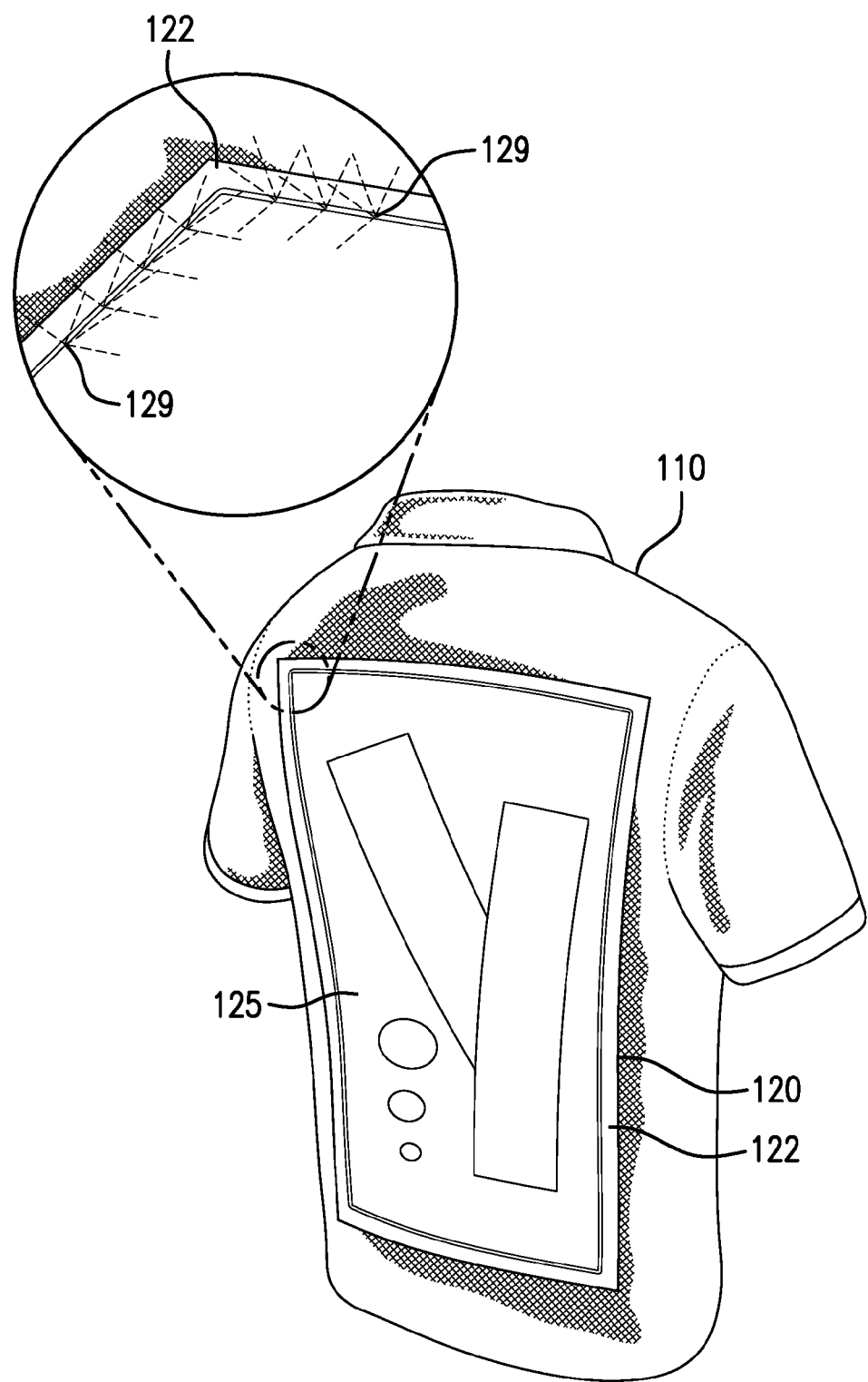
FIG. 21B shows a rear perspective view of a garment having a display panel having one or more LEDs, according to an embodiment of the present invention.

Referring now to FIGS. 21A-21B, a front perspective view (FIG. 21A) and a rear perspective view (FIG. 21B) of a garment 110 having a display panel 120 having one or more Light Emitting Diodes (LEDs) 129 is illustratively depicted, in accordance with an embodiment of the present invention.

According to the embodiment shown in FIG. 21A, the display panel 120 is located on the front of the garment 110. According to the embodiment shown in FIG. 21B, the display panel 120 is located on the back of the garment 110. It is noted, however, that the display panel 120 can be located on any portion of the garment 110.

According to an embodiment of the present invention, one or more LEDs 129 are secured along the outer border of the visual content 125. The positioning of the LEDs 129 enables the visual content 125 to be brightened by the light emitted from the LEDs 129. According to an embodiment, the LEDs may be white and/or colored and/or interchangeable and/or permanent and/or enabled to flash and/or enabled to be permanently lit.

Figure 22:
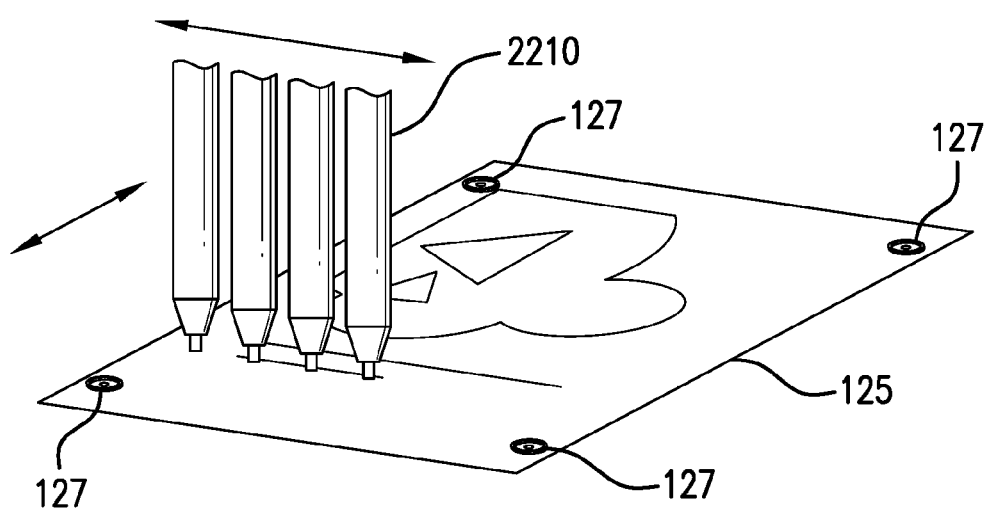
FIG. 22 shows visual content having an image printed onto the visual content using sublimation printing, according to an embodiment of the present invention.

Referring now to FIG. 22, visual content 125 having an image printed onto the visual content 125 using sublimation printing is illustratively depicted, in accordance with an embodiment of the present invention.

According to an embodiment of the present invention, an image is printed onto the visual content using a sublimation printing device 2210. It is noted, however, that other methods of printing onto the visual content 125 may also be used, while maintaining the spirit of the present invention.

According to some embodiments of the present invention, implementations of the systems and techniques described herein can provide one or more of the following advantages. Digital message delivery can be increased or otherwise improved. Interchangeable panels can allow digital and visible messages to be easily updated. Visual messages can interact with individuals at eye level. Multiple content providers can participate within any venue. Messages can be shared dynamically and directly with partners. Messages can be delivered electronically through familiar messaging channels, such as, for example, social media platforms, text message platforms, smartphone reminder platforms, etc. Enterprises can transform their employees' uniform into digital content distribution channels, while maintaining a professional image and comfort for uniformed employees. Display panel framing can allow for interchangeable panels to be worn, e.g., on the front or back of each garment, and can be adapted to virtually any type of garment. Visual messaging can complement digital messaging, e.g., to reinforce alerts, notifications or other information. Wireless technology (e.g., RFID, Bluetooth, iBeacon, etc.) within uniforms can eliminate the need for existing lanyards or proximity cards. This is not an exhaustive list of the advantages of the present invention. Other advantages are also provided that are inherent to the design and functionality of the invention.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features of particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

The many elements of the present invention make it unique in the field. The novelty is illustrated by the various options for nearly every aspect of the invention that allow it to be used in the proper exercise form by a variety of users, both in terms of body size and fitness level. Additionally, there is a wide range of exercises available to any user of the present invention, and users can perform exercises that use the upper and lower extremity muscle groups simultaneously.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for securing visual content to a garment, comprising:
    incorporating one or more images onto a display panel, the display panel including one or more fastening devices positioned on a surface of the display panel;
    securing the display panel to the garment by joining one or more fastening devices positioned on the garment to the one or more fastening devices positioned on the surface of display panel,
    wherein joining the one or more fastening devices positioned on the garment to the one or more fastening devices positioned on the display panel produces a non-permanent seal, enabling a user to remove the display panel once secured.

2. The method as recited in claim 1, wherein the display panel includes an electronic display and the method further comprises:
    sending an electronic signal containing one or more digital images to the display panel; and
    displaying the one or more digital images onto the electronic display.

* * * * *